(12) United States Patent
Tang et al.

(10) Patent No.: US 11,650,696 B2
(45) Date of Patent: May 16, 2023

(54) NOISE DETECTION CIRCUIT, SELF-CAPACITANCE DETECTION METHOD, TOUCH CHIP, AND ELECTRONIC DEVICE

(71) Applicant: SHENZHEN GOODIX TECHNOLOGY CO., LTD., Shenzhen (CN)

(72) Inventors: Zhi Tang, Shenzhen (CN); Hong Jiang, Shenzhen (CN); Zhe Chen, Shenzhen (CN)

(73) Assignee: SHENZHEN GOODIX TECHNOLOGY CO., LTD., Shenzen (CN)

( * ) Notice: Subject to any disclaimer, the term of this patent is extended or adjusted under 35 U.S.C. 154(b) by 97 days.

(21) Appl. No.: 17/501,623

(22) Filed: Oct. 14, 2021

(65) Prior Publication Data

US 2022/0043531 A1 Feb. 10, 2022

Related U.S. Application Data

(63) Continuation of application No. PCT/CN2020/107554, filed on Aug. 6, 2020.

(51) Int. Cl.
*G06F 3/041* (2006.01)
*G01D 5/24* (2006.01)
*G06F 3/044* (2006.01)

(52) U.S. Cl.
CPC ......... *G06F 3/0418* (2013.01); *G01D 5/2403* (2021.05); *G06F 3/04166* (2019.05); *G06F 3/0445* (2019.05)

(58) Field of Classification Search
CPC .. G06F 3/04166; G06F 3/0418; G06F 3/0445; G01D 5/2403
See application file for complete search history.

(56) References Cited

U.S. PATENT DOCUMENTS

| 2008/0158169 | A1 | 7/2008 | O' Connor et al. |
| 2015/0338952 | A1 | 11/2015 | Shahparnia et al. |
| 2020/0089386 | A1 | 3/2020 | Feng et al. |

FOREIGN PATENT DOCUMENTS

| CN | 206440771 | 8/2017 |
| CN | 108064344 | 5/2018 |
| CN | 108475155 | 8/2018 |
| CN | 111164558 | 5/2020 |
| JP | 2011113186 | 6/2011 |

*Primary Examiner* — Michael Pervan
(74) *Attorney, Agent, or Firm* — Emerson Thomson Bennett; Roger D. Emerson, Esq.

(57) ABSTRACT

Disclosed is a noise detection circuit comprising: a control module configured to control a drive module such that a to-be-detected capacitor is charged with a first voltage in a first period, and the control module controls a cancellation module such that a cancellation capacitor is charged with the first voltage in the first period, or such that both terminals of the cancellation capacitor are connected to the first voltage; the control module controls the cancellation module such that a first terminal of the to-be-detected capacitor is connected to a first terminal of the cancellation capacitor in a second period; the control module controls a charge transfer module such that charges of the to-be-detected capacitor and charges of the cancellation capacitor are converted in a third period to generate an output voltage; and a processing module configured to determine a noise value at least based on the output voltage.

20 Claims, 17 Drawing Sheets

NOISE DETECTION CIRCUIT, SELF-CAPACITANCE DETECTION METHOD, TOUCH CHIP, AND ELECTRONIC DEVICE

CROSS REFERENCE TO RELATED APPLICATIONS

The present disclosure is a continuation of PCT Patent Application No. PCT/CN2020/107554 filed on Aug. 6, 2020, which is incorporated by reference herein in its entirety.

TECHNICAL FIELD

Embodiments of the present disclosure relate to the field of touch control technologies, and in particular to, a noise detection circuit, a self-capacitance detection method, a touch chip, and an electronic device.

BACKGROUND

The principle of self-capacitance detection is to detect a capacitor formed between a detection electrode and system ground, which is known as the self-capacitance detection. When no external electric field is caused by an object, e.g., a finger, that approaches or touches the electrode, a capacitor will also be formed between the detection electrode and the system ground, and the capacitor has base capacitance or initial capacitance. When a finger approaches or touches the detection electrode, capacitance between the detection electrode and the system ground will be increased, and a user-related touch control operation may be determined by detecting a variation of the capacitance. During actual use, a capacitance detection system will be subject to various interferences, mainly including power supply noise, common mode interference, digital signal interference, and other spatial coupling interference. When self-capacitance detection is interfered with, the self-capacitance detection accuracy will be significantly reduced. Therefore, various measures need to be taken to reduce the noise interference based on the noise characteristics, such as changing an operating frequency of self-capacitance detection. Therefore, how to accurately detect a noise is extremely important. A common noise detection method in the prior art includes statisticizing jitter values of multi-frame data of the self-capacitance detection circuit at various driving frequencies, and determining noises at the driving frequencies based on sizes of the jitter values. When the jitter value is small, the noise is small, while when the jitter value is high, the noise is loud. Because of the need for statisticizing the jitter values, this method is time consuming. In addition, for noise interferences, the noise phase is often unpredictable. Therefore, it is impossible to accurately show the noise characteristics by determining the noise value only based on the jitter value.

SUMMARY OF THE INVENTION

In view of the problem of low noise measurement accuracy in the prior art, embodiments of the present disclosure provide a noise detection circuit, a self-capacitance detection method, a touch chip, a capacitive touch control system, and an electronic device.

In a first aspect of embodiments of the present disclosure, a noise detection circuit is provided, including: a control module, a drive module, a cancellation module, a charge transfer module, and a processing module; where the drive module is connected to the cancellation module, the cancellation module is connected to the charge transfer module, the charge transfer module is connected to the processing module, and the control module is connected to the drive module, the cancellation module, and the charge transfer module;

where the control module is configured to control the drive module such that a to-be-detected capacitor is charged with a first voltage in a first period, and control the cancellation module such that the cancellation capacitor is charged with the first voltage in the first period, or such that both terminals of the cancellation capacitor is connected to the first voltage;

the control module is configured to control the cancellation module such that a first terminal of the to-be-detected capacitor is connected to a first terminal of the cancellation capacitor in a second period;

the control module is configured to control the charge transfer module such that charges of the to-be-detected capacitor and charges of the cancellation capacitor are converted in a third period to generate an output voltage;

the first period, the second period, and the third period are consecutive in time, the charge transfer module includes an amplifier, and an inverting input terminal of the amplifier is connected to the first voltage; and the processing module is configured to determine a noise value at least based on the output voltage.

According to the first aspect, in one possible implementation, the first voltage is a common mode voltage.

According to the first aspect, in one possible implementation, the drive module includes a first switch unit, and the control module is further configured to control the first switch unit to be in a closed state, such that the drive module charges the to-be-detected capacitor with the first voltage in the first period;

where when the first switch unit is in the closed state, the first terminal of the to-be-detected capacitor is connected to the first voltage, and a second terminal of the to-be-detected capacitor is connected to a ground voltage.

According to the first aspect, in one possible implementation, the cancellation module includes a second switch unit and the cancellation capacitor, and the control module is further configured to control the second switch unit to be in a closed state in the first period;

where when the second switch unit is in the closed state, the cancellation capacitor is charged, the first terminal of the cancellation capacitor is connected to the first voltage, and a second terminal of the cancellation capacitor is connected to the ground voltage; or where when the second switch unit is in the closed state, the first terminal of the cancellation capacitor is connected to the first voltage, and the second terminal of the cancellation capacitor is connected to the first voltage.

According to the first aspect, in one possible implementation, the cancellation module further includes a third switch unit, and the control module is further configured to control the third switch unit to be in a closed state in the second period such that the first terminal of the to-be-detected capacitor is connected to the first terminal of the cancellation capacitor;

where when the third switch unit is in the closed state, the first terminal of the cancellation capacitor is disconnected from the first voltage, and the first terminal of the to-be-detected capacitor is disconnected from the first voltage.

According to the first aspect, in one possible implementation, when the charges of the to-be-detected capacitor and the charges of the cancellation capacitor are converted, the first terminal of the to-be-detected capacitor, the first terminal of the cancellation capacitor, and a non-inverting input terminal of the amplifier are connected.

According to the first aspect, in one possible implementation, the control module controls the charge transfer module to reset the charge transfer module in a fourth period; where the first period, the second period, the third period, and the fourth period are consecutive in time.

According to the first aspect, in one possible implementation, the charge transfer module further includes a fourth switch unit, and the fourth switch unit is in a closed state in the third period such that the charges of the to-be-detected capacitor and the charges of the cancellation capacitor are converted to generate the output voltage; and the fourth switch unit is in an off state in the fourth period to reset the charge transfer module.

According to the first aspect, in one possible implementation, in the first period, a voltage of the to-be-detected capacitor is increased to the first voltage, a voltage of the cancellation capacitor is increased to the first voltage or a voltage of the cancellation capacitor is 0; a connection state of the second terminal of the cancellation capacitor in the second period is the same as a connection state of the second terminal of the cancellation capacitor in the first period; an output voltage of the charge transfer module is increased or reduced to 0 in the first period and the second period, and the output voltage of the charge transfer module is reduced or increased to 0 in the fourth period.

According to the first aspect, in one possible implementation, the processing module includes a filter, an analog-to-digital converter, and a digital signal processor; where the filter filters the output voltage of the charge transfer module; the analog-to-digital converter performs analog-to-digital conversion on the filtered output voltage; the digital signal processor is configured to demodulate the output voltage after the analog-to-digital conversion at a reference frequency that is a reciprocal of a noise detection cycle; the noise detection cycle is equal to an integer multiple of a noise detection half cycle, and the noise detection half cycle is a sum of the first period, the second period, the third period, and the fourth period; or the noise detection half cycle is a sum of the first period, the second period, and the third period.

According to the first aspect, in one possible implementation, the processing module determining a noise value at least based on the output voltage includes: the processing module determining a noise magnitude based on the output voltage from the charge transfer module within the noise detection cycle.

According to the first aspect, in one possible implementation, the drive module includes a thirteenth switch unit, a fourteenth switch unit, and a nineteenth switch unit; the control module is further configured to control the thirteenth switch unit, the fourteenth switch unit, and the nineteenth switch unit to perform noise detection or self-capacitance detection; during the noise detection, the control module is configured to control the nineteenth switch unit such that the first terminal of the to-be-detected capacitor is connected to the first voltage in the first period; during the self-capacitance detection, the control module is configured to control the thirteenth switch unit and the fourteenth switch unit such that the first terminal of the to-be-detected capacitor is connected to the ground voltage or the power supply voltage; and a second terminal of the to-be-detected capacitor is connected to the ground voltage.

According to the first aspect, in one possible implementation, the cancellation module includes a fifteenth switch unit, a sixteenth switch unit, a twentieth switch unit, a seventeenth switch unit, an eighteenth switch unit, and a twenty-first switch unit; the control module is further configured to control the fifteenth switch unit, the sixteenth switch unit, the twentieth switch unit, the seventeenth switch unit, the eighteenth switch unit, and the twenty-first switch unit to perform the noise detection or the self-capacitance detection; during the noise detection, the control module is configured to control the twentieth switch unit and the twenty-first switch unit such that the first terminal and a second terminal of the cancellation capacitor are connected to the first voltage in the first period, or such that the first terminal of the cancellation capacitor is connected to the first voltage and the second terminal of the cancellation capacitor is connected to the ground voltage in the first period; during the self-capacitance detection, the control module is configured to control the fifteenth switch unit, the sixteenth switch unit, the seventeenth switch unit, and the eighteenth switch unit such that the first terminal and the second terminal of the cancellation capacitor are connected to the ground voltage or the power supply voltage.

According to the first aspect, in one possible implementation, the cancellation module further includes a fifth switch unit, and the control module is further configured to control the fifth switch unit such that the first terminal of the to-be-detected capacitor is connected to the first terminal of the cancellation capacitor in the second period and in the third period, and the first terminal of the to-be-detected capacitor is disconnected from the first terminal of the cancellation capacitor in the first period.

According to the first aspect, in one possible implementation, the noise detection circuit further includes a power switching module, where the power switching module is connected to the control module, the drive module, and the cancellation module, the power switching module is configured to switch the first voltage such that the control module controls the drive module, the cancellation module, the charge transfer module, and the processing module to perform the self-capacitance detection or the noise detection, and during the self-capacitance detection, the control module is further configured to control the cancellation capacitor to perform charge cancelling on the to-be-detected capacitor.

According to the first aspect, in one possible implementation, during the self-capacitance detection, the power switching module is configured to switch two first voltages connected to the first terminal of the to-be-detected capacitor to the power supply voltage and the ground voltage respectively; the power switching module is further configured to switch the two first voltages connected to the first terminal of the cancellation capacitor to the power supply voltage and the ground voltage respectively; and the power switching module is further configured to switch the two first voltages connected to a second terminal of the cancellation capacitor to the power supply voltage and the ground voltage respectively.

According to the first aspect, in one possible implementation, during the noise detection, the power switching module is configured to switch the power supply voltage and the ground voltage connected to the first terminal of the to-be-detected capacitor to the first voltage; the power switching module is further configured to switch the power supply voltage and the ground voltage connected to the first terminal of the cancellation capacitor to the first voltage; and the power switching module is further configured to switch the power supply voltage and the ground voltage connected to the second terminal of the cancellation capacitor to the first voltage.

According to the first aspect, in one possible implementation, the drive module, the cancellation module and the charge transfer module each includes at least one switch unit; and a timing sequence of the switch units of the drive module, the cancellation module, and the charge transfer module during the noise detection is the same as a timing sequence of the switch units of the drive module, the cancellation module, and the charge transfer module during the self-capacitance detection.

According to the first aspect, in one possible implementation, the amplifier is a monoamplifier.

According to the first aspect, in one possible implementation, the amplifier is a fully differential amplifier.

In a second aspect of embodiments of the present disclosure, a self-capacitance detection method is provided, including: detecting a noise magnitude of the noise detection circuit operating at a first frequency using the noise detection circuit according to the above first aspect; where when the noise magnitude is lower than a preset noise threshold, a self-capacitance detection circuit performs capacitance detection at the first frequency.

According to the second aspect, in one possible implementation, a cycle of the self-capacitance detection is equal to a reciprocal of the first frequency, the self-capacitance detection circuit performs capacitance detection at the first frequency, and the cycle of the self-capacitance detection is equal to a noise detection cycle.

According to the first aspect, in one possible implementation, the noise detection cycle is equal to an integer multiple of a noise detection half cycle, and the noise detection half cycle is a sum of the first period, the second period, the third period, and the fourth period.

According to the first aspect, in one possible implementation, the noise detection cycle is twice the noise detection half cycle.

According to the first aspect, in one possible implementation, when the self-capacitance detection circuit is operating at the first frequency, the processing module performs demodulation at the first frequency, to provide a self-capacitance value.

According to the first aspect, in one possible implementation, the self-capacitance detection includes: charging the to-be-detected capacitor and the cancellation capacitor in a ninth period; performing charge cancelling on the to-be-detected capacitor and the cancellation capacitor in a tenth period; performing charge transfer on the charges of the to-be-detected capacitor and the charges of the cancellation capacitor in an eleventh period; resetting the charge transfer module in a twelfth period; discharging the to-be-detected capacitor and charging the cancellation capacitor in a thirteenth period; performing charge cancelling on the to-be-detected capacitor and the cancellation capacitor in a fourteenth period; performing charge transfer on the charges of the to-be-detected capacitor and the charges of the cancellation capacitor in a fifteenth period; and resetting the charge transfer module in a sixteenth period; a length of the ninth period being equal to a length of the thirteenth period, a length of the tenth period being equal to a length of the fourteenth period, a length of the eleventh period being equal to a length of the fifteenth period, a length of the twelfth period being equal to a length of the sixteenth period; and a length of the ninth period being equal to a length of the first period, a length of the tenth period being equal to a length of the second period, a length of the eleventh period being equal to a length of the third period, a length of the twelfth period being equal to being equal to a length of the fourth period.

In a third aspect of embodiments of the present disclosure, a touch chip is provided, including the noise detection circuit according to the above first aspect.

In a fourth aspect of embodiments of the present disclosure, a capacitive touch control system is provided, including the touch chip according to the above third aspect and a touch sensor.

In a fifth aspect of embodiments of the present disclosure, an electronic device is provided, including the touch chip according to the above third aspect.

Embodiments of the present disclosure provide a noise detection circuit, a self-capacitance detection method, a touch chip, a capacitive touch control system, and an electronic device, where in a first period, a to-be-detected capacitor is charged with a first voltage, and a cancellation capacitor is charged with the first voltage, or both terminals of the cancellation capacitor are connected to the first voltage; in a second period, a first terminal of the to-be-detected capacitor is connected to a first terminal of the cancellation capacitor; and in a third period, a charge transfer module converts charges of the to-be-detected capacitor and charges of the cancellation capacitor to generate an output voltage, and a processing module determines a noise value at least based on the output voltage; and further, an inverting input terminal of the amplifier is connected to the first voltage, such that charge changes of the to-be-detected capacitor and of the cancellation capacitor can accurately reflect the noise value during noise detection, thereby more accurately detecting a noise.

BRIEF DESCRIPTION OF THE DRAWINGS

Some specific embodiments of embodiments of the present disclosure will be described in detail below with reference to the accompanying drawings in an exemplary manner, instead of in a limiting manner. Identical reference numerals in the accompanying drawings represent identical or similar components or parts. Those skilled in the art should understand that these figures may not be drawn to scale. In the figures.

DETAILED DESCRIPTION

Any technical solution in embodiments of the present disclosure may not necessarily be implemented to achieve all of the above advantages.

In technical solutions provided in embodiments of the present disclosure, a noise detection circuit includes: a control module, a drive module, a cancellation module, a charge transfer module, and a processing module; where the drive module is connected to the cancellation module, the cancellation module is connected to the charge transfer module, the charge transfer module is connected to the processing module, and the control module is connected to the drive module, the cancellation module, and the charge transfer module, where the control module is configured to control the drive module such that a to-be-detected capacitor is charged with a first voltage in a first period, and the control module is configured to control the cancellation module such that the cancellation capacitor is charged with the first voltage in the first period, or such that both terminals of the cancellation capacitor are connected to the first voltage; the control module is further configured to control the cancellation module such that a first terminal of the to-be-detected capacitor is connected to a first terminal of the cancellation capacitor in a second period;

the control module is further configured to control the charge transfer module such that charges of the to-be-detected capacitor and charges of the cancellation capacitor are converted in a third period to generate an output voltage; and the processing module is configured to determine a noise value at least based on the output voltage. The charge transfer module includes an amplifier; an inverting input terminal of the amplifier is connected to the first voltage; and the first period, the second period, and the third period are consecutive in time. In this embodiment, the to-be-detected capacitor and the cancellation capacitor are processed with the first voltage, such that before the charge transfer module transfers the charges of the cancellation capacitor and the charges of the to-be-detected capacitor, a voltage at a connection point between the cancellation capacitor and the to-be-detected capacitor is equal to the first voltage connected to the inverting input terminal of the amplifier, thereby accurately detecting a noise.

Specific implementations of the embodiments of the present disclosure will be further described below with reference to the accompanying drawings of the embodiments of the present disclosure.

Figure 1A:
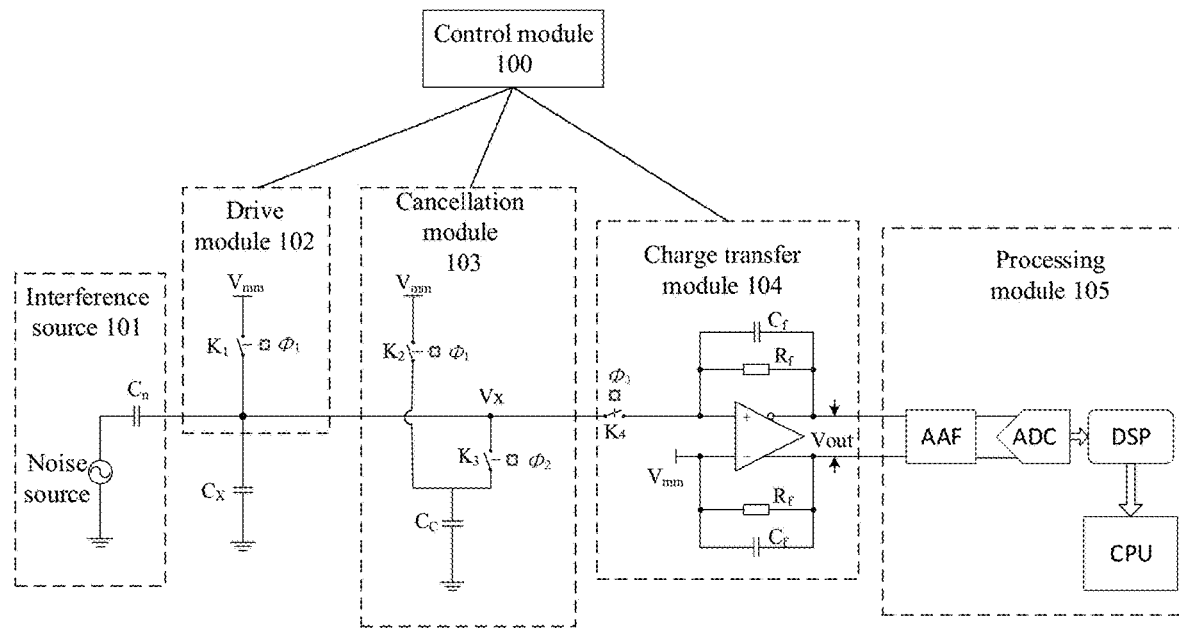
FIG. 1A is a schematic structural diagram of a noise detection circuit provided in an embodiment of the present disclosure.

As shown in FIG. 1A, a noise detection circuit includes a control module 100, a drive module 102, a cancellation module 103, a charge transfer module 104, and a processing module 105. The control module 100 may be configured to control the drive module 102 to charge the to-be-detected capacitor Cx with the first voltage Vmm, and control the cancellation module 103 to charge a cancellation capacitor Cc with the first voltage Vmm. In addition, the control module 100 may be configured to control the cancellation module 103 such that a first terminal of the cancellation capacitor Cc is connected to a first terminal of the to-be-detected capacitor Cx, a second terminal of the to-be-detected capacitor Cx is grounded, and a second terminal of the cancellation capacitor Cc is grounded. In this embodiment, the cancellation module 103 may also be referred to as a compensation module. During the self-capacitance detection, the capacitor itself has some basic capacitance, such that charge cancel is performed between charges stored in the cancellation capacitor and charges stored in the to-be-detected capacitor to eliminate the basic capacitance. Therefore, a cancellation capacitor exists during the self-capacitance detection. In this embodiment, the capacitor Cc may also be used as a cancellation capacitor in a self-capacitance detection circuit. Therefore, the capacitor Cc may be referred to as a cancellation capacitor here, and the module 103 may be referred to as a cancellation module. The charge transfer module 104 may be configured to convert the charges of the to-be-detected capacitor Cx and the charges of the cancellation capacitor Cc to generate an output voltage Vout; and the processing module 105 may be configured to determine a noise that affects the to-be-detected capacitor based on the output voltage Vout.

The control module 100 is connected to the drive module 102, the cancellation module 103, and the charge transfer module 104 respectively. The drive module 102 is connected to the cancellation module 103, the cancellation module 103 is connected to the charge transfer module 104, and the processing module 105 is connected to the charge transfer module 104. The control module 100 may include a programmable sequential logic circuit configured to control the on and off of switch units of the noise detection circuit.

As shown in FIG. 1A, the drive module 102 includes a first switch unit K1 (e.g., a single switch implementation), and the control module 100 is further configured to control the first switch unit K1 to be in a closed state, such that the drive module 102 charges the to-be-detected capacitor Cx with the first voltage Vmm in a first period. Further, when the first switch unit K1 is in the closed state, a first terminal of the to-be-detected capacitor Cx electrically receives the first voltage Vmm, a second terminal of the to-be-detected capacitor electrically receives GND, and a voltage value of the first voltage Vmm is higher than GND. It is understandable that the first voltage Vmm is set within an operating voltage range of the charge transfer module. In this embodiment, the operating voltage range of the charge transfer module from GND to Vcc is taken as an example for description. Therefore, the first voltage Vmm may be set to be greater than GND and less than Vcc. When the operating voltage range of the charge transfer module is from (−Vcc) to Vcc, the first voltage Vmm may be set to be greater than −Vcc and less than Vcc.

As shown in FIG. 1A, the cancellation module 103 includes a second switch unit K2 (e.g., a single switch implementation), and a third switch unit K3 (e.g., a single switch implementation). The second switch unit K2 and the third switch unit K3 may be in different closed states. Specifically, the control module 100 may be configured to control the second switch unit K2 to be in a closed state and the third switch unit K3 to be in an off state, such that the cancellation capacitor is charged with the first voltage in the first period. The control module 100 may be used to control the second switch unit K2 to be in an off state and the third switch unit K3 to be in a closed state. Specifically, when the second switch unit K2 is in the off state, and the third switch unit K3 is in the closed state, the first terminal of the cancellation capacitor Cc is connected to the first terminal of the to-be-detected capacitor Cx in the third period. The second terminal of the cancellation capacitor Cc and the second terminal of the to-be-detected capacitor Cx are both grounded. In this embodiment, the second terminal of the cancellation capacitor Cc being grounded is taken as an example for description. It should be noted that in this embodiment, the second terminal of the cancellation capacitor may also be connected to the first voltage Vmm.

Further, assuming that an interference source 101 is shown in FIG. 1, it should be noted that the interference source 101 is only illustrated for simulating interferences, and is drawn merely for ease of understanding. For example, the interference source is expressed as a voltage source and a coupling capacitor Cn connected in series, and the interferences couple a noise into a circuit by the coupling capacitor Cn. It is understandable that the interference source includes at least one noise source, and the interference source may also be expressed in other forms. For example, not only a voltage source, but also a current source may be used as a noise source, which is not limited in this embodiment. The control module 100 controls the second switch unit K2 to be in the off state and the third switch unit K3 to be in a closed state, to form a closed circuit. When there is an interference, a voltage of the to-be-detected capacitor Cx at the end of the first period is Vmm, However, influenced by the noise, a voltage Vx at a connection point between the cancellation capacitor Cc and the to-be-detected capacitor Cx will change in a second period, and the cancellation capacitor Cc and the to-be-detected capacitor Cx will be charged or discharged simultaneously in the second period. Therefore, when there is the noise, the voltage Vx at the connection point between the cancellation capacitor Cc and the to-be-detected capacitor Cx is not Vmm.

As shown in FIG. 1A, a fourth switch unit K4 (e.g., a single switch implementation) is provided between the charge transfer module 104 and the cancellation module 103. Accordingly, the control module 100 further controls the fourth switch unit K4 to be in a closed state, such that the charge transfer module 104 is electrically connected to the to-be-detected capacitor Cx and the cancellation capacitor Cc, thereby converting the charges of the to-be-detected capacitor Cx and the charges of the cancellation capacitor Cc to generate the output voltage Vout.

In this embodiment, the charge transfer module 104 is described with a fully differential amplifier as an example. Further, a non-inverting input terminal of the fully differential amplifier may be electrically connected to the fourth switch K4, and an inverting input terminal of the fully differential amplifier is connected to the first voltage Vmm. A feedback resistor Rf and a feedback capacitor Cf are provided between the non-inverting input terminal and an inverting output terminal, and between the inverting input terminal and a non-inverting output terminal, of the fully differential amplifier. The feedback resistor Rf is connected in parallel to the feedback capacitor Cf. In this embodiment, the non-inverting input terminal may also be referred to as a positive phase input terminal, and the inverting input terminal may also be referred to as a negative phase input terminal. Referring to FIG. 1A, the inverting output terminal of the fully differential amplifier is marked with a circle, while the non-inverting output terminal of the fully differential amplifier is not marked with a circle. In this embodiment, a monoamplifier may be used to replace the fully differential amplifier.

Figure 2A:
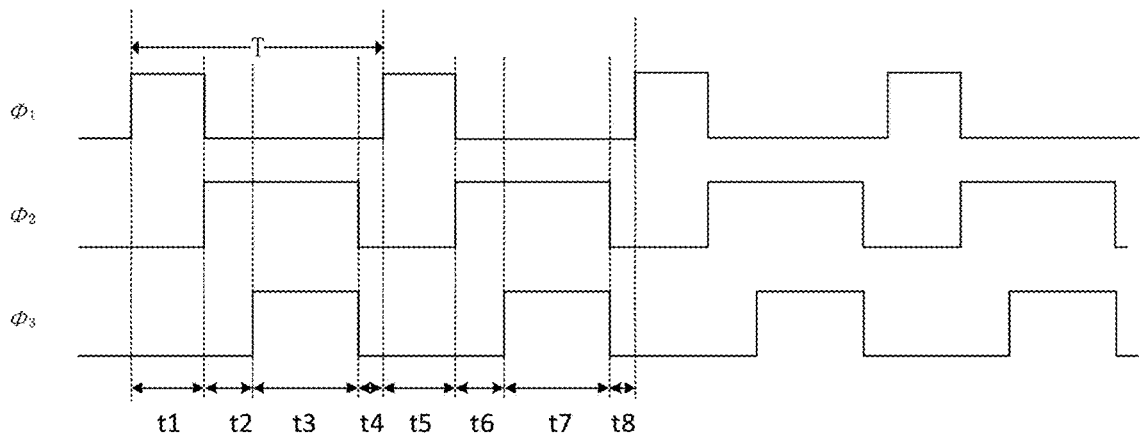
FIG. 2A is a sequence diagram for the noise detection circuit in FIG. 1A, FIG. 1B, FIG. 1C, and FIG. 1D during operation provided in an embodiment of the present disclosure.

In this embodiment, the first switch unit K1, the second switch unit K2, the third switch unit K3, and the fourth switch unit K4 are described with a single-pole single-throw switch as an example for description. States of the above switches are shown in FIG. 2A. In FIG. 2A, a high level means that a switch is closed, and a low level means that a switch is disconnected (switched off), which is further specifically described below with reference to on-off states in FIG. 2A.

FIG. 2A is a sequence diagram for the noise detection circuit in FIG. 1A during operation in an embodiment of the present disclosure; for ease of presentation, φ1, φ2, and φ3 may be used to denote states of switches. Specifically, φ1 denotes states of the first switch unit K1 and the second switch unit K2, φ2 denotes a state of the third switch unit K3, and φ3 denotes a state of the fourth switch unit K4. Periods t1 to t4 constitute a cycle of the control signals φ1, φ2, and φ3, and t1+t2+t3+t4 may be understood as a noise detection half cycle. Two noise detection half cycles are taken as an example for description below. Main technical processing of each period is briefly described as follows:

period t1: charging the to-be-detected capacitor Cx and the cancellation capacitor Cc with the first voltage Vmm;

period t2: connecting the first terminal of the to-be-detected capacitor Cx to the first terminal of the cancellation capacitor Cc, disconnecting the first terminal of the to-be-detected capacitor from the first voltage Vmm, and disconnecting the first terminal of the cancellation capacitor from Vmm;

period t3: converting the charges of the to-be-detected Cx and the charges of the cancellation capacitor Cc into a voltage signal by charge transfer;

period t4: resetting the fully differential amplifier;

period t5: charging the to-be-detected capacitor Cx and the cancellation capacitor Cc with the first voltage Vmm;

period t6: connecting the first terminal of the to-be-detected capacitor Cx to the first terminal of the cancellation capacitor Cc, disconnecting the first terminal of the to-be-detected capacitor from the first voltage Vmm, and disconnecting the first terminal of the cancellation capacitor from Vmm;

period t7: converting the charges of the to-be-detected Cx and the charges of the cancellation capacitor Cc into a voltage signal by charge transfer; and period t8: resetting the fully differential amplifier.

It is understandable that the operations from the first period to the fourth period (from t1 to t4) are completely repeated from the fifth period to the eighth period (from t5 to t8). The first period to the fourth period may be referred to as the noise detection half cycle. After an output voltage of the noise detection half cycle is sampled, a noise value may be determined based on the output voltage of the noise detection half cycle. Noise detection of the noise detection circuit is performed according to the noise detection method of the above periods t1 to t8, and the noise is more accurately detected.

In the first period (t1), the first switch unit K1 and the second switch unit K2 are switched on (i.e., in the closed state), the third switch unit K3 and the fourth switch unit K4 are switched off, both the first terminal of the to-be-detected capacitor Cx and the first terminal of the cancellation capacitor Cc are connected to the first voltage Vmm, both the second terminal of the to-be-detected capacitor Cx and the second terminal of the cancellation capacitor Cc are connected to GND, the to-be-detected capacitor Cx and the cancellation capacitor Cc are charged simultaneously, and external interferences cannot inject charges caused by a noise into the to-be-detected capacitor or the cancellation capacitor. At the end of the period t1, a voltage of the to-be-detected capacitor Cx is Vmm, and a voltage of the cancellation capacitor Cc is Vmm. In addition, since the fourth switch unit K4 is switched off, the output voltage Vout of the charge transfer module is 0. In this case, the amount of charges stored in the to-be-detected capacitor Cx is $Q1=Vmm*Cx$, and the amount of charges stored in the cancellation capacitor Cc is $Q2=Vmm*Cc$.

In the second period (t2), the first switch unit K1 and the second switch unit K2 are switched off, the third switch unit K3 is closed, and the fourth switch unit K4 is switched off. In this case, the first terminal of the to-be-detected capacitor Cx is connected to the first terminal of the cancellation capacitor Cc, and the second terminal of the to-be-detected capacitor Cx and the second terminal of the cancellation capacitor Cc are both grounded. When there is no noise (ideally), there is $Vmm*Cx+Vmm*Cc=Vx*Cx+(Vx-0)*Cc$ in accordance with the charge conservation law, and the voltage Vx of the to-be-detected capacitor Cx is equal to Vmm; while when there is a noise, the charges stored in the to-be-detected capacitor Cx and the charges stored in the cancellation capacitor Cc change, the to-be-detected capacitor Cx and the cancellation capacitor Cc are charged or discharged simultaneously, and the voltage Vx of the to-be-detected capacitor Cx is not equal to Vmm, for example, Vx>Vmm or Vx<Vmm. In the second period, the interference source may inject the charges caused by the noise into the to-be-detected capacitor and the cancel capacitance.

In the third period t3, the first switch unit $K_1$ and the second switch unit $K_2$ are switched off, the third switch unit $K_3$ is closed, and the fourth switch unit $K_4$ is closed. That is, it may be understood that other switches remain in the same state as in the second period, except that the fourth switch unit $K_4$ is closed. In the third period, the charges stored in the to-be-detected capacitor and the charges stored in the cancellation capacitor in the second period may be transferred to the charge transfer module, and the noise may affect the charge transfer module by Cn. Based on a value of the voltage Vx of the to-be-detected capacitor Cx at the end of the period t2, there are the following situations:

When Vx>Vmm, the to-be-detected capacitor Cx and the cancellation capacitor Cc transfer charges to the charge transfer module simultaneously, until the voltage Vx of the to-be-detected capacitor Cx reaches Vmm.

When Vx=Vmm, there is not a process of transferring charges from the to-be-detected capacitor Cx and the cancellation capacitor Cc to the charge transfer module, which means that in this case, the circuit is not affected by the noise.

When Vx<Vmm, the charge transfer module will charge the to-be-detected capacitor Cx and the cancellation capacitor Cc via a feedback network (composed of Rf and Cf), until both the voltage of the to-be-detected capacitor Cx and the voltage of the cancellation capacitor Cc reach Vmm. In this embodiment, the charge transfer module includes a feedback network, and the feedback form of the feedback network includes, but is not limited to, resistance feedback, resistance-capacitance feedback, or pure capacitance feedback.

In the third period (t3), the frequency, amplitude, and phase of the interference source will affect the polarity and value of the output voltage Vout of the charge transfer module. Therefore, the output voltage of the charge transfer module are codetermined by the charges stored in the to-be-detected capacitor Cx and the charges stored in the cancellation capacitor Cc at a moment t2, and the charges that directly enter the charge transfer module from the interference source in the period t3. It is understandable that the louder the noise is, the higher the output voltage of the charge transfer module is, and when there is no noise, the output voltage of the charge transfer module is 0.

Based on the output voltage of the charge transfer module in the period t3, whether the circuit is interfered with may be determined. When Vout=0, it means that the circuit is not affected by a noise. When Vout≠0, it means that the circuit is affected by a noise, and is interfered with. In this embodiment, the first period, the second period, and the third period are consecutive in time.

In the fourth period (t4), the control module controls the charge transfer module to reset the charge transfer module in the fourth period; and the fourth switch unit K4 is switched off, such that the amplifier in the charge transfer module is reset, and the output voltage Vout becomes 0. In addition, it should be noted that the period t4 may not be arranged, i.e., the stage t4 may be omitted. When the stage t4 is arranged, the risk of simultaneously switching on the fourth switch unit and the first switch unit K1 or the second switch unit K2 in the charge transfer module 104 can be reduced, i.e., a dead time t4 may be additionally provided to avoid simultaneously switching on the fourth switch unit and the first switch unit K1 or the second switch unit K2 in the charge transfer module 104, and maximizing the normal operation of the amplifier. It is understandable that when the fourth period is omitted, the eighth period is omitted accordingly. The first period to the third period may be referred to as the noise detection half cycle. After the output voltage of the noise detection half cycle is sampled, the noise value may be determined based on the output voltage of the noise detection half cycle. The operations from the first period to the third period (from t1 to t3) are completely repeated from the fifth period to the seventh period (from t5 to t7), or after sampling two noise detection half cycles, the noise value is determined based on the output voltage of the two noise detection half cycles, i.e., the noise value is determined based on the output voltage in the periods t1+t2+t3+t5+t6+t7. In this embodiment, the first period, the second period, the third period, and the fourth period are consecutive in time.

Figure 2B:
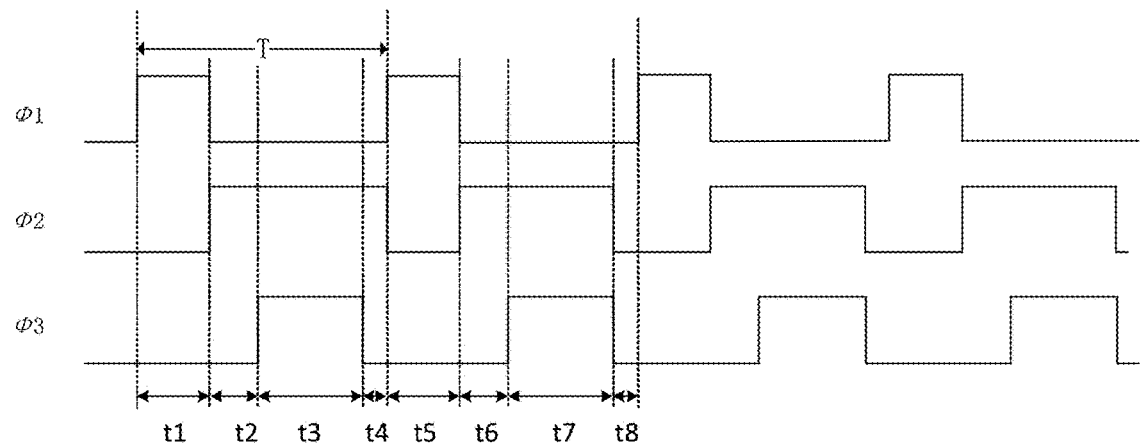
FIG. 2B is another sequence diagram for the noise detection circuit in FIG. 1A, FIG. 1B, FIG. 1C, and FIG. 1D during operation provided in an embodiment of the present disclosure.

In the period t4, the fourth switch unit K4 is switched off, and the other switches may be in any state. The other switches may also remain in the same states as at a moment t3. Specifically, the first switch unit K1, the second switch unit K2, and the third switch unit K3 may be in an off state. In addition, for the period t4, the third switch unit K3 may also be in a closed stage, i.e., as shown in FIG. 2B, at the stage t4, the first switch unit K1 and the second switch unit K2 are in the off state, the third switch unit K3 is in a closed state, and the fourth switch unit K4 is switched off. The fourth switch unit K4 is switched off, such that the amplifier in the charge transfer module is reset, and the output voltage Vout becomes 0.

As can be seen from the above description, when there is no noise, the voltage of the to-be-detected capacitor Cx and the voltage of the cancellation capacitor Cc must be Vmm at the end of the period t2 or at the end of the period t3. When there is a noise, the voltage of the to-be-detected capacitor Cx or the voltage of the cancellation capacitor Cc is not Vmm at the end of the period t2. In the period t3, the charges will be transferred, which may be understood as that the charges transfer from the to-be-detected capacitor and from the cancellation capacitor to the charge transfer module, and the noise value will affect the amount of transferred charges, such that the noise detection circuit can accurately measure a noise that affects the to-be-detected capacitor, thereby adjusting the self-capacitance detection scheme, and improving the self-capacitance detection scheme based on the detected noise that affects the to-be-detected capacitor, or further correcting the self-capacitance detection result.

In addition, the noise detection result provided in this embodiment is not affected by the approach or touch of a finger, and the noise can be accurately detected even when there is a finger touch. Specifically, when a finger touches an electrode, it may be understood that a finger capacitor Ct is in parallel to the to-be-detected capacitor Cx. In the first period, the amount of charges stored in the to-be-detected capacitor Cx is Q1=Vmm*Cx, the amount of charges stored in the cancellation capacitor Cc is Q2=Vmm*Cc, and the amount of charges stored in the finger capacitor Ct is Q3=Vmm*Ct. In the second period, assuming that there is no noise, there is Vmm*Cx+Vmm*Cc+Vmm*Ct=Vx*(Cx+Ct)±(Vx−0)*Cc in accordance with the charge conservation law, and the voltage Vx of the to-be-detected capacitor Cx is equal to Vmm. Then, in the third period, the output voltage of the charge transfer module is 0, i.e., when there is no noise, the output voltage of the charge transfer module is 0 when there is a finger touch or when there is no finger touch. In addition, when there is a noise, assuming that there is a finger touch, the voltage at the connection point between the cancellation capacitor and the to-be-detected capacitor is still Vx1 in the second period, and the amount of charges converted to generate the output voltage is Qx1=(Vx1−Vmm)*(Cx+Cc+Ct) in the third period. For self-capacitance detection, assuming that there is a noise and a finger touch, the amount of charges converted due to an interference to generate the output voltage is Qx2=(Vx2−Vmm)*(Cx+Cc+Ct) in the eleventh period of the self-capacitance detection. When the interference sources are the same, Vx1=Vx2. Therefore, the noise detection result of the noise detection circuit in this embodiment may not be affected by the approach or touch of a finger. The noise detection circuit can accurately determine a value of an interference received by the self-capacitance detection circuit regardless of the approach or touch of a finger, thereby validating whether the self-capacitance detection circuit may be used for self-capacitance detection.

In addition, the circuit shown in FIG. 1A may also be used for self-capacitance detection. Specifically, when the circuit shown in FIG. 1A is performing self-capacitance detection, the first voltage connected to the first switch unit is switched to the power supply voltage Vcc, and the first voltage connected to the second switch unit is switched to GND. In addition, a value of the to-be-detected capacitor is the same as a value of the cancellation capacitor. When the circuit shown in FIG. 1A serves as a self-capacitance detection circuit, a timing sequence of all switch units thereof is the same as that of the noise detection circuit, i.e., self-capacitance detection may be performed by referring to the timing sequence shown in FIG. 2A.

Based on the disclosures in the above embodiments, in this embodiment, the common mode voltage may be used to process the to-be-detected capacitor and the cancellation capacitor during noise detection using this scheme. Taking the self-capacitance detection circuit shown in FIG. 6 as an example, during self-capacitance detection, the non-inverting input terminal of the amplifier in the charge transfer module 603 is connected to the common mode voltage. Therefore, during noise detection, the inverting input terminal of the amplifier in the charge transfer module 104 may also be connected to the common mode voltage, such that it is not necessary to provide an additional switch to switch between the common mode voltage and the first voltage. That is, during noise detection and self-capacitance detection, the non-inverting input terminal of the amplifier is connected to the common mode voltage. In addition, when the first voltage is the common mode voltage, noise detection and self-capacitance detection have substantially the same dynamic range of the circuit. In addition, since a common mode voltage is generally provided in a circuit, the common mode voltage is used to process the to-be-detected capacitor and the cancellation capacitor, thereby avoiding generating other first voltages, and simplifying power management.

Figure 1B:
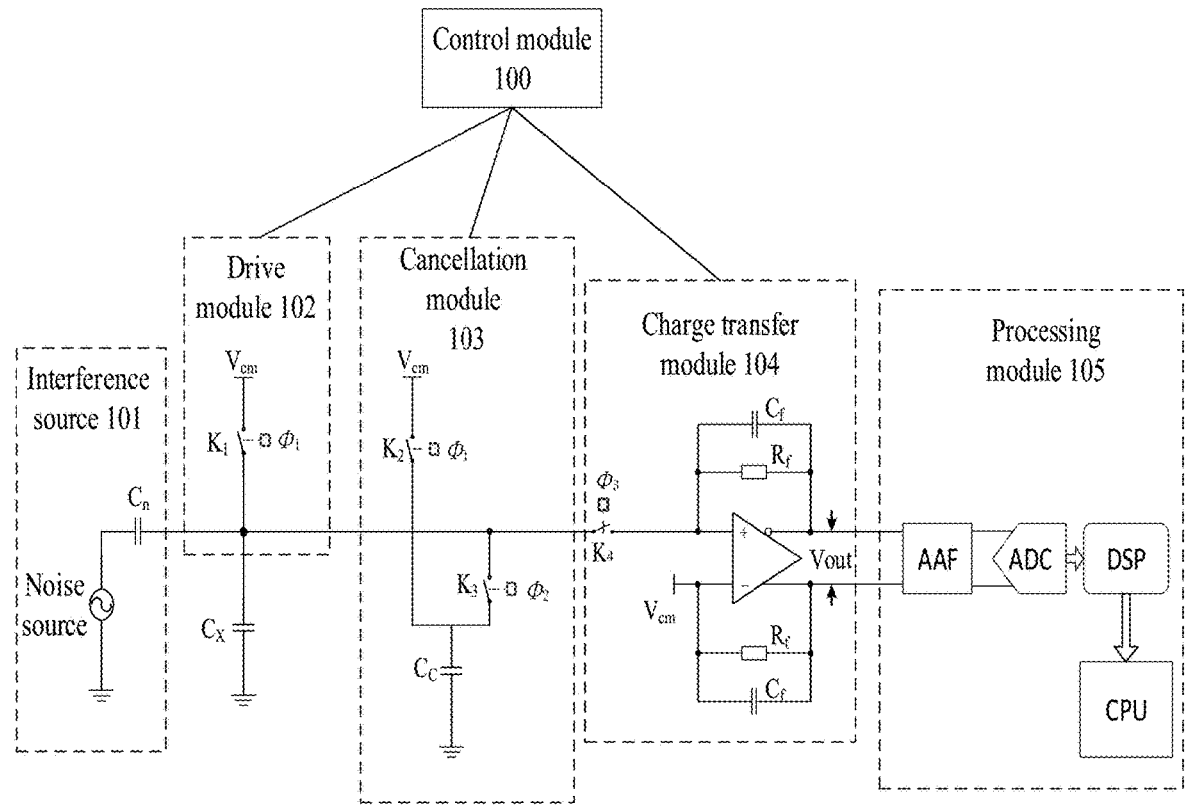
FIG. 1B is a schematic structural diagram of another noise detection circuit provided in an embodiment of the present disclosure.

In this embodiment, as shown in FIG. 1B, the first voltage Vmm may be a common mode voltage Vcm, Vcc is a positive power supply voltage, the common mode voltage is half of Vcc, and the common mode voltage may also be referred to as a common mode operating voltage. It is understandable that during self-capacitance detection, the inverting input terminal of the amplifier of the charge transfer module 104 is connected to the common mode voltage. Therefore, in this embodiment, when the first voltage is the common mode voltage, the noise detection circuit and the self-capacitance detection circuit may use the same charge transfer module 104, i.e., the switch unit may receive the common mode voltage during self-capacitance detection, and receive the first voltage during noise detection, without the need for additionally providing a switch unit at the inverting input terminal of the charge transfer module 104. In addition, the control module, the drive module, the cancellation module, the charge transfer module, and the processing module in FIG. 1B are the same as or similar to those described in the foregoing embodiments. FIG. 2A may be referred to for a sequence diagram of the switch unit included therein, and a cycle of the control signals is taken as an example for description below. Main technical processing in each period is briefly described as follows:

period t1: charging the to-be-detected capacitor Cx and the cancellation capacitor Cc with the common mode voltage Vcm;

period t2: connecting the first terminal of the to-be-detected capacitor Cx to the first terminal of the cancellation capacitor Cc, disconnecting the first terminal of the to-be-detected capacitor Cx from the common mode voltage Vcm, and disconnecting the first terminal of the cancellation capacitor Cc from the common mode voltage Vcm.

period t3: converting the charges of the to-be-detected Cx and the charges of the cancellation capacitor Cc into a voltage signal by charge transfer; and period t4: resetting the fully differential amplifier.

After t4, there may also be t5 to t8 during which the operations from t1 to t4 are repeated, i.e., the noise value may also be determined based on the output voltage in twice the noise detection half cycle. Specifically, when it is intended to detect the noise value of the self-capacitance detection circuit at an operating frequency of f1, the demodulation frequency of the self-capacitance detection circuit is also f1, and the noise value may be determined based on the output voltage in a period 1/f1. For example, 1/f1 may be equal to t1+t2+t3+t4, or 1/f1=2 (t1+t2+t3+t4), and when the self-capacitance detection circuit can acquire a self-capacitance value within the time length of t1+t2+t3+t4, the noise detection circuit can determine the noise of the self-capacitance detection circuit based on the output voltage in the time length of t1+t2+t3+t4. For another example, when the self-capacitance detection circuit can acquire the self-capacitance value in the time length of 2 (t1+t2+t3+t4), the noise detection circuit can determine the noise value of the self-capacitance detection circuit based on the output voltage in the time length of 2 (t1+t2+t3+t4).

In the period t1, the first switch unit K1 and the second switch unit K2 are switched on (i.e., in the closed state), the third switch unit K3 and the fourth switch unit K4 are switched off, both the first terminal of the to-be-detected capacitor Cx and the first terminal of the cancellation capacitor Cc are connected to the common mode voltage Vcm, both the second terminal of the to-be-detected capacitor Cx and the second terminal of the cancellation capacitor Cc are connected to GND, and the to-be-detected capacitor Cx and the cancellation capacitor Cc are charged simultaneously. At the end of the period t1, the voltage of the to-be-detected capacitor Cx is the common mode voltage Vcm, and the voltage of the cancellation capacitor Cc is the common mode voltage Vcm. In addition, since the fourth switch unit K4 is switched off, the output voltage Vout of the charge transfer module is 0. In this case, the amount of charges stored in the to-be-detected capacitor Cx is Q1=Vcm*Cx, and the amount of charges stored in the cancellation capacitor Cc is Q2=Vcm*Cc.

In the period t2, the first switch unit K1 and the second switch unit K2 are switched off, the third switch unit K3 is closed, and the fourth switch unit K4 is switched off. In this case, the first terminal of the to-be-detected capacitor Cx is connected to the first terminal of the cancellation capacitor Cc, and the second terminal of the to-be-detected capacitor Cx and the second terminal of the cancellation capacitor Cc are both grounded. When there is no noise (ideally), there is Vcm*Cx+Vcm*Cc=Vx*Cx+(Vx−0)*Cc in accordance with the charge conservation law, and the voltage Vx of the to-be-detected capacitor Cx is equal to Vcm; while when there is a noise, the charges stored in the to-be-detected capacitor Cx and the charges stored in the cancellation capacitor Cc change, the to-be-detected capacitor Cx and the cancellation capacitor Cc are charged or discharged simultaneously, and the voltage Vx of the to-be-detected capacitor Cx is not equal to Vcm, for example, Vx>Vcm or Vx<Vcm.

In the period t3, the first switch unit K1 and the second switch unit K2 are switched off, the third switch unit K3 is closed, and the fourth switch unit K4 is closed. Based on the value of the voltage Vx of the to-be-detected capacitor Cx, there are the following situations:

When Vx>Vcm, the to-be-detected capacitor Cx and the cancellation capacitor Cc transfer charges to the charge transfer module simultaneously, until the voltage Vx of the to-be-detected capacitor Cx reaches Vcm.

When Vx=Vcm, there is not a process of transferring charges from the to-be-detected capacitor Cx and the cancellation capacitor Cc to the charge transfer module, and the output voltage Vout of the charge transfer module is 0. In this case, the circuit is not affected by the noise.

When Vx<Vcm, the charge transfer module will charge the to-be-detected capacitor Cx and the cancellation capacitor Cc via a feedback network (composed of Rf and Cf), until both the voltage of the to-be-detected capacitor Cx and the voltage of the cancellation capacitor Cc reach Vcm.

During the period t4, the first switch unit K1, the second switch unit K2, and the third switch unit K3 are in the off state, and the fourth switch unit K4 is switched off, such that the amplifier in the charge transfer module is reset, and the output voltage Vout becomes 0. It is understandable that the output voltage Vout may not be 0 in the third period. Therefore, the output voltage Vout may not be 0, but gradually becomes 0 with a certain trend in the fourth period.

As can be seen from the above description, when there is no noise, the voltage of the to-be-detected capacitor Cx and the voltage of the cancellation capacitor Cc must be Vcm at the end of the period t2 or at the end of the period t3. When there is a noise, the voltage of the to-be-detected capacitor Cx or the voltage of the cancellation capacitor Cc is not Vcm at the end of the period t2. In the period t3, the charges will be transferred, and the noise value will affect the amount of transferred charges, such that the noise detection circuit can accurately measure a noise that affects the to-be-detected capacitor, thereby adjusting the self-capacitance detection scheme, and improving the self-capacitance detection scheme, or further correcting the self-capacitance detection result.

Figure 1C:
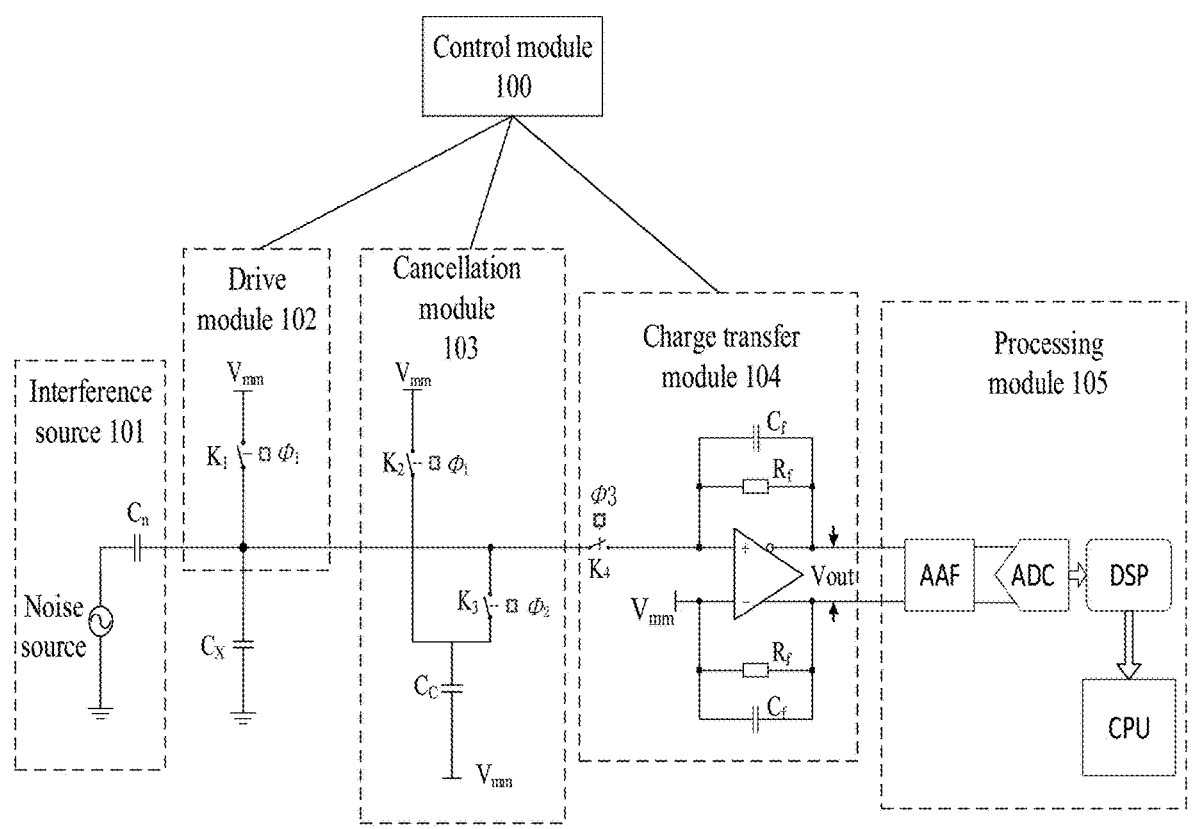
FIG. 1C is a schematic structural diagram of another noise detection circuit provided in an embodiment of the present disclosure.

Based on the disclosures in the above embodiments, in this embodiment, as shown in FIG. 1C, the control module 100 is configured to control the drive module 102 to charge the to-be-detected capacitor Cx with the first voltage Vmm, which is different from FIG. 1A in that the control module 100 is configured to control the cancellation module 103 such that both terminals of the cancellation capacitor Cc are connected to the first voltage Vmm. In addition, the control module 100 controls the cancellation module 103 such that the first terminal of the cancellation capacitor Cc is connected to the first terminal of the to-be-detected capacitor Cx in the second period and the third period. The second terminal of the to-be-detected capacitor Cx is grounded, and the second terminal of the cancellation capacitor is connected to the first voltage Vmm. In addition, the control module, the drive module, the cancellation module, the charge transfer module, and the processing module in FIG. 1C are the same as or similar to those described in the foregoing embodiments. FIG. 2A may be referred to for a sequence diagram of the switch units included therein, and a cycle of the control signals is taken as an example for description below. Main technical processing in each period is briefly described as follows:

period t1: charging the to-be-detected capacitor Cx with the first voltage Vmm, and inputting the first voltage Vmm to both the first terminal and the second terminal of the cancellation capacitor Cc;

period t2: connecting the first terminal of the to-be-detected capacitor Cx to the first terminal of the cancellation capacitor Cc, disconnecting the first terminal of the to-be-detected capacitor Cx from the first voltage Vmm, and disconnecting the first terminal of the cancellation capacitor Cc from the first voltage Vmm;

period t3: converting the charges of the to-be-detected Cx and the charges of the cancellation capacitor Cc into a voltage signal by charge transfer; and period t4: resetting the fully differential amplifier.

In the period t1, the first switch unit K1 and the second switch unit K2 are switched on (i.e., in the closed state), the third switch unit K3 and the fourth switch unit K4 are switched off, both the first terminal of the to-be-detected capacitor Cx and the first terminal of the cancellation capacitor Cc are connected to the first voltage Vmm, the second terminal of the to-be-detected capacitor Cx is connected to GND, the second terminal of the cancellation capacitor Cc is connected to the first voltage Vmm, and the to-be-detected capacitor Cx is charged in the first period. At the end of the period t1, the voltage of the to-be-detected capacitor Cx is the first voltage Vmm, and the voltage of the cancellation capacitor Cc is 0. In addition, since the fourth switch unit K4 is switched off, the output voltage Vout of the charge transfer module is 0. In this case, the amount of charges stored in the to-be-detected capacitor Cx is $Q1=Vcm*Cx$, and the amount of charges stored in the cancellation capacitor Cc is $Q2=0*Cc$.

In the period t2, the first switch unit K1 and the second switch unit K2 are switched off, the third switch unit K3 is closed, and the fourth switch unit K4 is switched off. In this case, the first terminal of the to-be-detected capacitor Cx is connected to the first terminal of the cancellation capacitor Cc, the second terminal of the to-be-detected capacitor Cx is grounded, and the second terminal of the cancellation capacitor Cc is connected to the first voltage Vmm. When there is no noise (ideally), there is $Vmm*Cx+0*Cc=Vx*Cx+(Vx-Vmm)*Cc$ in accordance with the charge conservation law, and the voltage Vx of the to-be-detected capacitor Cx is equal to Vmm; while when there is a noise, the charges stored in the to-be-detected capacitor Cx and the charges stored in the cancellation capacitor Cc change, the to-be-detected capacitor Cx and the cancellation capacitor Cc are charged or discharged simultaneously, and the voltage Vx of the to-be-detected capacitor Cx is not equal to Vmm, for example, Vx>Vmm or Vx<Vmm.

In the period t3, the first switch unit K1 and the second switch unit K2 are switched off, the third switch unit K3 is closed, and the fourth switch unit K4 is closed. Based on the value of the voltage Vx of the to-be-detected capacitor Cx, there are the following situations:

When Vx>Vmm, the to-be-detected capacitor Cx and the cancellation capacitor Cc transfer charges to the charge transfer module simultaneously, until the voltage Vx of the to-be-detected capacitor Cx reaches Vcm.

When Vx=Vcm, there is not a process of transferring charges from the to-be-detected capacitor Cx and the cancellation capacitor Cc to the charge transfer module, and the output voltage Vout of the charge transfer module is 0. In this case, the circuit is not affected by the noise.

When Vx<Vcm, the charge transfer module will charge the to-be-detected capacitor Cx and the cancellation capacitor Cc via a feedback network (composed of Rf and Cf), until both the voltage of the to-be-detected capacitor Cx and the voltage of the cancellation capacitor Cc reach Vcm.

In the period t4, the first switch unit K1 is switched off, the second switch unit K2, and the third switch unit K3 are in the off state, and the fourth switch unit K4 is switched off, such that the amplifier in the charge transfer module is reset, and the output voltage Vout becomes 0.

Figure 1D:
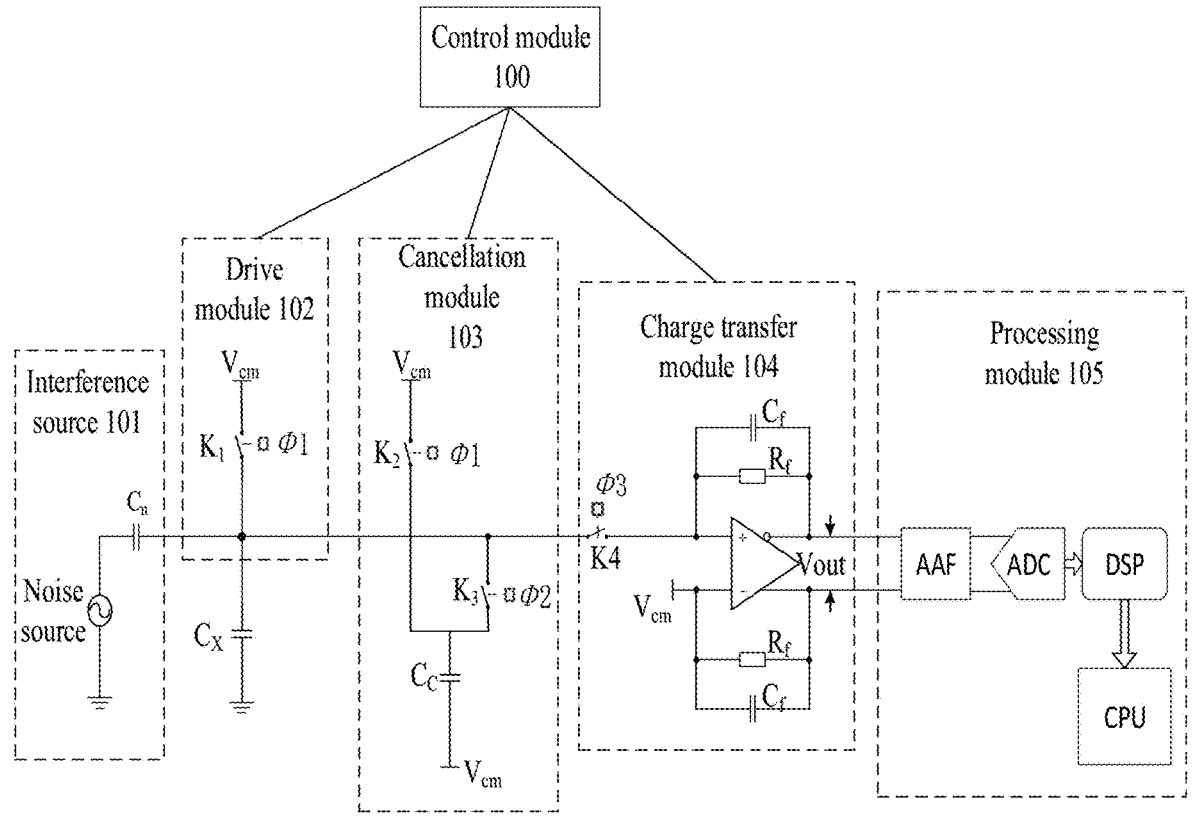
FIG. 1D is a schematic structural diagram of another noise detection circuit provided in an embodiment of the present disclosure.

Based on the disclosures in the above embodiments, in this embodiment, as shown in FIG. 1D and different from FIG. 1C, the first voltage is the common mode voltage Vcm. In addition, the control module, the drive module, the cancellation module, the charge transfer module, and the processing module in FIG. 1D are the same as or similar to those described in the foregoing embodiments. FIG. 2A may be referred to for a sequence diagram of the switch units included therein, and a cycle of the control signals is taken as an example for description below. Main technical processing in each period is briefly described as follows:

period t1: charging the to-be-detected capacitor Cx with the common mode voltage Vcm, and inputting the common mode voltage Vcm to the first terminal and the second terminal of the cancellation capacitor Cc;

period t2: connecting the first terminal of the to-be-detected capacitor Cx to the first terminal of the cancellation capacitor Cc, disconnecting the first terminal of the to-be-detected capacitor Cx from the common mode voltage Vcm, and disconnecting the first terminal of the cancellation capacitor Cc from the common mode voltage Vcm;

period t3: converting the charges of the to-be-detected Cx and the charges of the cancellation capacitor Cc into a voltage signal by charge transfer; and period t4: resetting the fully differential amplifier.

In the period t1, the first switch unit K1 and the second switch unit K2 are switched on (i.e., in the closed state), the third switch unit K3 and the fourth switch unit K4 are switched off, both the first terminal of the to-be-detected capacitor Cx and the first terminal of the cancellation capacitor Cc are connected to the common mode voltage Vcm, the second terminal of the to-be-detected capacitor Cx is connected to GND, and the second terminal of the cancellation capacitor Cc is the common mode voltage Vcm. In the first period, the to-be-detected capacitor Cx is charged. At the end of the period t1, the voltage of the to-be-detected capacitor Cx is Vcm, and the voltage of the cancellation capacitor Cc is 0. In addition, since the fourth switch unit K4 is switched off, the output voltage Vout of the charge transfer module is 0. In this case, the amount of charges stored in the to-be-detected capacitor Cx is Q1=Vcm*Cx, and the amount of charges stored in the cancellation capacitor Cc is Q2=0.

In the second period t2, the first switch unit K1 and the second switch unit K2 are switched off, the third switch unit K3 is closed, and the fourth switch unit K4 is disconnected. When there is no noise (ideally), there is Vcm*Cx+0=Vx*Cx+(Vx−Vcm)*Cc in accordance with the charge conservation law, and the voltage Vx of the to-be-detected capacitor Cx is equal to Vcm; while when there is a noise, the charges stored in the to-be-detected capacitor Cx and the charges stored in the cancellation capacitor Cc change, the to-be-detected capacitor Cx and the cancellation capacitor Cc are charged or discharged simultaneously, and the voltage Vx of the to-be-detected capacitor Cx is not equal to Vcm, for example, Vx>Vcm or Vx<Vcm.

In the period t3, the first switch unit K1 and the second switch unit K2 are switched off, the third switch unit K3 is closed, and the fourth switch unit K4 is closed. Based on the value of the voltage Vx of the to-be-detected capacitor Cx, there are the following situations:

When Vx>Vcm, the to-be-detected capacitor Cx and the cancellation capacitor Cc transfer charges to the charge transfer module simultaneously, until the voltage Vx of the to-be-detected capacitor Cx reaches Vcm.

When Vx=Vcm, there is not a process of transferring charges from the to-be-detected capacitor Cx and the cancellation capacitor Cc to the charge transfer module, and the output voltage Vout of the charge transfer module is 0. In this case, there is no noise in the circuit.

When Vx<Vcm, the charge transfer module will charge the to-be-detected capacitor Cx and the cancellation capacitor Cc via a feedback network (composed of Rf and Cf), until both the voltage of the to-be-detected capacitor Cx and the voltage of the cancellation capacitor Cc reach Vcm.

The situation in the period t4 is similar to that in the foregoing embodiments, and the description will not be repeated here.

Figure 2C:
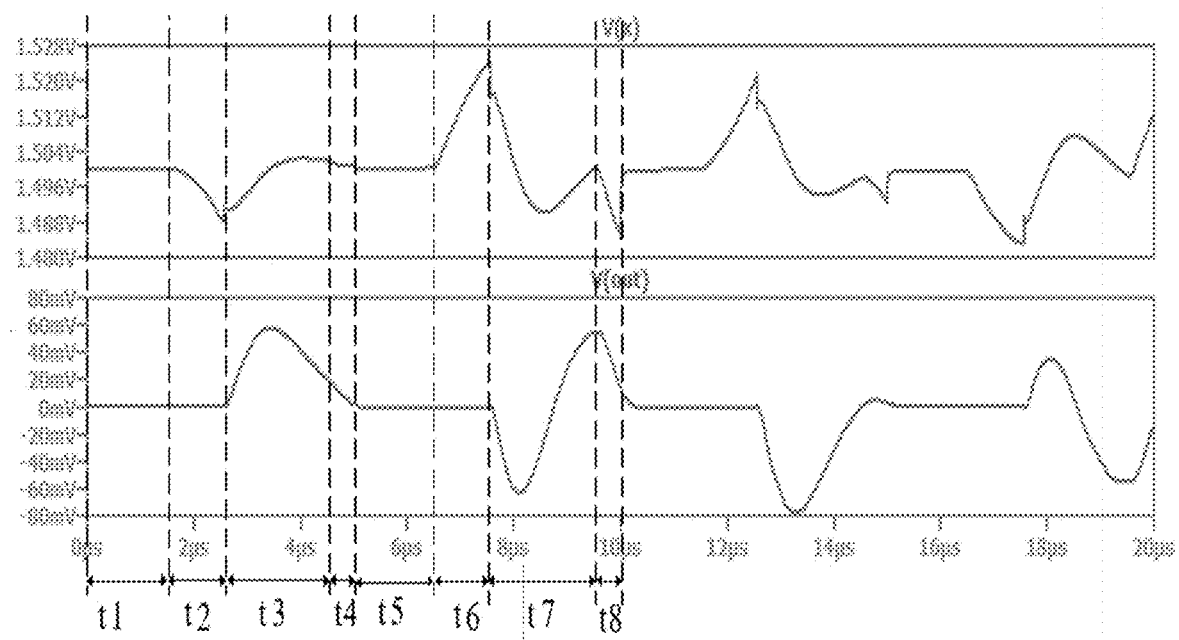
FIG. 2C is an oscillogram of Vx and Vout in a simulated noise detection circuit provided in an embodiment of the present disclosure.

A simulation waveform is taken as an example to describe Vx and Vout in each period. Referring to FIG. 2C, in FIG. 2C, V(x) denotes the voltage Vx at the first terminal of the to-be-detected capacitor or at the first terminal of the cancellation capacitor, and V(out) denotes the output voltage Vout of the charge transfer module. The first voltage Vmm=1.5V is taken as an example for description.

In the period t1, the to-be-detected capacitor Cx and the cancellation capacitor Cc are charged with the first voltage Vmm, or in the period t1, the to-be-detected capacitor Cx is charged with the first voltage Vmm, and the first terminal and the second terminal of the cancellation capacitor are connected to the first voltage Vmm. In both cases, Vx is Vmm. In this case, the fourth switch unit is in an off state, and the output voltage Vout=0;

in the period t2, the first terminal of the to-be-detected capacitor Cx is connected to the first terminal of the cancellation capacitor Cc, and the interference source affects the amount of charges of the to-be-detected capacitor and the amount of charges of the cancellation capacitor. Therefore, the voltage Vx is not Vmm, for example, Vx<Vmm. Since the fourth switch unit is in the off state, the output voltage Vout=0;

in the period t3, the charges of the to-be-detected Cx and the charges of cancellation capacitor Cc are converted into a voltage signal by charge transfer, the voltage of the to-be-detected Cx and the voltage of the cancellation capacitor Cc gradually return to the first voltage Vmm, and the fourth switch unit is in the closed state. In the period t3, Vx<Vmm, and the output voltage Vout>0;

in the period t4, the fully differential amplifier is reset, the fourth switch unit is in the off state, and Vout gradually returns to 0;

in the stage t5, the to-be-detected capacitor Cx and the cancellation capacitor Cc are charged with the first voltage Vmm, or in the period t1, the to-be-detected capacitor Cx is charged with the first voltage Vmm, and the first terminal and the second terminal of the cancellation capacitor are connected to the first voltage Vmm. In both cases, Vx is Vmm. In this case, the fourth switch unit is in the off state, and the output voltage gradually returns to 0. When the output voltage returns to 0 in the fourth period, the output voltage Vout remains to be 0 in the fifth period;

in the period t6, the first terminal of the to-be-detected capacitor Cx is connected to the first terminal of the cancellation capacitor Cc, and the interference source affects the amount of charges of the to-be-detected capacitor and the amount of charges of the cancellation capacitor. Therefore, the voltage Vx is not Vmm, for example, Vx>Vmm. Since the fourth switch unit is in the off state, the output voltage Vout gradually returns to 0. When the output voltage gradually returns to 0 in the fifth period, the output voltage Vout remains to be 0 in the sixth period;

in the period t7, the charges of the to-be-detected Cx and the charges of the cancellation capacitor Cc are converted into a voltage signal by charge transfer, the voltage of the to-be-detected Cx and the voltage of the cancellation capacitor Cc gradually return to the first voltage, and the fourth switch unit is in the closed state. At the commencement of the period t6, Vx>Vmm, the output voltage Vout<0, and subsequently Vout gradually rises to 0 again due to the influence of the interference source in this stage; and in the period t8, the fully differential amplifier is reset, the fourth switch unit is in the off state, and Vout gradually returns to 0.

In this embodiment, the period t1 is shorter than 2 us, and the period t2 is about 1 us. Specifically, the period t2 is shorter than 1 us, the period t3 is about 2 us, and the period t4 is shorter than 1 us. Therefore, the length of each period is very short, and the noise can be detected very quickly. It takes 5 us to achieve the noise measurement, i.e., the noise detection half cycle may be 5 us. It may take about 5 us to offer the noise value of the noise detection circuit operating at f=1/(5 us)=0.2*106 Hz. When the measured noise amplitude is less than a preset noise threshold, the self-capacitance detection circuit may detect the self-capacitance at an operating frequency of f=0.2*106 Hz. It may also take 10 us to achieve the noise measurement, i.e., the noise detection cycle is 10 us. It may take about 10 us to offer the noise value of the noise detection circuit operating at f=1/(10 us)=105

Hz. When the measured noise amplitude is less than the preset noise threshold, the self-capacitance detection circuit may detect the self-capacitance at an operating frequency of f=105 Hz. In other embodiments, a sum of the first period, the second period, the third period, and the fourth period may also be less than 10 us. For example, the sum of the first period, the second period, the third period, and the fourth period may also be less than 5 us.

Figure 3:
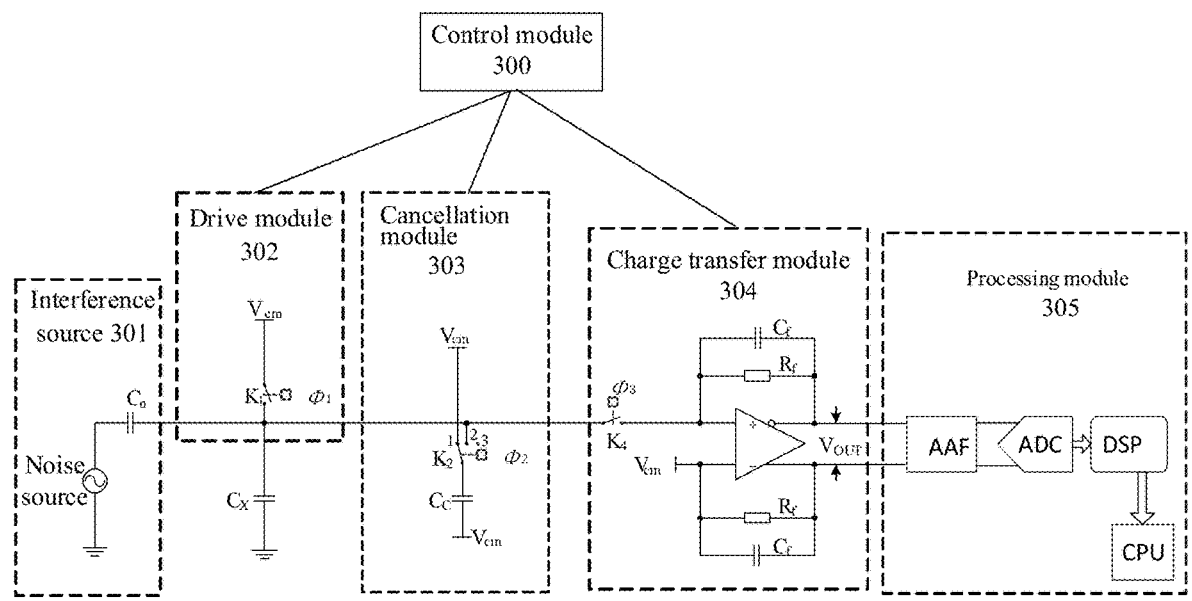
FIG. 3 is a schematic structural diagram of another noise detection circuit provided in an embodiment of the present disclosure.

Based on the disclosures in the above embodiments, in this embodiment, as shown in FIG. 3, the interference source 301, the drive module 302, the charge transfer module 304, and the processing module 305 are the same as or similar to those in the foregoing embodiments, and the description will not be repeated here. This embodiment is described by taking the first voltage being the common mode voltage Vcm as an example. The control module 300 is configured to control the drive module 302 to charge the to-be-detected capacitor with the common mode voltage, and control the cancellation module 303 to input the common mode voltage to both the first terminal and the second terminal of the cancellation capacitor.

As shown in FIG. 3, the cancellation module 303 includes a second switch unit K2 (e.g., a single switch implementation). In this embodiment, the second switch unit K2 is a switch with three contacts, and the second terminal of the cancellation capacitor Cc is connected to Vcm. Specifically, when the control module 300 controls the second switch unit K2 to be at contact 1 (a contact of the second switch unit is connected to the contact 1), the first terminal of the cancellation capacitor Cc is connected to Vcm, such that both terminals of the cancellation capacitor Cc are connected to Vcm in the first period. Specifically, in the second period and the third period, the second switch unit K2 is at contact 2 (a contact of the second switch unit is connected to the contact 2), and the first terminal of the cancellation capacitor Cc is connected to the first terminal of the to-be-detected capacitor Cx. the second terminal of the cancellation capacitor Cc is connected to Vcm. Specifically, in the fourth period, the second switch unit K2 is at contact 3 (the contact of the second switch unit is connected to the contact 3), the first terminal of the cancellation capacitor Cc is suspended, i.e., it may be understood that the cancellation capacitor Cc is disconnected from the to-be-detected capacitor Cx, and the cancellation capacitor Cc is not connected to the circuit.

When the control module 300 controls the contact of the second switch unit K2 to be at the contact 2, the to-be-detected capacitor Cx and the cancellation capacitor Cc form a closed branch. At the end of the stage t2, the amount of charges stored in the to-be-detected capacitor is different from the amount of charges stored in the cancellation capacitor. Influenced by the noise, a voltage Vx at a connection point between the cancellation capacitor Cc and the to-be-detected capacitor Cx will change, and the cancellation capacitor Cc and the to-be-detected capacitor Cx will be charged or discharged. Therefore, at the end of the stage t2, the voltage at the connection point between the cancellation capacitor Cc and the to-be-detected capacitor Cx is not Vmm.

Figure 4:
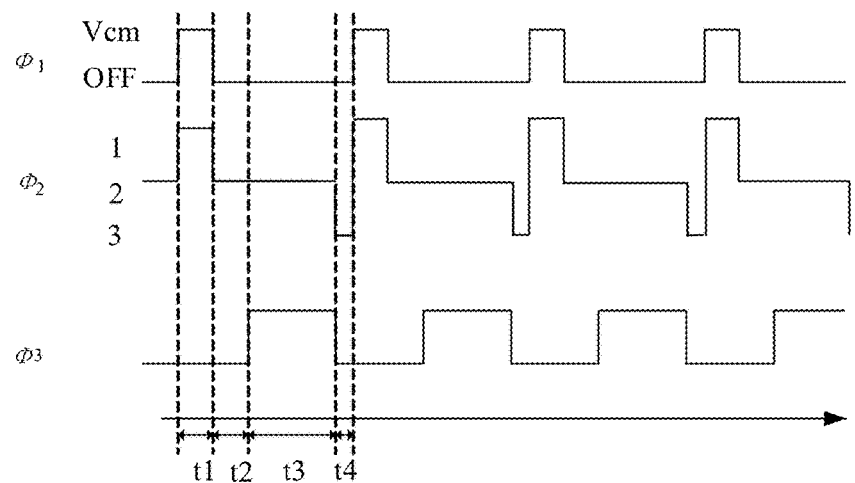
FIG. 4 is a sequence diagram for the noise detection circuit in FIG. 3 during operation provided in an embodiment of the present disclosure.

In this embodiment, FIG. 4 is referred to for states of the first switch unit K1, the second switch unit K2, and the fourth switch unit K4. FIG. 4 is a sequence diagram for the noise detection circuit during operation in FIG. 3 in this embodiment of the present disclosure. As shown in FIG. 4, the periods t1 to t4 constitute a cycle of the control signals φ1, φ2, and φ3. The periods t1 to t4 are taken as an example for brief description as follows:

period t1: charging the to-be-detected capacitor Cx with the common mode voltage, and inputting the common mode voltage to both terminals of the cancellation capacitor Cc;

period t2: connecting the first terminal of the to-be-detected capacitor Cx to the first terminal of the cancellation capacitor Cc, disconnecting the first terminal of the to-be-detected capacitor Cx from the common mode voltage, and disconnecting the first terminal of the cancellation capacitor Cc from the common mode voltage;

period t3: converting the charges of the to-be-detected Cx and the charges of the cancellation capacitor Cc into a voltage signal by charge transfer; and period t4: resetting the fully differential amplifier.

In the period t1, the first switch unit K1 is switched on (i.e., in the closed state), the second switch unit K2 is connected to the contact 1 (i.e., the second switch unit is in a first closed state), and the fourth switch unit K4 is switched off. The to-be-detected capacitor Cx is charged, and both terminals of the cancellation capacitor Cc are connected to the common mode voltage. At the end of the period t1, the voltage of the to-be-detected capacitor Cx is Vcm, and the voltage of the cancellation capacitor Cc is 0. In addition, since the fourth switch unit K4 is switched off, the output voltage Vout of the charge transfer module is 0. In this case, the amount of charges stored in the to-be-detected capacitor Cx is Q1=Vcm*Cx, and the amount of charges stored in the cancellation capacitor Cc is Q2=0.

In the period t2, the first switch unit K1 is switched off, the second switch unit K2 is connected to the contact 2 (the second switch unit is in a second closed state), and the fourth switch unit K4 is switched off. When there is no noise (ideally), there is Vcm*Cx++0=Vx*Cx+(Vx−Vcm)*Cc, and the voltage Vx of the to-be-detected capacitor Cx is equal to Vcm; while when there is a noise, the charges stored in the to-be-detected capacitor Cx and the charges stored in the cancellation capacitor Cc change, which may be understood as that in the stage t2, when there is a noise, the to-be-detected capacitor Cx is charged, and the cancellation capacitor Cc is charged, or the to-be-detected capacitor Cx is discharged, and the cancellation capacitor Cc is discharged. That is, when there is a noise, the voltage Vx of the capacitor to-be-detected capacitor Cx is not equal to Vcm, i.e., Vx>Vcm or Vx<Vcm.

In the period t3, the first switch unit K1 is switched off, the second switch unit K2 remains to be connected to the contact 2, and the fourth switch unit K4 is closed. Based on the value of the voltage Vx of the to-be-detected capacitor Cx, there are the following situations:

When Vx>Vcm, the to-be-detected capacitor Cx and the cancellation capacitor Cc transfer charges to the charge transfer module simultaneously, until the voltage Vx of the to-be-detected capacitor Cx reaches Vcm.

When Vx=Vcm, then there is not a process of transferring charges from the to-be-detected capacitor Cx and the cancellation capacitor Cc to the charge transfer module, and the output voltage Vout of the charge transfer module is 0, which means that there is no noise.

When Vx<Vcm, the charge transfer module will charge the to-be-detected capacitor Cx and the cancellation capacitor Cc via a feedback network (composed of Rf and Cf), until both the voltage of the to-be-detected capacitor Cx and the voltage of the cancellation capacitor Cc reach Vcm.

In the period t4, the first switch unit K1 is switched off, a contact terminal of the second switch unit K2 is connected to the contact 3, and the fourth switch unit K4 is switched off. When the second switch unit is connected to the contact 3, it may also be referred to as the second switch unit being in the off state. In the stage t4, the charge transfer module 304 is reset, and the output voltage Vout becomes 0. In addition, in the period t4, the contact terminal of the second switch unit K2 may also be connected to the contact 2, i.e., in this embodiment, the contact 3 may not be provided.

As can be seen from the above description, when there is no noise, the voltage of the to-be-detected capacitor Cx must be Vcm at the end of the period t2. When there is a noise, the voltage of the to-be-detected capacitor Cx or the voltage of the cancellation capacitor Cc is not Vcm at the end of the period t2. In the period t3, the charges will be transferred, and the noise value will affect the amount of transferred charges, such that the noise detection circuit can accurately measure a noise that affects the to-be-detected capacitor, thereby adjusting the self-capacitance detection scheme, and improving the self-capacitance detection scheme based on the detected noise that affects the to-be-detected capacitor, or further correcting the self-capacitance detection result.

Figure 5:
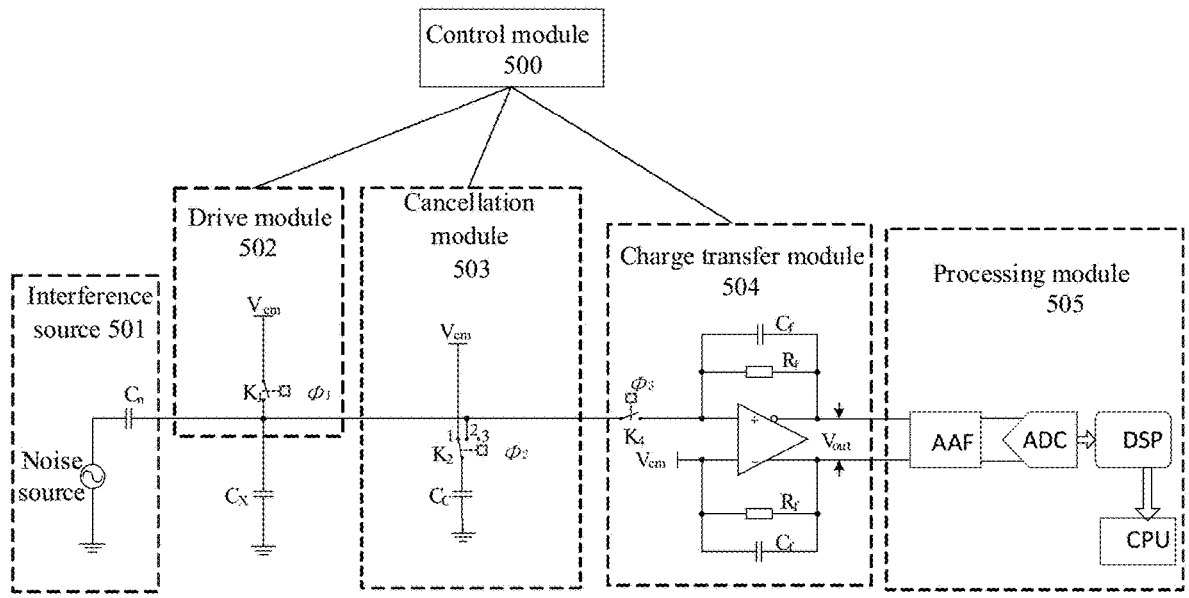
FIG. 5 is a schematic structural diagram of another noise detection circuit provided in an embodiment of the present disclosure.

Based on the disclosures in the above embodiments, in this embodiment, FIG. 5 shows the noise detection circuit of this embodiment. An interference source 501, a drive module 502, a charge transfer module 504, and a processing module 505 are the same as or similar to those in the foregoing embodiments. The description will not be repeated here. Different from FIG. 3, the second terminal of the cancellation capacitor in the cancellation module is grounded, and accordingly, FIG. 4 may be referred to for states of the first switch unit K1, the second switch unit K2, and the fourth switch unit K4, which are presented below with reference to specific periods.

period t1: charging the to-be-detected capacitor Cx and the cancellation capacitor Cc with the common mode voltage;

period t2: connecting the first terminal of the to-be-detected capacitor Cx to the first terminal of the cancellation capacitor Cc, disconnecting the first terminal of the to-be-detected capacitor Cx from the common mode voltage Vcm, and disconnecting the first terminal of the cancellation capacitor Cc from the common mode voltage Vcm;

period t3: converting the charges of the to-be-detected Cx and the charges of the cancellation capacitor Cc into a voltage signal by charge transfer; and period t4: resetting the fully differential amplifier.

In the period t1, the first switch unit K1 is switched on (i.e., in the closed state), the contact terminal of the second switch unit K2 is connected to the contact 1 (the second switch unit is in the first closed state), the fourth switch unit K4 is switched off, the to-be-detected capacitor Cx is charged, and the cancellation capacitor Cc is charged. At the end of the period t1, the voltage of the to-be-detected capacitor Cx is Vcm, and the voltage of the cancellation capacitor Cc is Vcm. In addition, since the fourth switch unit K4 is switched off, the output voltage Vout of the charge transfer module is 0. In this case, the amount of charges stored in the to-be-detected capacitor Cx is $Q1=Vcm*Cx$, and the amount of charges stored in the cancellation capacitor Cc is $Q2=Vcm*Cc$.

In the period t2, the first switch unit K1 is switched off, the second switch unit K2 is connected to the contact 2 (the second switch unit is in a second closed state), and the fourth switch unit K4 is switched off. When there is no noise, there is $Vcm*Cx+Vcm*Cc=Vx*Cx+(Vx-0)*Cc$ in accordance with the charge conservation law, and the voltage Vx of the to-be-detected capacitor Cx is equal to Vcm; while when there is a noise, the charges stored in the to-be-detected capacitor Cx and the charges stored in the cancellation capacitor Cc change, and the voltage Vx of the to-be-detected capacitor Cx is not equal to Vcm, for example, Vx>Vcm or Vx<Vcm. In addition, the situations in the period t3 and the period t4 are similar to those in the foregoing embodiments, and the description will not be repeated here.

Figure 6:
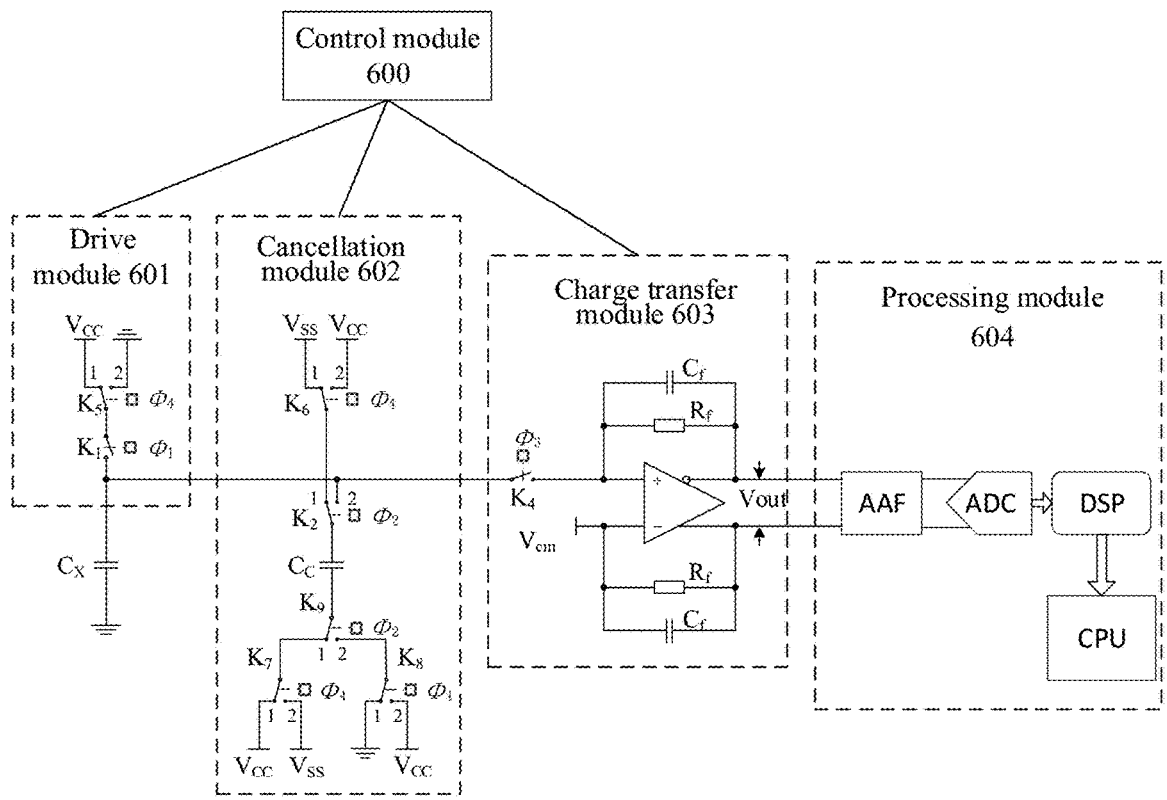
FIG. 6 is a schematic structural diagram of a self-capacitance detection circuit provided in an embodiment of the present disclosure.

Based on the disclosures in the foregoing embodiments, in this embodiment, the control module is further configured to switch the first voltage, such that the control module controls the drive module, the cancellation module, the charge transfer module, and the processing module to perform self-capacitance detection. The following description is provided based on the capacitance detection circuit, with reference to the self-capacitance detection circuit shown in FIG. 6 and the sequence diagram of the capacitance detection circuit shown in FIG. 7. When the self-capacitance detection circuit shown in FIG. 6 is performing self-capacitance detection, a value of Vss may be equal to GND or −Vcc. When Vss=GND, and Cc=Cx/3, the circuit is completely cancelled; while when Vss=−Vcc, and Cc=Cx/5, the circuit is completely cancelled. When reaching a completely cancel state, the circuit can completely cancel base capacitance of the to-be-detected capacitor Cx, while when there is a touch, capacitance of the to-be-detected capacitor Cx becomes higher on the basis of the base capacitance thereof, and the voltage of the output voltage Vout is completely caused by the touch. Accordingly, the self-capacitance detection circuit in this state has a highest detection sensitivity.

Figure 7:
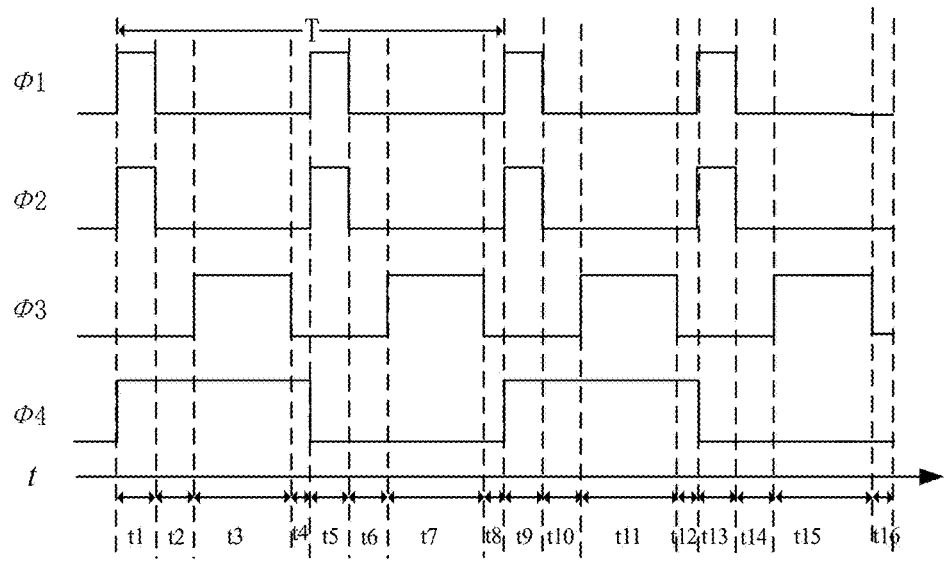
FIG. 7 is a sequence diagram for the self-capacitance detection circuit in FIG. 6 during operation provided in an embodiment of the present disclosure, and is also a sequence diagram for a noise detection circuit in FIG. 8 during operation.

A ninth period to a sixteenth period (t9 to t16) are taken as an example for description with reference to FIG. 7. During the self-capacitance detection, the to-be-detected capacitor and the cancellation capacitor are charged in the ninth period, and charge cancelling is performed on the to-be-detected capacitor and the cancellation capacitor in the tenth period; charge transfer is performed on the to-be-detected capacitor and the cancellation capacitor in the eleventh period; the charge transfer module is reset in the twelfth period; and the ninth period, the tenth period, and eleventh period, and the twelfth period may correspond to the charging time, the cancel time, the charge transfer time, and the dead time respectively. The to-be-detected capacitor is discharged and the cancellation capacitor is charged in the thirteenth period; charge cancelling is performed on the to-be-detected capacitor and the cancellation capacitor in the fourteenth period; charge transfer is performed on the charges of the to-be-detected capacitor and the charges of the cancellation capacitor in the fifteenth period; the charge transfer module is reset in the sixteenth period; and the thirteenth period, the fourteenth period, the fifteenth period, and the sixteenth period may also correspond to the charging time, the cancel time, the charge transfer time, and the dead time respectively. A length of the ninth period is equal to a length of the thirteenth period, a length of the tenth period is equal to a length of the fourteenth period, a length of the eleventh period is equal to a length of the fifteenth period, and a length of the twelfth period is equal to a length of the sixteenth period. During the self-capacitance detection, there is charge transfer in the period t10, i.e., the charges of the to-be-detected capacitor are transferred to the cancellation capacitor, or the charges of the cancellation capacitor are transferred to the to-be-detected capacitor. When t2 is not provided during noise detection, in the period t3 of noise detection, only the charges of the interference source will be transferred to the charge transfer module, and the charges of the cancellation capacitor and the charges of the to-be-detected capacitor will not be transferred to the charge transfer module, while during self-capacitance detection, the charges generated by charging or discharging of the cancellation capacitor and the to-be-detected capacitor will be transferred to the charge transfer module by the interference source. Therefore, during noise detection, t2 is also required to be provided, such that the detected noise may be closer to the noise during self-capacitance detection, the detection is more accurate, and the noise measured during noise detection may be as consistent as possible with the noise during self-capacitance detection. In the stage t11 during self-capacitance detection, the charges of the cancellation capacitor and the charges of the to-be-detected capacitor will be transferred to the charge transfer module.

The control module 600, the drive module 601, the cancellation module 603, the charge transfer module 603, and the processing module 604 in FIG. 6 are similar to those in the foregoing embodiments. The processing module 604 is configured to detect the output voltage of the charge cancellation module 603, compute the variation of the self-capacitance of the to-be-detected capacitor Cx before and after a touch, and finally provide a digital value for characterizing the variation. In addition, the technical principle thereof may be concluded by analysis with reference to the sequence diagram of FIG. 7, and the description will not be repeated here. It should be noted that the cycle T in FIG. 7 denotes the detection cycle of self-capacitance detection, i.e., it takes from t1 to t8 to complete self-capacitance detection, or it may take from t9 to t16 to provide a capacitance value of self-capacitance detection. The detection cycle T is twice the cycle of the control signals $\varphi1$, $\varphi2$, and $\varphi3$. Based on the self-capacitance detection circuit shown in FIG. 6, how the circuit in FIG. 8 detects a noise is specifically described below.

Figure 8:
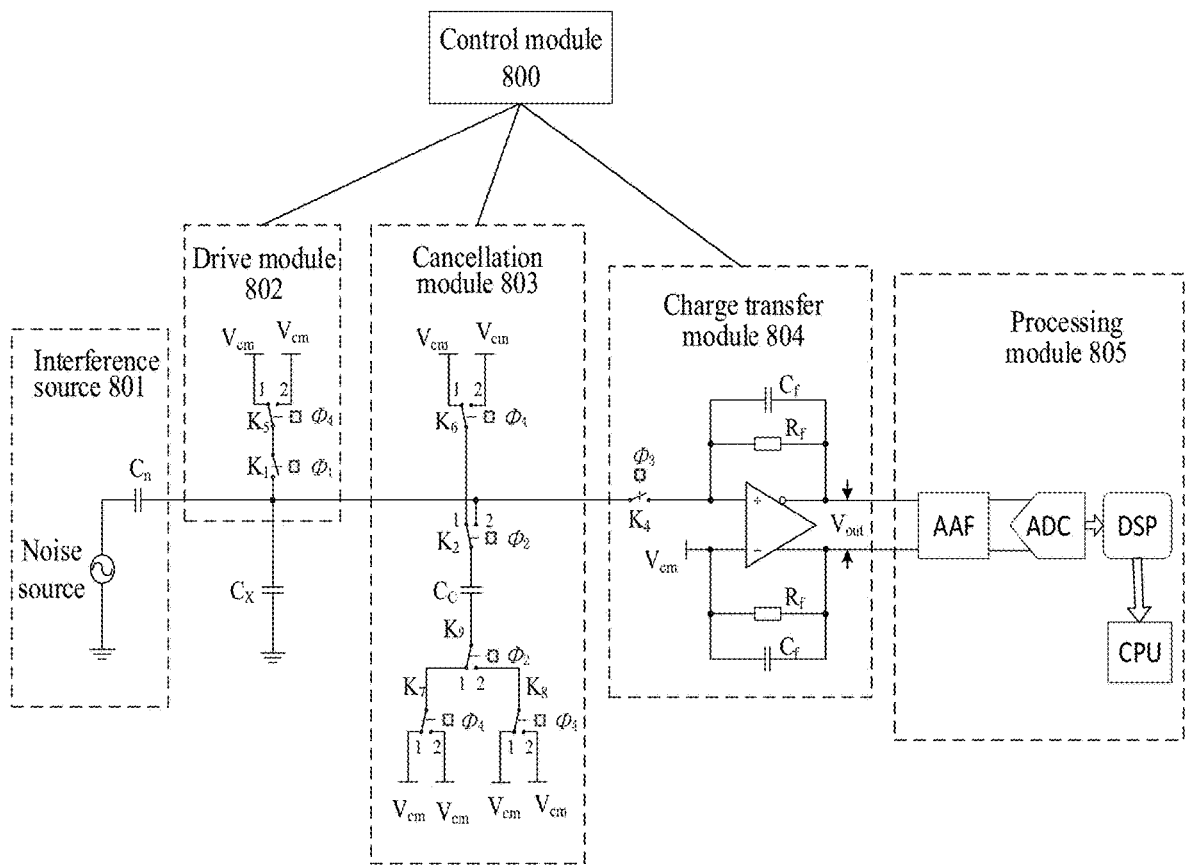
FIG. 8 is a schematic structural diagram of another noise detection circuit provided in an embodiment of the present disclosure.

Referring to the noise detection circuit shown in FIG. 8, in this embodiment, in order to save the circuit area, the noise detection circuit and the self-capacitance detection circuit may share a part of the circuit. The number of switch units of the noise detection circuit shown in FIG. 8 is the same as the number of switch units of the self-capacitance detection circuit shown in FIG. 6.

In the noise detection circuit of FIG. 8, for the drive module, the second terminal of the to-be-detected capacitor is grounded, and both the first switch unit K1 and the fifth switch unit K5 of the drive module are configured to control whether the first terminal of the to-be-detected capacitor is connected to the common mode voltage. In this embodiment, the first switch unit K1 and the fifth switch unit K5 in the drive module may also be implemented by only one switch unit. In this embodiment, two switch units K1 and K5 are only taken as an example for description, so as to facilitate understanding how the noise detection circuit and the self-capacitance detection circuit share one circuit. During noise detection, the drive module in FIG. 8 may be understood as being obtained by switching Vcc and GND at the contacts 1 and 2 of the switch unit K5 in the drive module in FIG. 6 to the common mode voltage. During self-capacitance detection, the drive module in FIG. 6 may be understood as being obtained by switching the common mode voltage of the drive module connected to the fifth switch unit K5 in FIG. 8 to Vcc and GND.

In the noise detection circuit of FIG. 8, for the cancellation module, the switch unit in the cancellation module is configured to control whether the first terminal and the second terminal of the cancellation capacitor are connected to the common mode voltage, where the switch unit K2 is further configured to control whether the first terminal of the cancellation capacitor is connected to the first terminal of the to-be-tested capacitor. The cancellation module in the noise detection circuit may be understood as being obtained by switching the power source (including Vss=−Vcc, Vcc, and GND) of the cancellation module in the self-capacitance detection circuit of FIG. 6 to the common mode voltage. During self-capacitance detection, the cancellation module in FIG. 6 may be understood as being obtained by switching the common mode voltage of the cancellation module connected to the sixth switch unit in FIG. 8 to Vss and Vcc, switching the common mode voltage of the cancellation module connected to the seventh switch unit to Vcc and Vss, and switching the common mode voltage of the cancellation module connected to the eighth switch unit to Vcc and GND.

A charge transfer module 804 and a processing module 805 in the noise detection circuit of FIG. 8 are the same as or similar to the expressions in the foregoing embodiments. The description will not be repeated here in this embodiment.

The specific structure of the noise detection circuit shown in FIG. 8 is described in detail below. The number of switch units in FIG. 8 is the same as the number of switch units in FIG. 6. As mentioned above, the difference is that the voltage source connected to some of the switch units is switched to the common mode voltage. Different from the noise detection circuits of FIG. 1A, FIG. 1B, FIG. 1C, FIG. 1D, and FIG. 3, the noise detection circuit of this embodiment is additionally provided with a switch unit, such that the noise detection circuit can reuse the switch unit of the self-capacitance detection circuit. A drive module 802 includes a first switch unit K1 and a fifth switch unit K5, and a cancellation module 803 includes a second switch unit K2, a sixth switch unit K6, a seventh switch unit K7, an eighth switch unit K8, and a ninth switch unit K9. The charge transfer module 804 includes a fourth switch unit K4. In this embodiment, a single switch implementation is taken as an example for the second switch unit K2, the fifth switch unit K5, the sixth switch unit K6, the seventh switch unit K7, the eighth switch unit K8, and the ninth switch unit K9, which are specifically single-pole double-throw switches, have contacts 1 and 2 respectively, have two closed states referred to as a first closed state and a second closed state respectively, are in the first closed state when being switched to the contact 1, and are in the second closed state when being switched to the contact 2. Further, the control module 800 is further configured to control on-off of the switches K1 to K2 and K4 to K9, and the control module 800 may be specifically a programmable sequential logic circuit. A signal controlling on-off of the first switch unit K1 is denoted as $\Phi1$ (or referred to as a first control signal), a signal controlling on-off of the second switch unit K2 and the ninth switch unit K9 is denoted as $\Phi2$ (or referred to as a second control signal), a signal controlling on-off of the switch K4 is denoted as $\Phi3$ (or referred to as a third control signal), and a signal controlling on-off of the fifth switch unit K5 to the eighth switch unit K8 is denoted as $\Phi4$ (or referred to as a fourth control signal). That is, the second control signal synchronously controls the second switch unit and the ninth switch unit to switch to the closed state, and the fourth control signal synchronously controls the fifth switch unit to the eighth switch unit to switch to the closed state, thereby processing the to-be-detected capacitor and the cancellation capacitor, performing charge transfer between the to-be-detected capacitor/the cancellation capacitor and charge transfer module, and achieving noise detection or self-capacitance detection.

In this embodiment, when K1 is closed and K5 is in the first closed state or the second closed state in FIG. 8, the drive module 802 in FIG. 8 is similar to the drive module 302 in the period t1 in FIG. 3, i.e., charging the to-be-detected capacitor Cx. When the switch K6 is in the first closed state or the second closed state, K9 is in the first closed state, and K7 is in the first or second closed state in FIG. 8, the cancellation module 803 in FIG. 8 is similar to the cancellation module 303 in the period t1 in FIG. 3, i.e., both the first terminal and the second terminal of the cancellation capacitor Cc are connected to the common mode voltage; and when the switch K6 is in the first closed or second closed state, K9 is in the second closed state, and K8 is in the first or second closed state in FIG. 8, the cancellation module 803 in FIG. 8 is also similar to the cancellation module 303 in the period t1 in FIG. 3, i.e., both the first terminal and the second terminal of the cancellation capacitor Cc are connected to the common mode voltage. Referring to FIG. 8, when the first switch unit K1 is in the closed state, and the fifth switch unit K5 is in the first closed state or the second closed state, the first terminal of the to-be-detected capacitor Cx is connected to the common mode voltage; when the second switch unit K2 is in the first closed state, the sixth switch unit K6 is in the first closed state or the second closed state, K9 is in the first closed state, and K7 is in the first closed state or the second closed state, both the first terminal and the second terminal of the cancellation capacitor are connected to the common mode voltage; and when the second switch unit K2 is in the first closed state, the sixth switch unit K6 is in the first closed state or the second closed state, K9 is in the second closed state, and K8 is in the first closed state or the second closed state, both the first terminal and the second terminal of the cancellation capacitor are the common mode voltage. When the second switch unit K2 is in the second closed state, the ninth switch unit K9 is in the first closed state, and the seventh switch unit K7 is in the first closed state or the second closed state, the first terminal of the cancellation capacitor Cc is connected to the first terminal of the to-be-detected capacitor Cx, and the second terminal of the cancellation capacitor Cc is connected to the common mode voltage. When the second switch unit K2 is in the second closed state, the ninth switch unit K9 is in the second closed state, and the eighth switch unit K8 is in the first closed state or the second closed state, the first terminal of the cancellation capacitor Cc is connected to the first terminal of the to-be-detected capacitor Cx, and the second terminal of the cancellation capacitor Cc is connected to the common mode voltage.

The operating principle of the above noise detection circuit in FIG. 8 will be described below as an example with reference to the sequence diagram in FIG. 7 corresponding to FIG. 8. FIG. 7 is also a sequence diagram for the noise detection circuit during operation in FIG. 8 in an embodiment of the present disclosure, i.e., the operating sequence of the noise detection circuit may be the same as the operating sequence of the self-capacitance detection circuit. As shown in FIG. 7, the periods t1 to t4 and the periods t5 to t8 constitute a detection cycle, and the main technical processing in each period is briefly described as follows:

period t1: charging the to-be-detected capacitor Cx, and inputting the common mode voltage to both terminals of the cancellation capacitor Cc;

period t2: connecting the first terminal of the to-be-detected capacitor Cx to the first terminal of the cancellation capacitor Cc;

period t3: converting the charges of the to-be-detected Cx and the charges of the cancellation capacitor Cc into a voltage signal by charge transfer;

period t4: resetting the charge transfer module;

period t5: charging the to-be-detected capacitor Cx, and inputting the common mode voltage to both terminals of the cancellation capacitor Cc;

period t6: connecting the first terminal of the to-be-detected capacitor Cx to the first terminal of the cancellation capacitor Cc;

period t7: converting the charges of the to-be-detected Cx and the charges of the cancellation capacitor Cc into a voltage signal by charge transfer;

period t8: resetting the charge transfer module, which outputs a voltage signal of 0.

As shown in FIG. 7, a signal frequency of the first control signal Φ1 to the third control signal Φ3 is twice a signal frequency of the fourth control signal Φ4. In this embodiment, for the noise detection circuit, the signal frequency of the first control signal Φ1 to the third control signal Φ3 is equal, and the frequency of the fourth control signal Φ4 is not limited. During self-capacitance detection, the signal frequency of the first control signal Φ1 to the third control signal Φ3 is twice that of the fourth control signal Φ4. For convenience, and to avoid resetting the fourth control signal Φ4, the signal frequency of the first control signal Φ1 to the third control signal Φ3 may also be set to be twice that of the fourth control signal Φ4. Specifically, the fourth control signal Φ4 may be a square wave with 50% duty cycle. In this embodiment, t1=t5, t2=t6, t3=t7, and t4=t8; and the detailed timing sequence is as follows:

In the period t1, the first switch unit K1 is switched on, the fifth switch unit K5, the sixth switch unit K6, the seventh switch unit K7, the second switch unit K2, and the ninth switch unit K9 are in the first closed state, and the fourth switch unit K4 is switched off, such that the first terminal of the to-be-detected capacitor Cx is connected to Vcm, and the second terminal thereof is connected to GND, such that the first terminal of the cancellation capacitor Cx is connected to Vcm, and the second terminal thereof is connected to Vcm, and such that finally the to-be-detected capacitor Cx is charged. At the end of the period t1, the voltage of the to-be-detected capacitor Cx is Vcm (i.e., Vcm−GND), and the voltage of the cancellation capacitor Cc is 0 (i.e., Vcm−Vcm=0). In this case, the amount of charges stored in the to-be-detected capacitor Cx is Q1=Vcm*Cx, and the amount of charges stored in the cancellation capacitor Cc is Q2=(Vcm−Vcm)*Cc=0. At the same time, since the fourth switch unit K4 is switched off, the output voltage (Vout) of the charge transfer module 804 is 0.

In the period t2, the first switch unit K1 and the fourth switch unit K4 are switched off respectively under the control of the first control signal and the third control signal, the second switch unit K2 and the ninth switch unit K9 are connected to the contact 2 under the control of the second control signal, so as to be in the second closed state, and the fifth switch unit K5 to the eighth switch unit K8 are connected to the contact 1 under the control of the fourth control signal, so as to be in the first closed state. The to-be-detected capacitor Cx is connected to the cancellation capacitor Cc. There is Vcm*Cx+0=Vx*Cx+(Vx−Vxm)*Cc in accordance with the charge conservation law, and the voltage Vx of the to-be-detected capacitor Cx is equal to Vcm. It should be noted that when there is a noise, for example, an interference is simulated using an interference source 801, the interference source 801 affects the to-be-detected capacitor Cx and the cancellation capacitor Cc, such that the voltage Vx of the to-be-detected capacitor Cx is not equal to Vcm, which may be understood as that the interference caused by the interference source 801 will cause the to-be-detected capacitor and the cancellation capacitor to be charged or discharged, such that the voltage Vx of the to-be-detected capacitor Cx is greater than or less than Vcm.

In the period t3, the fourth switch unit K4 is switched on, other switches remain in a state consistent with the state in the period t2, and when the voltage Vx of the to-be-detected capacitor Cx is greater than or less than Vcm, there is charge transfer between the to-be-detected capacitor Cx, the cancellation capacitor Cc, and the charge transfer module 142.

In the period t4, the fourth switch unit K4 is switched off, other switches may remain in a state consistent with the state in the period t3, the charge transfer module 804 is reset, and the output voltage Vout of the charge transfer module 804 becomes 0. The period t4 may be referred to as a dead time period.

The periods t5 to t8 are similar to the periods t1 to t4, and the description will not be repeated here.

In the above operating process, charge transfer may occur in the periods t3 and t7. The charges of the to-be-detected capacitor and the charges of the cancellation capacitor may be transferred to the charge transfer module. Based on the voltage Vx on the to-be-detected capacitor Cx at the end of the periods t2 and t6, there are the following situations:

When Vx>Vcm, the to-be-detected capacitor Cx and the cancellation capacitor Cc transfer charges to the charge transfer module 804 simultaneously, until the voltage of the to-be-detected capacitor Cx reaches the common mode voltage Vcm. In this process, the output voltage Vout of the charge transfer module 804 is a negative voltage. However, Vout may gradually become a positive voltage due to the influence of the interference source.

When Vx=Vcm, the amount of charges transferred between the to-be-detected capacitor Cx/the cancellation capacitor Cc and the charge transfer module 804 is 0, and the output voltage ($V_{OUT}$) of the charge transfer module 804 is 0, too. In this case, the circuit reaches a completely cancel state.

When Vx<Vcm, the charge transfer module 142 will charge the to-be-detected capacitor Cx and the cancellation capacitor Cc via the feedback network (Rf and Cf), until both the voltage of the to-be-detected capacitor Cx and the voltage of the cancellation capacitor Cc reach the common mode voltage Vcm. In this process, the output voltage Vout of the charge transfer module 804 is a positive voltage. However, Vout may gradually become a negative voltage due to the influence of the interference source.

An output voltage of the charge transfer module 804 is filtered through a filter, e.g., an anti-alias filter (AAF), in a processing module 152, then sent into an analog-digital converter (ADC) for sampling, and then sent to a digital signal processor (DSP) for IQ demodulation. A reference frequency used for demodulation may be understood as the operating frequency of the noise detection circuit. The demodulated raw data is sent to a central processing unit (CPU) for noise computation to provide a noise value, e.g., amplitude.

Based on the disclosures in the above embodiments, in this embodiment, during noise detection, the noise detection cycle is T=t1+t2+t3+t4. It is understandable that when the operating frequency of self-capacitance detection is 1/T, the reference frequency used for demodulation is 1/T in the digital signal processor. In addition, when the operating frequency of self-capacitance detection is 1/(2T), noise detection is required to be detected within 2T time (2T=t1+t2+t3+t4+t1+t2+t3+t4), the output voltage of the charge transfer module within 2T time is filtered, and the reference frequency used for demodulation is 1/(2T) in the digital signal processor. Thus, frequency response of the noise detection circuit at a preset operating frequency to noise (interference) may be detected. When the period t4 is not arranged, i.e., the stage t4 may be omitted, T=t1+t2+t3, and the reference frequency used for demodulation is changed accordingly, so as to obtain an accurate noise frequency response by demodulation.

Figure 9:
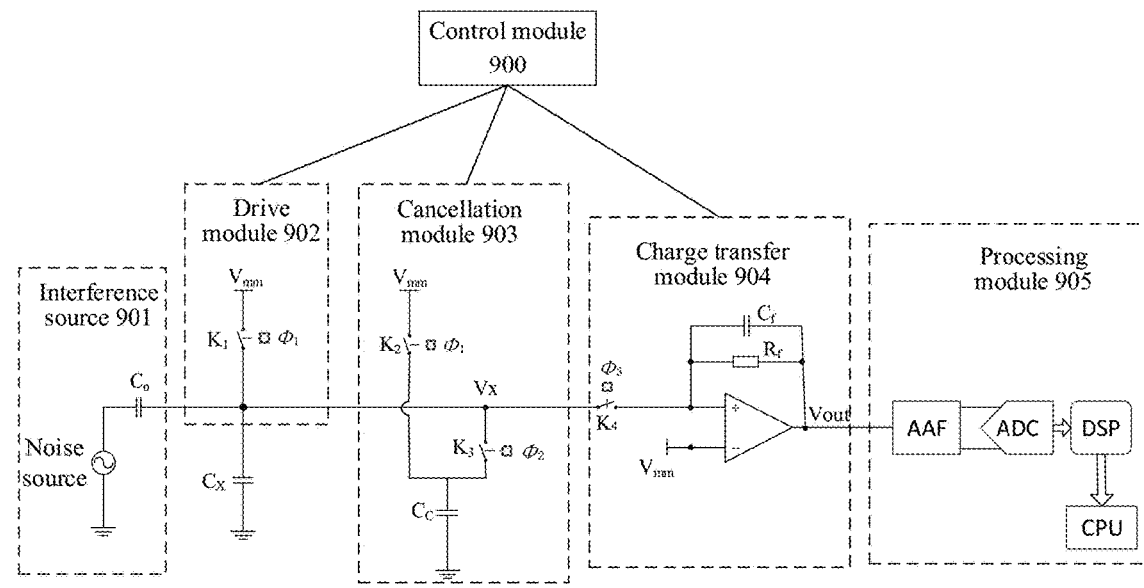
FIG. 9 is a schematic structural diagram of another noise detection circuit provided in an embodiment of the present disclosure.
Figure 10:
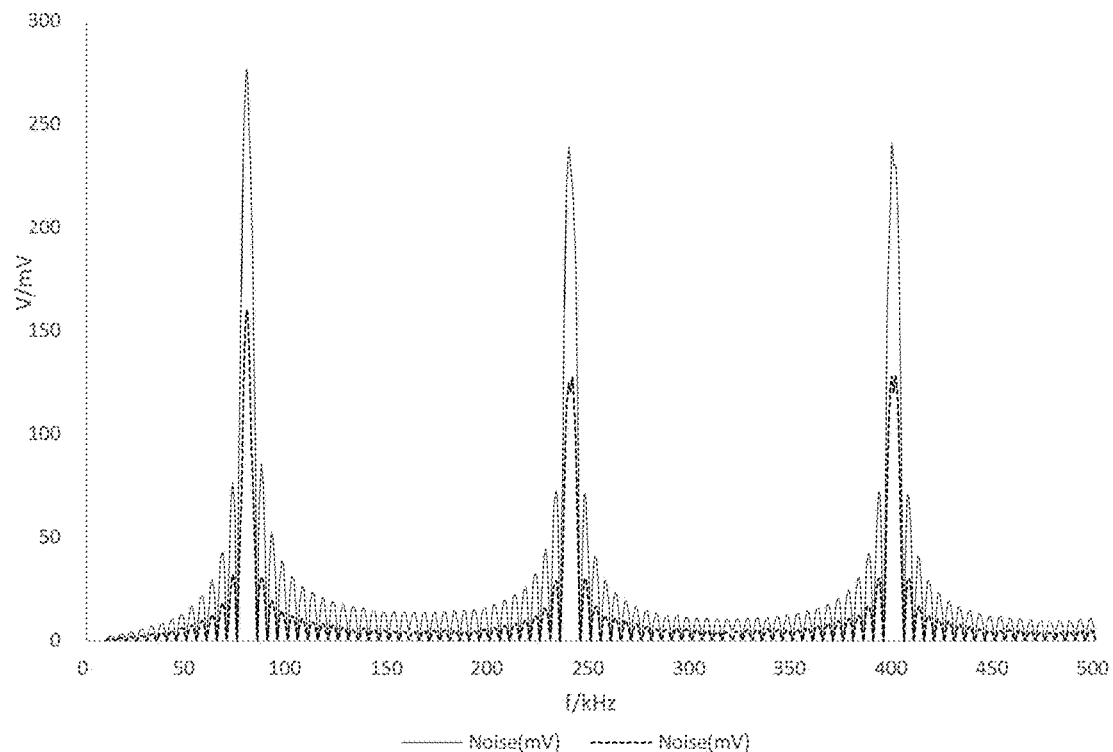
FIG. 10 is a noise frequency response diagram of a simulated self-capacitance detection circuit during operation, and a noise frequency response diagram detected by a noise detection circuit provided in an embodiment of the present disclosure.

Based on the disclosures in the foregoing embodiments, in this embodiment, the amplifier may also be a monoamplifier, for example, referring to FIG. 9, a charge transfer module 904 includes a monoamplifier, and an inverting input terminal of the monoamplifier is connected to the first voltage. An interference source 901, a drive module 902, a cancellation module 903, the charge transfer module 904, and a processing module 905 are the same as or similar to the interference source, the drive module, the cancellation module, the charge transfer module, and the processing module in the foregoing embodiments, and the timing sequence thereof is the same as the corresponding timing sequence in FIG. 1A of the foregoing embodiments. The description will not be repeated here. FIG. 10 is a frequency response diagram (gray solid line) of a simulated self-capacitance detection circuit for a preset noise when no finger touches an electrode and a noise frequency response diagram (black dotted line) of a noise detection circuit of this embodiment for the same preset noise. It is understandable that the frequency response refers to the application of a signal at a specific frequency to a circuit/system to detect a degree of response of the system to the signal at the specific frequency; or the application of a signal in a frequency range to detect a degree of response of the system to the signal in the frequency range, i.e., the frequency response diagram can characterize the circuit characteristics. Specifically, an interference source at a frequency from 10 to 500 kHz may be provided for frequency sweep, i.e., the preset noise may be described, e.g., by frequency swept with the interference source at a frequency from 10 to 500 kHz. When there is no finger touch, the frequency response diagram measured by the self-capacitance detection circuit shown in FIG. 6 is expressed as the gray solid line, and the frequency response diagram measured by the noise detection circuit shown in FIG. 8 is expressed as the black dotted line. The timing sequence shown in FIG. 7 is used in both the circuit shown in FIG. 6 and the circuit shown in FIG. 8. When there is no finger touch, a frequency response of Vout of the self-capacitance detection circuit is substantially the same as a frequency response of Vout of the noise detection circuit. The amplitudes of both are different, and the self-capacitance detection circuit has a louder noise, because there is a capacitance base value during self-capacitance detection, such that the noise energy after IQ (in-phase and quadrature) demodulation remains unchanged, but there is no capacitance base value in the noise detection circuit, such that the energy is reduced after IQ demodulation. In FIG. 10, the horizontal axis denotes a frequency, and the longitudinal axis denotes a measured noise value. At each frequency point, the noise value measured by the noise detection circuit can accurately represent the noise value detected by the self-capacitance detection circuit. As can be seen from the goodness of fit between the two curves, the noise detection circuit provided in this embodiment can practically reflect the noise during self-capacitance detection.

Figure 11:
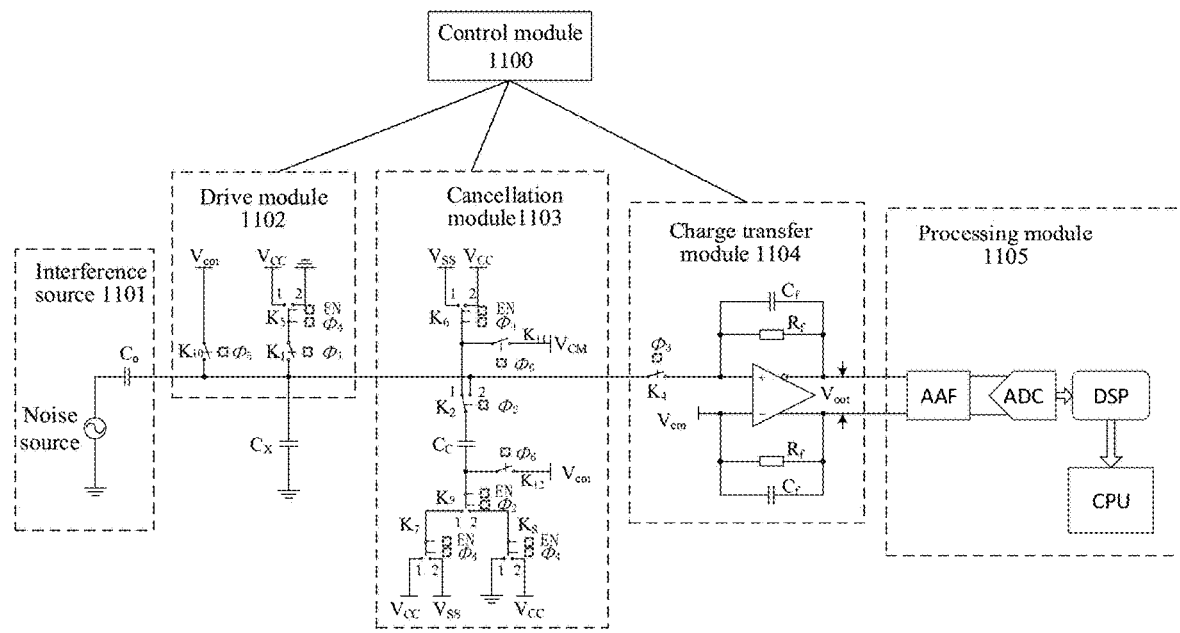
FIG. 11 is a schematic structural diagram of another noise detection circuit provided in an embodiment of the present disclosure.
Figure 12:
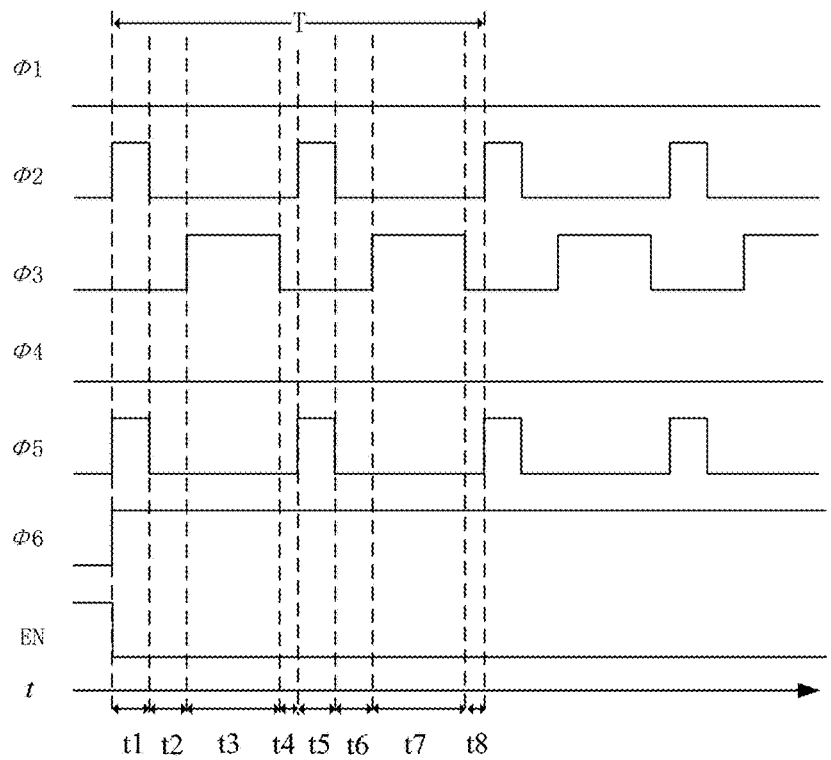
FIG. 12 is a sequence diagram for the noise detection circuit in FIG. 11 during operation provided in an embodiment of the present disclosure.

Based on the disclosures in the foregoing embodiments, the circuit provided in this embodiment can perform both noise detection and self-capacitance detection. As shown in FIG. 11, a control module 1100, a charge transfer module 1104, and a processing module 1105 are the same as or similar to those in the foregoing embodiments, and the description will not be repeated here. On the basis of FIG. 6, the drive module 1102 is additionally provided with a tenth switch unit configured to control whether the first terminal of the to-be-detected capacitor is connected to the common mode voltage, and the cancellation module 1103 is additionally provided with an eleventh switch unit and a twelfth switch unit, where the eleventh switch unit is configured to control whether the first terminal of the cancellation capacitor is connected to the common mode voltage, and the twelfth switch unit is configured to control whether the second terminal of the cancellation capacitor is connected to the common mode voltage. The tenth switch unit, the eleventh switch unit, and the twelfth switch unit are additionally provided on the basis of FIG. 6, to switch to the noise detection circuit shown in FIG. 3 or FIG. 5 during noise detection. As shown in FIG. 11, an enable signal EN is additionally provided to control switch units K5, K6, K7, K8, and K9. When EN is high, these switches are enabled. In this case, the corresponding switch units are connected to contact 1 when the control signal is high, and connected to contact 2 when the control signal is low. When EN is low, these switches are not enabled, and are in an off or high impedance state. No matter how the corresponding control signal changes, they will not be connected to the contact 1 or the contact 2. The enable signal EN is additionally provided to control the fifth switch unit, the sixth switch unit, the seventh switch unit, the eighth switch unit, and the ninth switch unit to enable EN to be high during self-capacitance detection, such that these switches are enabled and connected to the contact 1 or the contact 2, and the corresponding control signal is shown in FIG. 7. During self-capacitance detection, Φ5 and Φ6 that are not shown in FIG. 7 may remain at a low level, i.e., K10, K11, and K12 are switched off to avoid affecting self-capacitance detection. When EN is low, the switches K5, K6, K7, K8, and K9 are not enabled. Therefore, K5, K6, K7, K8, and K9 are in an off state, i.e., they are neither connected to the contact 1, nor connected to the contact 2. Even when K5, K6, K7, K8, and K9 are still connected to the contact 1 or 2, since the enable signal EN is low, the connection between said K5, K6, K7, K8, or K9 and the contact 1 or 2 will not function. Φ1 may have the same timing sequence as Φ5, because K5 is not enabled, i.e., K5 is in the off state, such that during noise detection, any timing sequence of Φ1 will not affect the noise detection. For example, K1 may be switched off all along; and when EN is low, Φ6 is at a high level all along, i.e., K11 and K12 are always connected to the common mode voltage. FIG. 12 may be referred to for the timing sequence of the switch units, when EN is low during noise detection. T in FIG. 12 denotes the cycle of self-capacitance detection. During self-capacitance detection, only after the periods t1 to t8, can the self-capacitance value be measured.

In this embodiment, the enable signal EN is additionally provided to control the switch units K5, K6, K7, K8, and K9 to be enabled or not enabled, which is merely an embodiment. In addition, another contact, e.g., contact 3, may also be additionally provided to the switch units K5, K6, K7, K8, and K9 to replace the enable signal. When the switch unit K5, K6, K7, K8, or K9 contacts with the contact 3, the switch unit K5, K6, K7, K8, or K9 is switched off, e.g., no load, i.e., neither contacting with the contact 1 nor contacting with the contact 2. The design of the contact 3 of the second switch unit K2 in FIG. 3 disclosed in the foregoing embodiments may be referred to.

Figure 13:
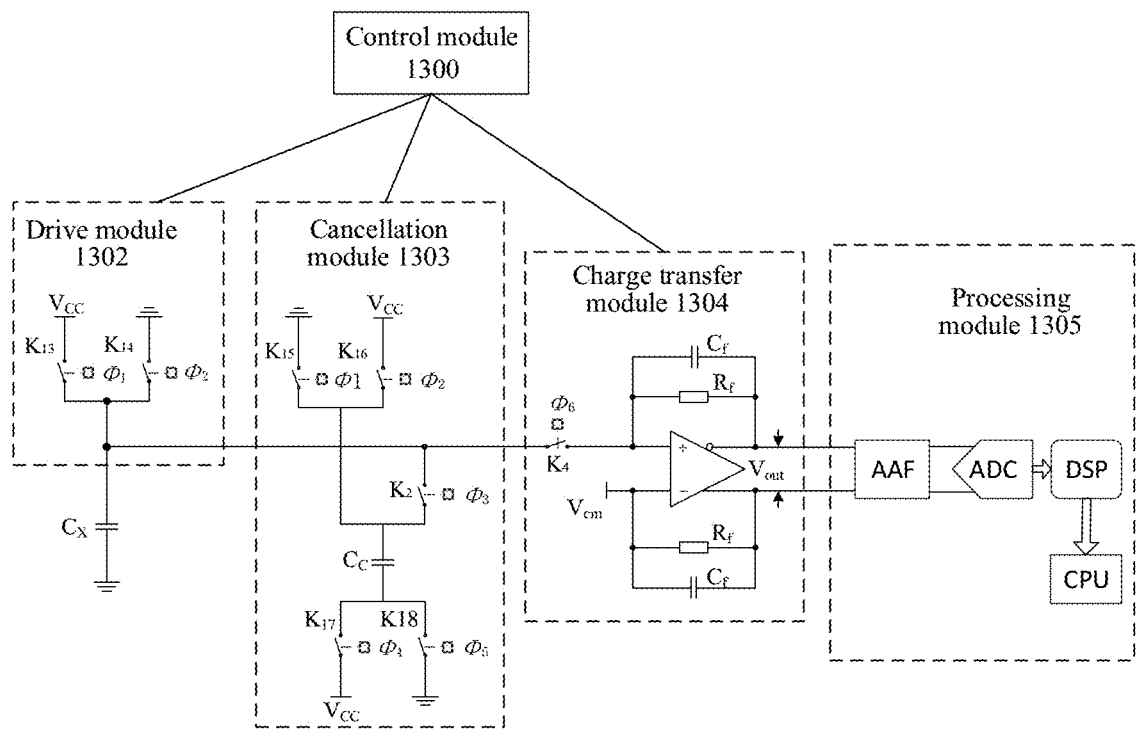
FIG. 13 is a schematic structural diagram of another self-capacitance detection circuit provided in an embodiment of the present disclosure.
Figure 14:
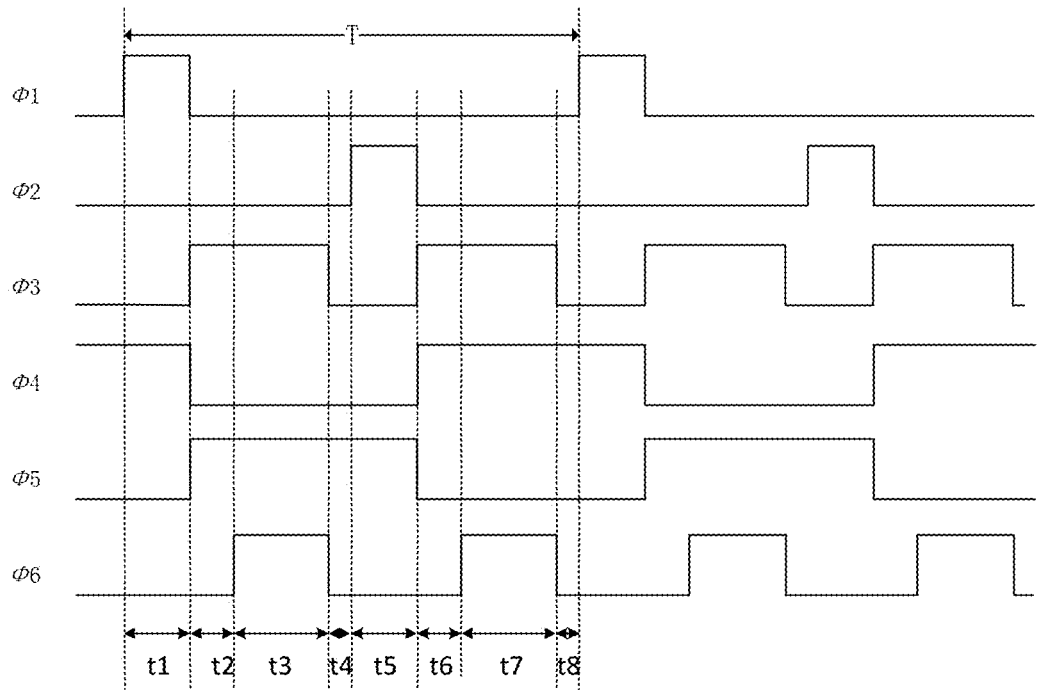
FIG. 14 is a sequence diagram for the self-capacitance detection circuit in FIG. 13 during operation provided in an embodiment of the present disclosure.

Based on the contents in the above embodiments, in this embodiment, the description is provided based on the capacitance detection circuit, with reference to the self-capacitance detection circuit shown in FIG. 13 and the sequence diagram of the capacitance detection circuit shown in FIG. 14. A control module 1300, a drive module 1302, a cancellation module 1303, a charge transfer module 1304, and a processing module 1305 in FIG. 13 are similar to those in the foregoing embodiments. In addition, the technical principle thereof may be concluded based on the sequence diagram in FIG. 14 and the above similar analysis. The description will not be repeated here. Based on the self-capacitance detection circuit shown in FIG. 13, how the noise detection circuit shown in FIG. 15A detects a noise is specifically described below.

Figure 15A:
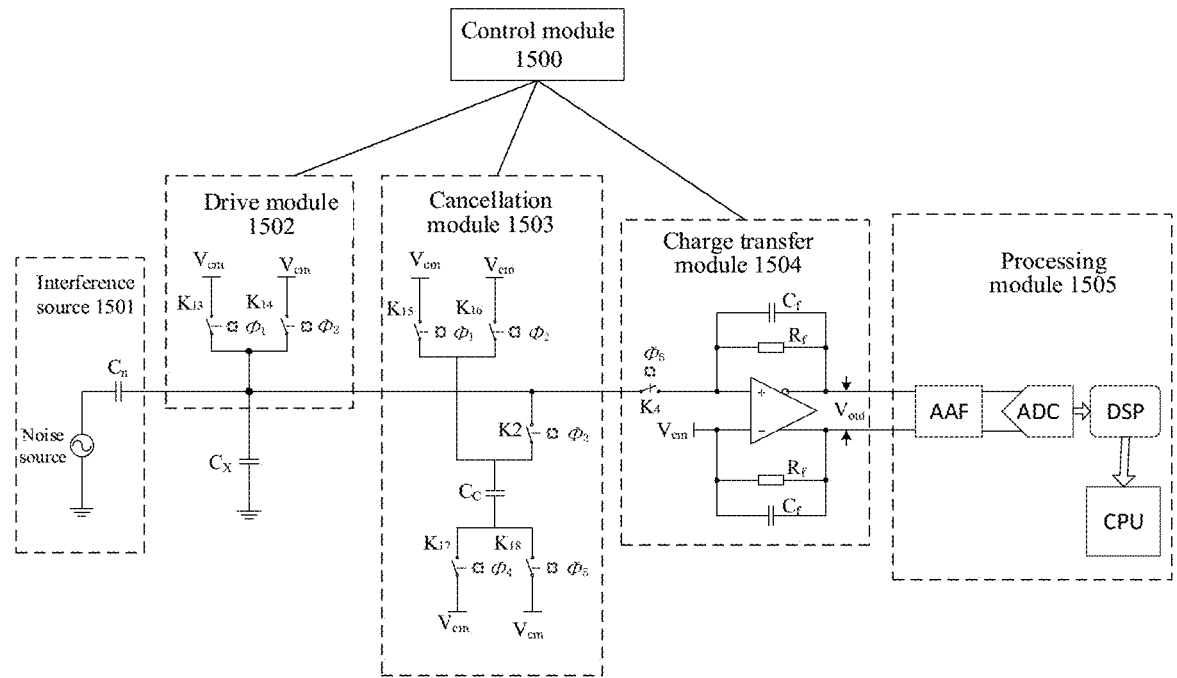
FIG. 15A is a schematic structural diagram of another noise detection circuit provided in an embodiment of the present disclosure.

Referring to the noise detection circuit shown in FIG. 15A, in this embodiment, in order to save the circuit area, the noise detection circuit and the self-capacitance detection circuit may share a switch unit, and the number of switch units of the noise detection circuit is the same as the number of switch units of the self-capacitance detection circuit shown in FIG. 13.

In the noise detection circuit of FIG. 15A, for the drive module, the second terminal of the to-be-detected capacitor is grounded, and both the thirteenth switch unit K13 and the fourteenth switch unit K14 of the drive module are configured to control whether the first terminal of the to-be-detected capacitor is connected to the common mode voltage. In this embodiment, the thirteenth switch unit K13 and the fourteenth switch unit K14 in the drive module may also be implemented by merely one switch unit. This embodiment is described, e.g., by sharing a switch unit, so as to facilitate understanding how the noise detection circuit and the self-capacitance detection circuit share one circuit. In the noise detection circuit, the drive module in FIG. 15A may be understood as switching Vcc of the drive module connected to the thirteenth switch unit in FIG. 13 to the common mode voltage, and switching GND of the drive module connected to the fourteenth switch unit in FIG. 13 to the common mode voltage. For the drive module of the noise detection circuit, when self-capacitance detection is required, the common mode voltage connected to the thirteenth switch unit and the fourteenth switch unit is switched to Vcc and GND.

In the noise detection circuit of FIG. 15A, for the cancellation module, the switch unit in the cancellation module is configured to control whether the first terminal and the second terminal of the cancellation capacitor are connected to the common mode voltage, where the switch unit K2 is further configured to control whether the first terminal of the cancellation capacitor is connected to the first terminal of the to-be-tested capacitor. Compared with the self-capacitance detection circuit shown in FIG. 6, the cancellation module in the noise detection circuit may be understood as switching the power source (including Vcc and GND) of the cancellation module in the self-capacitance detection circuit to the common mode voltage, i.e., switching the power source connected to the fifteenth switch unit K15, the sixteenth switch unit K16, the seventeenth switch unit K17, and the eighteenth switch unit K18 to the common mode voltage. For the cancellation module of the noise detection circuit, when self-capacitance detection is required, the common mode voltage connected to the fifteenth switch unit K15, the sixteenth switch unit K16, the seventeenth switch unit K17, and the eighteenth switch unit K18 is switched to corresponding GND, Vcc, Vcc, and GND in FIG. 13.

A charge transfer module 1504 and a processing module 1505 in the noise detection circuit of FIG. 15A are the same as or similar to those expressed in the foregoing embodiments. The description will not be repeated here in this embodiment. The corresponding sequence diagram of FIG.

15A during noise detection may be FIG. 14. The operating principle of the above noise detection circuit in FIG. 15A will be described below as an example with reference to the sequence diagram thereof.

FIG. 14 is a sequence diagram for the noise detection circuit during operation in FIG. 15A in an embodiment of the present disclosure. As shown in FIG. 14, double periods t1 to t4 constitute a noise detection cycle. T in FIG. 14 denotes a self-capacitance detection cycle, and the main technical processing in each period is briefly described as follows:

period t1: charging the to-be-detected capacitor Cx, and inputting the common mode voltage to both terminals of the cancellation capacitor Cc;

period t2: connecting the first terminal of the to-be-detected capacitor Cx to the first terminal of the cancellation capacitor Cc;

period t3: converting the charges of the to-be-detected Cx and the charges of the cancellation capacitor Cc into a voltage signal by charge transfer; and period t4: resetting the charge transfer module, and the output being 0.

It is understandable that the noise detection circuit in FIG. 15A may be equivalent to the noise detection circuit in FIG. 1C. According to FIG. 14, the sequence diagram shown in FIG. 2A or 2B may also be obtained. Specifically, the first control signal $\Phi1$ in FIG. 2A or 2B may be understood as being obtained by an "OR" operation of the first control signal $\Phi1$ and the second control signal $\Phi2$ in FIG. 14, the second control signal $\Phi2$ in FIG. 2A may be understood as the third control signal $\Phi3$ in FIG. 14, and the third control signal $\Phi3$ in FIG. 2A may be understood as the sixth control signal $\Phi6$ in FIG. 14. The timing sequence arranged for the noise detection circuit diagram in FIG. 15A is the same as the timing sequence arranged for the self-capacitance detection circuit in order to achieve noise detection only by switching the power source connected to some of the switch units in FIG. 13 without changing the timing sequence of the switch units. As shown in FIG. 14, a signal frequency of the third control signal $\Phi3$ and the sixth control signal $\Phi6$ is twice that of the first control signal $\Phi1$, the second control signal $\Phi2$, the fourth control signal $\Phi4$, and the fifth control signal $\Phi5$. In this embodiment, for the noise detection circuit, the signal frequency of the first control signal $\Phi1$, the signal frequency of the second control signal $\Phi2$, the signal frequency of the fourth control signal $\Phi4$, and the signal frequency of the fifth control signal $\Phi5$ are equal. The detailed timing sequence is as follows:

In the period t1, the thirteenth switch unit K13 is switched on, the fifteenth switch unit K15 and the seventeenth switch unit K17 are in a closed state, and the fourteenth switch unit K14, the sixteenth switch unit K16, the eighteenth switch unit K18, and the second switch unit K2 are switched off, such that the first terminal of the to-be-detected capacitor Cx is connected to Vcm, and the second terminal thereof is connected to GND, such that the first terminal of the cancellation capacitor Cx is connected to Vcm, and the second terminal thereof is connected to Vcm, and such that the to-be-detected capacitor Cx is charged. At the end of the period t1, the voltage of the to-be-detected capacitor Cx is Vcm (i.e., Vcm−GND), and the voltage of the cancellation capacitor Cc is 0 (i.e., Vcm−Vcm=0). In this case, the amount of charges stored in the to-be-detected capacitor Cx is Q1=Vcm*Cx, and the amount of charges stored in the cancellation capacitor Cc is Q2=(Vcm−Vcm)*Cc=0. In this case, since the sixth switch unit K6 is switched off, the output voltage Vout of the charge transfer module 1504 is 0.

In the period t2, the thirteenth switch unit K13, the fourteenth switch unit K14, the fifteenth switch unit K15, the sixteenth switch unit K16, and the seventeenth switch unit K17 are switched off, the second switch unit K2 and the eighteenth switch unit K18 are in a closed state, and the to-be-detected capacitor Cx is connected to the cancellation capacitor Cc. When there is no noise, there is Vcm*Cx+0=Vx*Cx+(Vx−Vxm)*Cc in accordance with the charge conservation law, and the voltage Vx of the to-be-detected capacitor Cx is equal to Vcm. It should be noted that when there is a noise, for example, an interference is simulated using an interference source 1501, the interference source 1501 affects the to-be-detected capacitor Cx and the cancellation capacitor Cc, such that the voltage Vx of the to-be-detected capacitor Cx is not equal to Vcm, which may be understood as that the interference caused by the interference source 1501 will cause the to-be-detected capacitor and the cancellation capacitor to be charged or discharged, such that the voltage Vx of the to-be-detected capacitor Cx is greater than or less than Vcm.

In the period t3, the fourth switch unit K4 is switched on, other switches remain in a state consistent with the state in the period t2, and when the voltage Vx of the to-be-detected capacitor Cx is greater than or less than Vcm, there is charge transfer between the to-be-detected capacitor Cx, the cancellation capacitor Cc, and the charge transfer module 142.

In the period t4, the fourth switch unit K4 is switched off, other switches remain in a state consistent with the state in the period t3. In addition, the second switch unit may also be closed, the charge transfer module 1504 is reset, and the output voltage Vout of the charge transfer module 804 becomes 0.

In the above operating process, there is charge transfer in the period t3. Based on the voltage Vx on the to-be-detected capacitor Cx at the end of the period t2, there are the following situations:

When Vx>Vcm, the to-be-detected capacitor Cx and the cancellation capacitor Cc transfer charges to the charge transfer module 1504 simultaneously, until the voltage of the to-be-detected capacitor Cx reaches the common mode voltage Vcm. In this process, the output voltage Vout of the charge transfer module 1504 is a negative voltage. However, the output of the charge transfer module 1504 may also be a positive voltage due to the influence of the interference source on the charge transfer module.

When Vx=Vcm, the amount of charges transferred between the to-be-detected capacitor Cx/the cancellation capacitor Cc and the charge transfer module 1504 is 0, and the output voltage ($V_{OUT}$) of the charge transfer module 1504 is 0, too. In this case, the circuit reaches a completely cancel state.

When Vx<Vcm, the charge transfer module 1504 will charge the to-be-detected capacitor Cx and the cancellation capacitor Cc via the feedback network (Rf and Cf), until both the voltage of the to-be-detected capacitor Cx and the voltage of the cancellation capacitor Cc reach the common mode voltage Vcm. In this process, the output voltage Vout of the charge transfer module 1504 is a positive voltage. However, the output of the charge transfer module 1504 may also be a negative voltage due to the influence of the interference source on the charge transfer module.

The output voltage of the charge transfer module 1504 is filtered by an AAF in the processing module 1505, then sent to an ADC for sampling, and then sent to a DSP for IQ demodulation. The resulting raw data is sent to a CPU for noise computation to offer a noise value. In addition, the CPU may be further configured to determine a noise level at a current operating frequency, for example, determine whether a noise amplitude is greater than a preset noise threshold, so as to determine the operating frequency of the self-capacitance detection circuit.

Figure 15B:
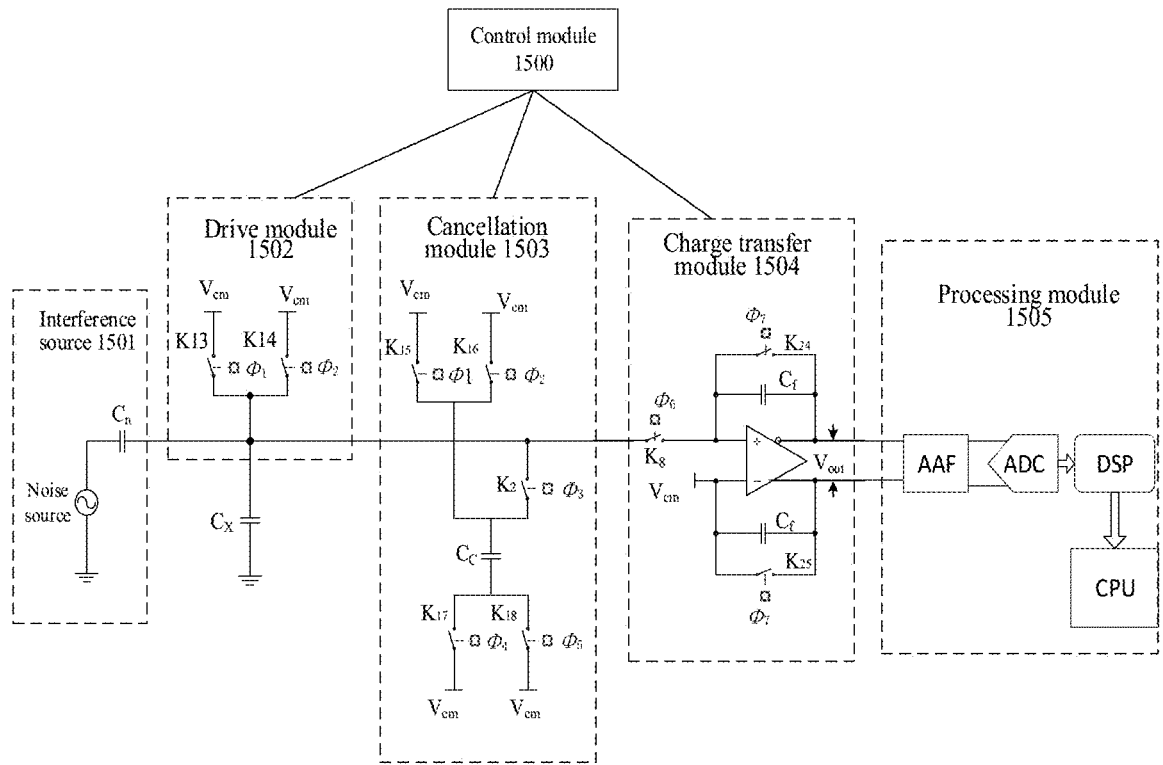
FIG. 15B is a schematic structural diagram of another noise detection circuit provided in an embodiment of the present disclosure.

Based on the contents in the foregoing embodiments, in this embodiment, the charge transfer module may also include a capacitive feedback and switch unit. Referring to FIG. 15B, for the corresponding sequence diagram, FIG. 14 may be referred to. The difference from FIG. 15A is the feedback network of the charge transfer module, including a feedback capacitor Cf and a switch unit. Specifically, the feedback network includes two feedback capacitors Cf, a twenty-fourth switch unit, and a twenty-fifth switch unit, and the twenty-fourth switch unit and the twenty-fifth switch unit share the same control signal φ7. It should be noted that φ7 may be in a closed state in the period t1, or may be in the closed state in the period t2, or in the closed state in the period t4, or φ7 may be in an off state in the stage t3. In this embodiment, the twenty-fourth switch unit and the twenty-fifth switch unit are provided to reset the feedback capacitor, and avoid the situation that the output voltage becomes constant after saturation due to the accumulation of too many charges. Only when φ7 is in the closed state in the period t1, may the timing sequence of FIG. 14 be referred to, where φ7 may be understood as being obtained by a "logical OR" operation of φ1 and φ2. Other modules and a timing sequence in this embodiment are the same as or similar to those in the foregoing embodiments. The description will not be repeated here.

Figure 16:
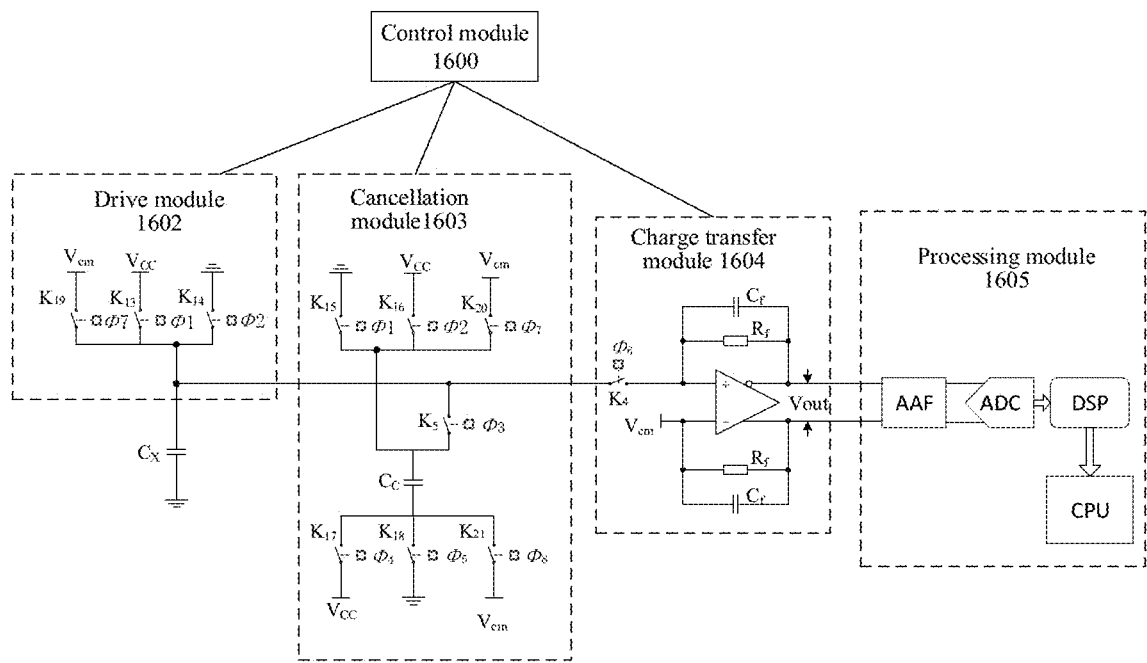
FIG. 16 is a schematic structural diagram of another noise detection circuit provided in an embodiment of the present disclosure.

Based on the contents in the foregoing embodiments, in this embodiment, a circuit as shown in FIG. 16 is provided, which can perform both self-capacitance detection and noise detection. A control module 1600, a drive module 1602, a cancellation module 1603, a charge transfer module 1604, and a processing module 1605 in FIG. 16 are similar to those in the foregoing embodiments. In addition, the technical principle thereof may be concluded based on the corresponding sequence diagram in FIG. 17 and the above similar analysis. The description will not be repeated here. Based on the self-capacitance detection circuit shown in FIG. 13, how the noise detection circuit shown in FIG. 16 detects a noise and performs self-capacitance detection is specifically described below.

Referring to the noise detection circuit shown in FIG. 16, in this embodiment, in order to save the circuit area, the noise detection circuit shown in FIG. 16 is additionally provided with three switch units, namely, the nineteenth switch unit K19, the twentieth switch unit K20, and the twenty-first switch unit K21, on the basis of the self-capacitance detection circuit in FIG. 13, such that during noise detection, the nineteenth switch unit K19, the twentieth switch unit K20, and the twenty-first switch unit K21 are selectively switched on such that the common mode voltage is connected, while during self-capacitance detection, the nineteenth switch unit K19, the twentieth switch unit K20, and the twenty-first switch unit K21 will be switched off, and the control module 1600 controls states of switch units in each module to achieve noise detection and self-capacitance detection.

In the noise detection circuit of FIG. 16, for the drive module, the second terminal of the to-be-detected capacitor is grounded, and the nineteenth switch unit of the drive module is configured to control whether the first terminal of the to-be-detected capacitor is connected to the common mode voltage. The control module 1600 in FIG. 16 may be configured to control whether the first terminal of the to-be-detected capacitor Cx is connected to Vcc, GND, and Vcm respectively by controlling a thirteenth switch module, a fourteenth switch module, and a nineteenth switch module, so as to complete noise detection based on the timing sequence of FIG. 17, or complete self-capacitance detection based on the timing sequence of FIG. 14. When self-capacitance detection is being completed based on the timing sequence of FIG. 14, the nineteenth switch unit K19, the twentieth switch unit K20, and the twenty-first switch unit K21 will be switched off.

In the noise detection circuit of FIG. 16, for the cancellation module 1603, the twentieth switch unit in the cancellation module is configured to control whether the first terminal of the cancellation capacitor is connected to the common mode voltage, and the twenty-first switch unit in the cancellation module is configured to control whether the second terminal of the cancellation capacitor is connected to the common mode voltage. The cancellation module 1603 in FIG. 16 may be configured to control whether the first terminal of the cancellation capacitor Cc is connected to GND, Vcc, and Vcm respectively via a fifteenth switch module, a sixteenth switch module, and a twentieth switch module. The cancellation module 1603 may be further configured to control whether the second terminal of the cancellation capacitor Cc is connected to Vcc, GND, and Vcm respectively via a seventeenth switch module, an eighteenth switch module, and a twenty-first switch module. The cancellation module 1603 may be further configured to control whether the first terminal of the cancellation capacitor Cc is connected to the first terminal of the to-b-detected capacitor Cx via a fifth switch module. The charge transfer module 1604 and the processing module 1605 in FIG. 16 are the same as or similar to those described in the foregoing embodiments. The description will not be repeated here.

Figure 17:
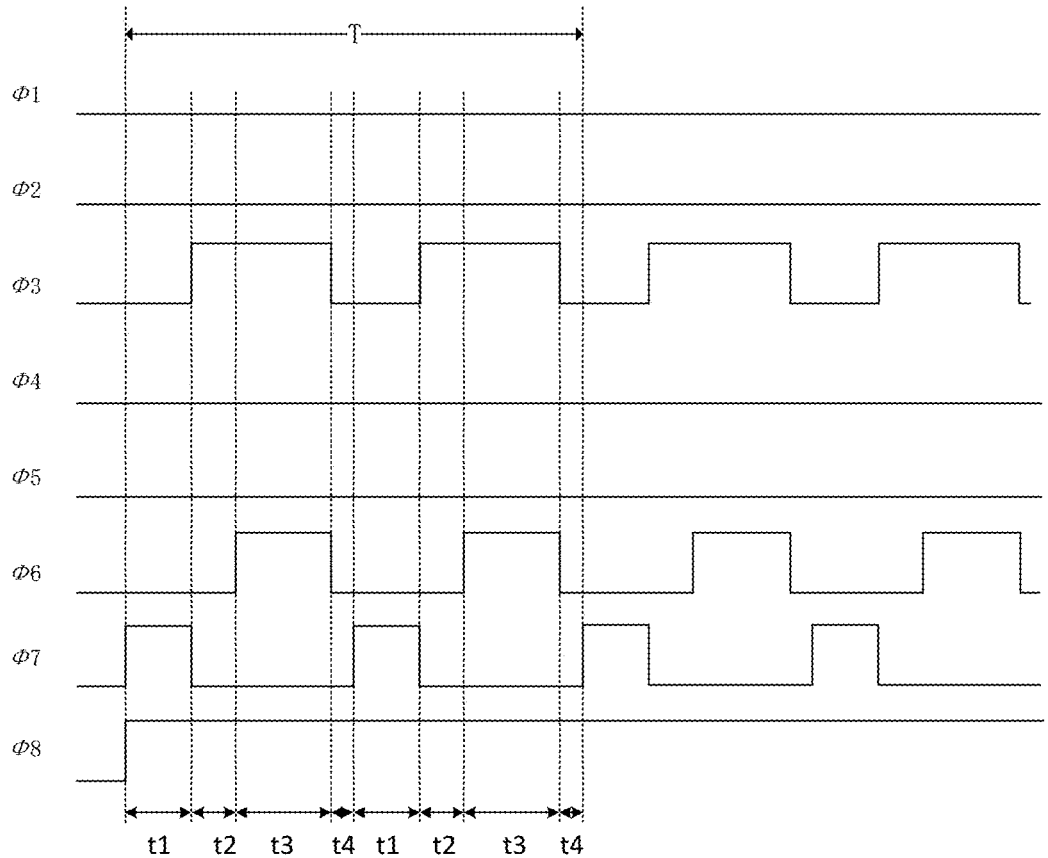
FIG. 17 is a sequence diagram for the noise detection circuit in FIG. 16 during operation provided in an embodiment of the present disclosure.

The corresponding sequence diagram of FIG. 16 during noise detection may be FIG. 17. The operating principle of the above noise detection circuit in FIG. 16 will be described below as an example with reference to the sequence diagram thereof.

FIG. 17 is a sequence diagram for the noise detection circuit during operation in FIG. 16 in an embodiment of the present disclosure. As shown in FIG. 17, double periods t1 to t4 constitute a noise detection cycle, where T denotes a self-capacitance detection cycle, and the main technical processing in each period is briefly described as follows:

period t1: charging the to-be-detected capacitor Cx with the common mode voltage, and inputting the common mode voltage to both terminals of the cancellation capacitor Cc;

period t2: connecting the first terminal of the to-be-detected capacitor Cx to the first terminal of the cancellation capacitor Cc;

period t3: converting the charges of the to-be-detected Cx and the charges of the cancellation capacitor Cc into a voltage signal by charge transfer; and period t4: resetting the charge transfer module, and the output being 0.

It is understandable that the noise detection circuit in FIG. 16 may be equivalent to the noise detection circuit in FIG. 1D. According to FIG. 16 and FIG. 17, the sequence diagram shown in FIG. 2A may also be obtained. Specifically, the first control signal Φ1 in FIG. 2A may be understood as the seventh control signal Φ7 in FIG. 17, the second control signal Φ2 in FIG. 2A may be understood as the seventh control signal Φ7 in FIG. 17, and the third control signal Φ3 in FIG. 2A may be understood as the sixth control signal Φ6 in FIG. 17. In FIG. 17, during noise detection, Φ1, Φ2, Φ4, and Φ5 remain at a low level, and the switches K13, K14, K15, K16, K17, and K18 are switched off. For self-capacitance detection and noise detection, the timing sequence of Φ3 is the same as that of Φ6, Φ7 is equivalent to being obtained by an "OR" operation of Φ1 and Φ2 in FIG. 14, and Φ8 remains at a high level all along. The noise detection circuit is analyzed below in combination with specific on-off states in each period.

In the period t1, the nineteenth switch unit K19, the thirteenth switch unit K13, and the fourteenth switch unit K14 are in an off state, and the fifteenth switch unit K15, the sixteenth switch unit K16, the seventeenth switch unit K17, and the eighteenth switch unit K18 are switched off, and the twentieth switch unit K20 and the twenty-first switch unit K21 are switched on, such that the first terminal of the to-be-detected capacitor Cx is connected to Vcm, and the second terminal thereof is connected to GND, such that the first terminal of the cancellation capacitor Cx is connected to Vcm, and the second terminal thereof is connected to Vcm, and such that finally the to-be-detected capacitor Cx is charged. At the end of the period t1, the voltage of the to-be-detected capacitor Cx is Vcm (i.e., Vcm−GND), and the voltage of the cancellation capacitor Cc is 0 (i.e., Vcm−Vcm=0). In this case, the amount of charges stored in the to-be-detected capacitor Cx is Q1=Vcm*Cx, and the amount of charges stored in the cancellation capacitor Cc is Q2=(Vcm−Vcm)*Cc=0. In this case, since the sixth switch unit K6 is switched off, the output voltage Vout of the charge transfer module 1504 is 0.

In the period t2, the thirteenth switch unit K13, the fourteenth switch unit K14, the fifteenth switch unit K15, the sixteenth switch unit K16, the seventeenth switch unit K17, the eighteenth switch unit K18, the nineteenth switch unit K19, and the twentieth switch unit K20 are in an off state, the fifth switch unit K5 is in a closed state, and the first terminal of the to-be-detected capacitor Cx is connected to the first terminal of the cancellation capacitor Cc. When there is no noise, there is Vcm*Cx+0=Vx*Cx+(Vx−Vxm)*Cc in accordance with the charge conservation law, and the voltage Vx of the to-be-detected capacitor Cx is equal to Vcm. It should be noted that when there is a noise, for example, an interference is simulated using an interference source, the interference source affects the charges stored in the to-be-detected capacitor Cx and the charges stored in the cancellation capacitor Cc, such that the voltage Vx of the to-be-detected capacitor Cx is not equal to Vcm, which may be understood as that the interference caused by the interference source will cause the to-be-detected capacitor and the cancellation capacitor to be charged or discharged, such that the voltage Vx of the to-be-detected capacitor Cx is greater than or less than Vcm.

In the period t3, the fourth switch unit K4 is switched on, other switches remain in a state consistent with the state in the period t2, and when the voltage Vx of the to-be-detected capacitor Cx is greater than or less than Vcm, there is charge transfer between the to-be-detected capacitor Cx, the cancellation capacitor Cc, and the charge transfer module 1604.

In the period t4, the fourth switch unit K4 is switched off, other switches remain in a state consistent with the state in the period t3, the charge transfer module 1604 is reset, and the output voltage Vout of the charge transfer module 804 becomes 0. In addition, the fifth switch unit may also be closed in the period t4.

In the above operating process, there is charge transfer in the period t3. Based on the voltage Vx on the to-be-detected capacitor Cx at the end of the period t2, there are the following situations:

When Vx>Vcm, the to-be-detected capacitor Cx and the cancellation capacitor Cc transfer charges to the charge transfer module 1604 simultaneously, until the voltage of the to-be-detected capacitor Cx reaches the common mode voltage Vcm. In this process, the output voltage Vout of the charge transfer module 1604 is a negative voltage. In addition, the output voltage Vout of the charge transfer module 1604 may also be a positive voltage due to the influence of the interference source on the charge transfer module 1604.

When Vx=Vcm, the amount of charges transferred between the to-be-detected capacitor Cx/the cancellation capacitor Cc and the charge transfer module 1604 is 0, and the output voltage ($V_{OUT}$) of the charge transfer module 1604 is 0, too. In this case, the circuit reaches a completely cancel state.

When Vx<Vcm, the charge transfer module 1604 will charge the to-be-detected capacitor Cx and the cancellation capacitor Cc via the feedback network (Rf and Cf), until both the voltage of the to-be-detected capacitor Cx and the voltage of the cancellation capacitor Cc reach the common mode voltage Vcm. In this process, the output voltage Vout of the charge transfer module 1604 is a positive voltage. In addition, the output voltage Vout of the charge transfer module 1604 may also be a negative voltage due to the influence of the interference source on the charge transfer module 1604.

Figure 18:
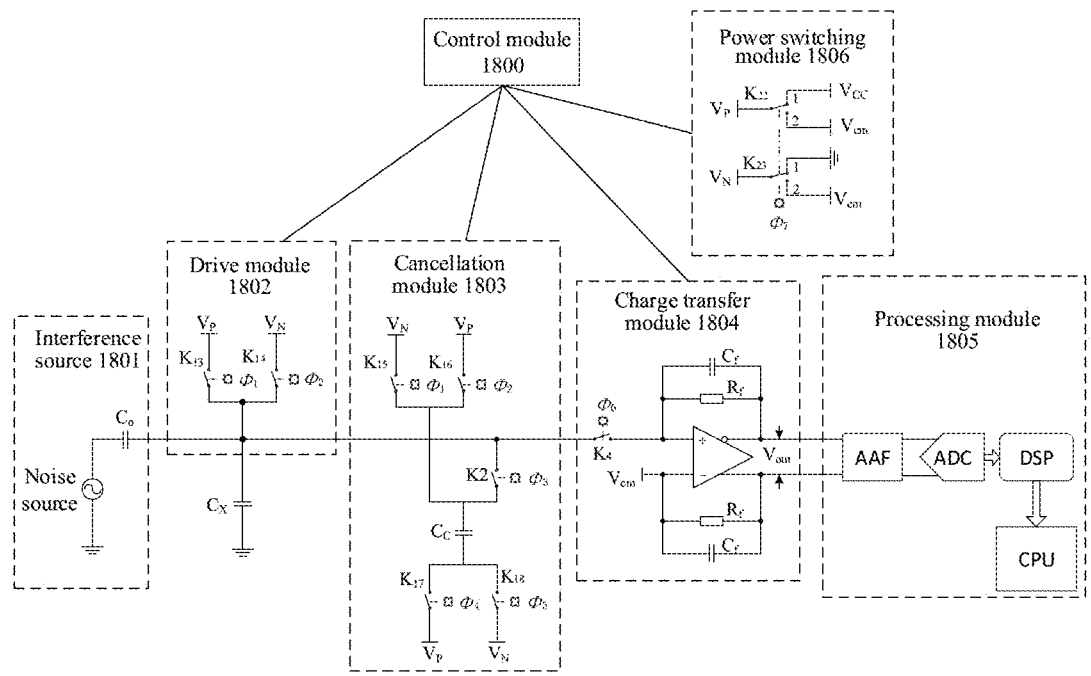
FIG. 18 is a schematic structural diagram of another noise detection circuit provided in an embodiment of the present disclosure.

Based on the disclosures in the foregoing embodiments, the circuit provided in this embodiment can perform not only noise detection, but also self-capacitance detection. Referring to FIG. 18, FIG. 18 provides a circuit that is used for both noise detection and self-capacitance detection. A control module 1800, a drive module 1802, a cancellation module 1803, a charge transfer module 1804, and a processing module 1805 in FIG. 18 are similar to those in the foregoing embodiments. The difference from the foregoing embodiments is that a power switching module is additionally provided in FIG. 18. In addition, the technical principle thereof may be concluded based on the corresponding sequence diagram in FIG. 19 and the above similar analysis. How the noise detection circuit shown in FIG. 18 detects a noise and performs self-capacitance detection is specifically described below.

Figure 19:
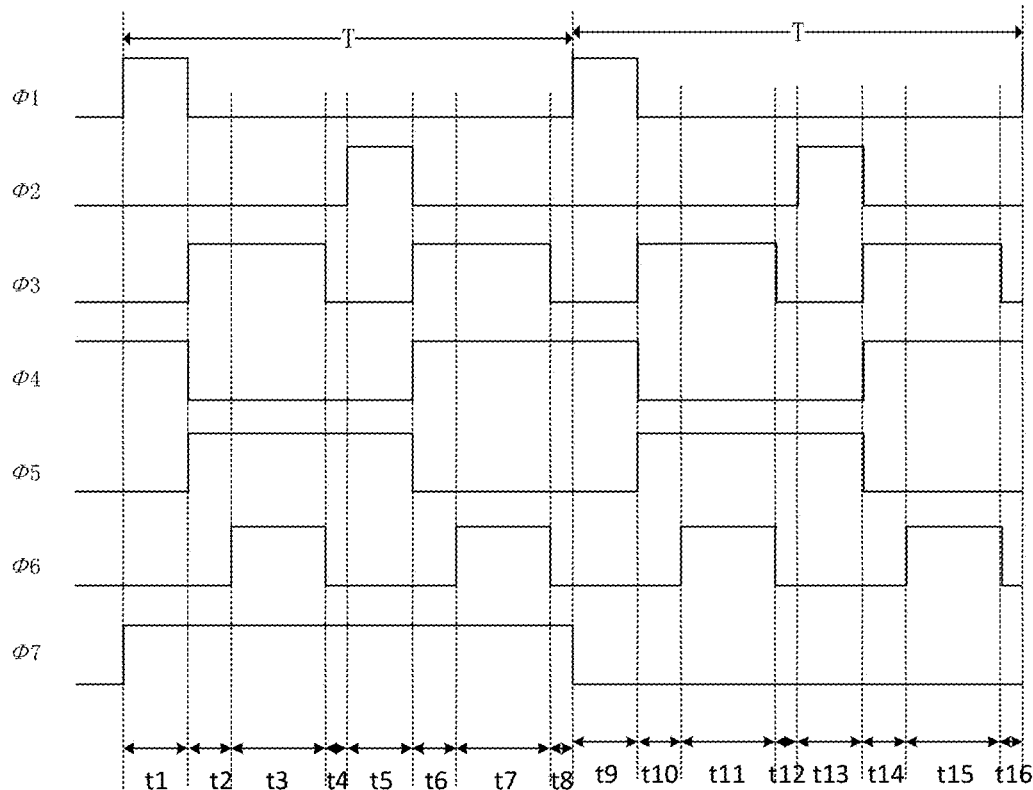
FIG. 19 is a sequence diagram for the noise detection circuit in FIG. 18 during operation provided in an embodiment of the present disclosure.

For the drive module 1802, during noise detection, the control module is configured to control the drive module 1802 such that the to-be-detected capacitor is charged in the first period, and the control module may be further configured to control the cancellation module such that the cancellation capacitor is charged in the first period, or such that both terminals of the cancellation capacitor are connected to the common mode voltage; the control module is further configured to control the cancellation module such that the first terminal of the cancellation capacitor is connected to the first terminal of the to-be-detected capacitor in the second period and the third period; and the control module is further configured to control the charge transfer module such that charge transfer is performed on the charges of the cancellation capacitor and the charges of the to-be-detected capacitor in the third period to output the output voltage Vout. In this embodiment, the control module is further configured to control a power switching module 1806, so as to achieve noise detection and self-capacitance detection. Vp may be selected from Vcc and Vcm, VN may be selected from GND and Vcm, and switches K22 and K23 share the control signal Φ7. When Φ7 is at a low level, Vp is connected to Vcc, and VN is connected to GND. In this case, the circuit is in the self-capacitance detection mode, and the periods t9 to t16 shown in FIG. 19 may be referred to. When Φ7 is at a high level, both Vp and VN may be connected to Vcm. In this case, the circuit is in the noise detection mode, and the periods t1 to t8 shown in FIG. 19 may be referred to. The timing sequence shown in FIG. 19 may be understood as that in the periods t1 to t8, the noise detection circuit performs noise detection, and may acquire a noise value based on the output voltage, while in the periods t9 to t16, the self-capacitance detection circuit performs self-capacitance detection, and may acquire a self-capacitance value based on the output voltage. In this embodiment, a power switching module is additionally provided such that the noise detection circuit and the self-capacitance detection circuit may share a circuit to implement time-sharing detection. For example, as shown in FIG. 19, the circuit detects a noise in the periods t1 to t8, and detects a capacitance value in the periods t9 to t16. The drive module and the cancellation module include 3 pairs of Vp and VN sharing a power selection module, or a power selection module may be used at each pair of Vp and VN power ports respectively. When 3 pairs of Vp and VN share the power switching module 1806, the switch impedance will be a little high; when each pair of Vp and VN power ports uses a power selection module respectively, the complexity of the circuit design will be increased, and the switch impedance will be relatively low.

In the noise detection circuit shown in FIG. 18, the processing module may also be connected to the control module. When the control module controls the power switching module to switch the power supply of the drive module, the cancellation module, and the charge transfer module to implement noise detection or self-capacitance detection, the control module may also inform the processing module, for example, may send a high level or a low level to the processing module, such that the processing module may know whether the output voltage characterizes the noise value or the capacitance value.

Compared with the solution of FIG. 16, this solution reduces one control signal and the control sequence is relatively simple. However, two serially connected switches are used at a power port of the drive module and a power port of the cancellation module, and the drive impedance will be a little higher. The switch-on and switch-off of the power ports in FIG. 16 are controlled by a switch, which has the advantage of lower drive impedance, but the control sequence is more complex.

FIG. 19 is a sequence diagram for the noise detection circuit during operation in FIG. 18 in an embodiment of the present disclosure. As shown in FIG. 19, double periods t1 to t4 constitute a noise detection half cycle, where T denotes a noise detection cycle or a self-capacitance detection cycle, and the analysis of each period is similar to that in the foregoing embodiments. The description will not be repeated here.

Accurate noise measurement is conducive to improving the accuracy of self-capacitance detection. The main anti-interference methods of capacitance detection include increasing the drive voltage, increasing the detection time, staying away from interference sources, shielding, and frequency hopping. The methods of increasing the drive voltage and increasing the detection time cannot avoid interferences, but merely increase the capacity of resisting disturbance of the detection system. Further, there is a limit to the increase of the drive voltage, and the maximum drive voltage is constant in different applications. Increasing the detection time will increase the power consumption. Staying away from interference sources, shielding, and frequency hopping are ways to avoid interferences, but the methods of staying away from interference sources and shielding sometimes cannot be implemented very well because of being limited by the product volume and application forms. Frequency hopping is a flexible and effective anti-interference method, that avoids a frequency with greater interferences, and selects a frequency with a lower noise as an operating frequency, thereby significantly improving the signal-to-noise ratio of capacitance detection, and ensuring the sensitivity and reliability.

Figure 20:
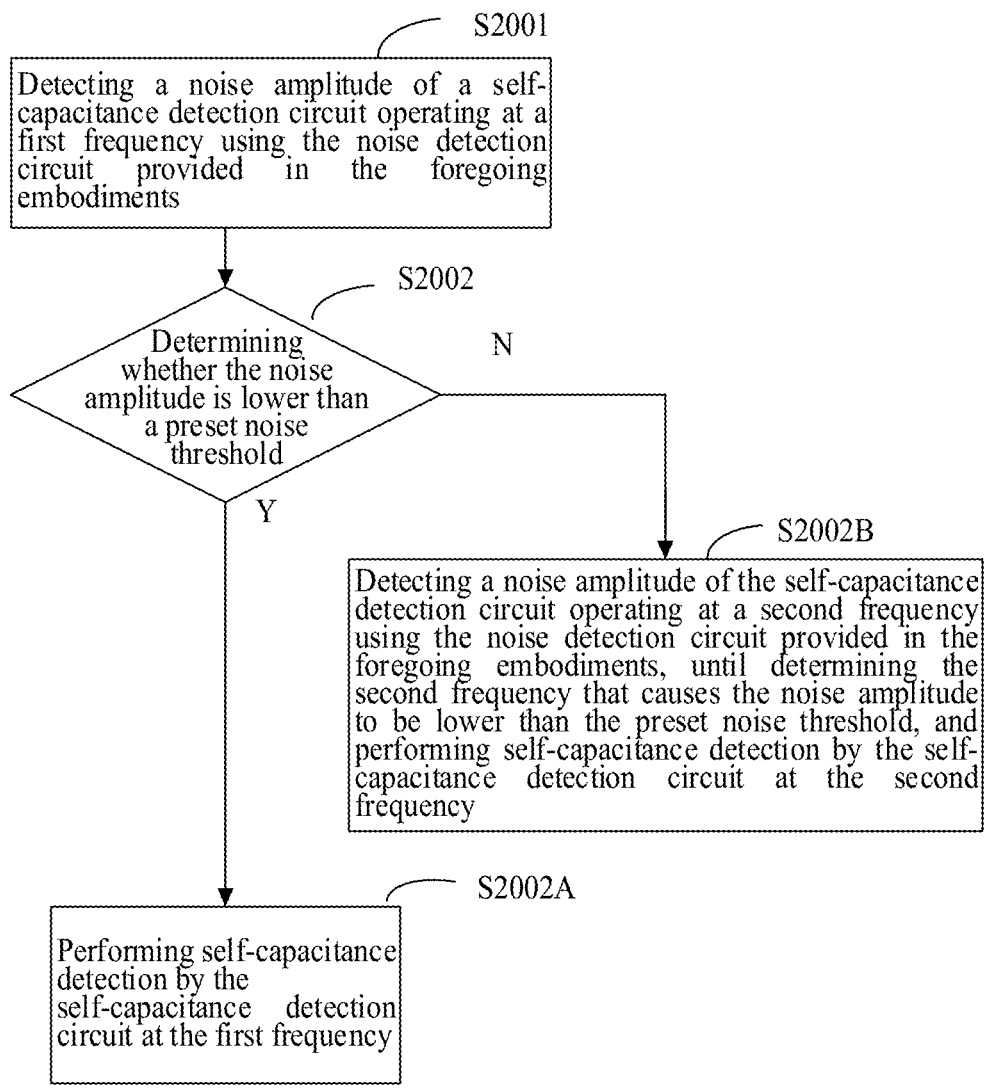
FIG. 20 is a flowchart of a self-capacitance detection method provided in an embodiment of the present disclosure.

Based on the disclosures in the foregoing embodiments, this embodiment provides a self-capacitance detection method for determining an operating frequency of the self-capacitance detection circuit, i.e., selecting an appropriate operating frequency, such that the noise during self-capacitance detection is low. The noise detection circuit disclosed in the foregoing embodiments may be used to acquire a noise value at a certain operating frequency, and based on this, an operating frequency with a low noise may be selected. Specifically, referring to FIG. 20, the method specifically includes the following steps:

S2001: detecting a noise amplitude of a self-capacitance detection circuit operating at a first frequency using the noise detection circuit provided in the foregoing embodiments;

S2002: determining whether the noise amplitude is lower than a preset noise threshold; executing step S2002A if the noise amplitude is lower than the preset noise threshold; and executing step S2002B if the noise amplitude is lower than the preset noise threshold;

S2002A: performing self-capacitance detection by the self-capacitance detection circuit at the first frequency; and S2002B: detecting a noise amplitude of the self-capacitance detection circuit operating at a second frequency using the noise detection circuit provided in the foregoing embodiments, until determining the second frequency that causes the noise amplitude to be lower than the preset noise threshold, and performing self-capacitance detection by the self-capacitance detection circuit at the second frequency.

In step S2001, when the noise detection circuit detects the noise of the self-capacitance detection circuit operating at the first frequency, the operating frequency of the self-capacitance detection circuit is the first frequency, and during noise detection, the demodulation frequency of the noise detection is also the first frequency. Step S2001 may also be understood as detecting the noise amplitude of the noise detection circuit operating at the first frequency by the noise detection circuit provided in the foregoing embodiments. A timing sequence of switch units of the noise detection circuit may be the same as a switching sequence of the self-capacitance detection circuit, to ensure that the noise amplitude of the self-capacitance detection circuit may be acquired more accurately. Taking the timing sequence of FIG. 19 as an example, when the noise of the self-capacitance detection circuit with the timing sequence of t9 to t16 is to be detected, the timing sequence of the noise detection circuit may be set as shown in t1 to t8. In addition, it is understandable that for the demodulation frequency of the processing module, the demodulation frequency of the processing module of the noise detection circuit is the same as the demodulation frequency of the processing module of the self-capacitance detection circuit. Specifically, S2002A is described with reference to FIG. 19. When the noise amplitude measured in the periods t1 to t8 is less than the preset noise threshold, self-capacitance detection is performed at the first frequency in the periods t9 to t16, such that the switching sequence of the self-capacitance detection circuit is the same as a switching sequence of the noise detection circuit, and the demodulation frequency of the self-capacitance detection circuit is the same as the demodulation frequency of the noise detection circuit. Thus, when operating at the first frequency, the self-capacitance detection circuit suffers from interferences less than the preset noise threshold. In addition, the switching sequence of the self-capacitance detection circuit is the same as the switching sequence of the noise detection circuit. In this embodiment, the length of the ninth period is equal to the length of the first period, the length of the tenth period is equal to the length of the second period, the length of the eleventh period is equal to the length of the third period, and the length of the twelfth period is equal to the length of the fourth period.

In this embodiment, based on the disclosures in the foregoing embodiments, when the fourth period is not arranged, and the noise amplitude is determined to be lower than the preset noise threshold based on the output voltage in the periods t1+t2+t3, the self-capacitance detection circuit may perform self-capacitance detection at a frequency of f=1/(t1+t2+t3). When a noise of the self-capacitance detection circuit at an operating frequency of f=1/(t1+t2+t3+t1+t2+t3) is to be measured, a noise value may be determined based on an output voltage of a charge transfer circuit of the noise detection circuit in the periods (t1+t2+t3+t1+t2+t3). In this case, the noise detection circuit operates based on a timing sequence of t1+t2+t3+t1+t2+t3. When the fourth time period is arranged, when a noise of the self-capacitance detection circuit at an operating frequency of f=1/(t1+t2+t3+t4+t1+t2+t3+t4) is to be measured, a noise value may be determined based on an output voltage of the charge transfer circuit of the noise detection circuit in the periods (t1+t2+t3+t4+t1+t2+t3+t4). When the noise magnitude is lower than the preset noise threshold, the self-capacitance detection circuit may perform self-capacitance detection at the operating frequency of f=1/(t1+t2+t3+t4+t1+t2+t3+t4).

In this embodiment, when the operating frequency of the self-capacitance detection circuit is the first frequency at a current moment, the noise detection circuit provided in the foregoing embodiments is used to detect the noise amplitude of the self-capacitance detection circuit operating at the first frequency, to determine whether the first frequency is an appropriate operating frequency of the self-capacitance detection circuit, i.e., determining whether the noise at the first frequency is less than the preset noise threshold. When the noise exceeds the preset noise threshold, the noise detection circuit may measure noises at other operating frequencies, in order to find an appropriate operating frequency of the self-capacitance detection circuit. In this embodiment, when detecting the noise amplitude, the noise detection circuit preferentially detects the noise of the self-capacitance detection circuit at the operating frequency at the current moment, i.e., first determining that the operating frequency of the self-capacitance detection circuit is the first frequency, and then the noise detection circuit detects the noise amplitude of the self-capacitance detection circuit operating at the first frequency. Thus, when the noise at the first frequency meets the requirements, the noise detection circuit does not need to detect noises at other frequencies, and the self-capacitance detection circuit continues to perform self-capacitance detection at the first frequency.

Figure 21:
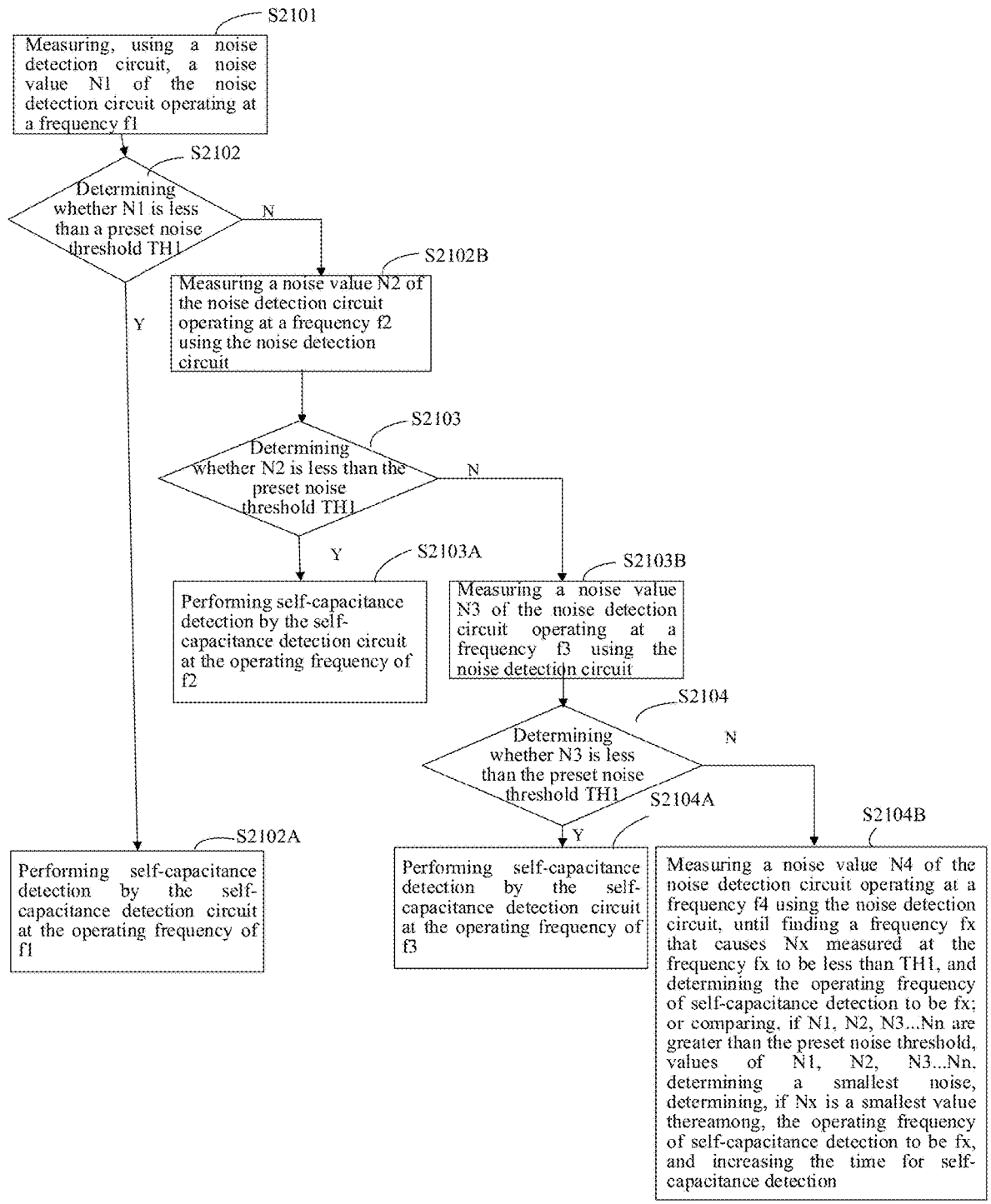
FIG. 21 is a flowchart of another self-capacitance detection method provided in an embodiment of the present disclosure.

Specifically, referring to FIG. 21, the method specifically includes the following steps:

S2101: measuring, using a noise detection circuit, a noise value N1 of the noise detection circuit operating at a frequency f1;

S2102: determining whether N1 is less than a preset noise threshold TH1; executing step S2002A if N1 is less than the preset noise threshold TH1; and otherwise executing step S2002B;

S2102A: performing self-capacitance detection by the self-capacitance detection circuit at the operating frequency of f1;

S2102B: measuring a noise value N2 of the noise detection circuit operating at a frequency f2 using the noise detection circuit;

S2103: determining whether N2 is less than the preset noise threshold TH1; executing step S2003A if N2 is less than the preset noise threshold TH1; and otherwise executing step S2003B;

S2103A: performing self-capacitance detection by the self-capacitance detection circuit at the operating frequency of f2;

S2103B: measuring a noise value N3 of the noise detection circuit operating at a frequency f3 using the noise detection circuit;

S2104: determining whether N3 is less than the preset noise threshold TH1; executing step S2004A if N3 is less than the preset noise threshold TH1; and otherwise executing step S2004B;

S2104A: performing self-capacitance detection by the self-capacitance detection circuit at the operating frequency of f3; and S2104B: measuring a noise value N4 of the noise detection circuit operating at a frequency f4 using the noise detection circuit, until finding a frequency fx that causes Nx measured at the frequency fx to be less than TH1, and determining the operating frequency of self-capacitance detection to be fx; or comparing, if N1, N2, N3 . . . Nn are greater than the preset noise threshold, values of N1, N2, N3 . . . Nn, determining a smallest noise, determining, if Nx is a smallest value thereamong, the operating frequency of self-capacitance detection to be fx, and increasing the time for self-capacitance detection. It is understandable that when the time for self-capacitance detection is increased, the signal-to-noise ratio of self-capacitance detection will be improved.

In step S2104B, the time for self-capacitance detection may be doubled.

Figure 22:
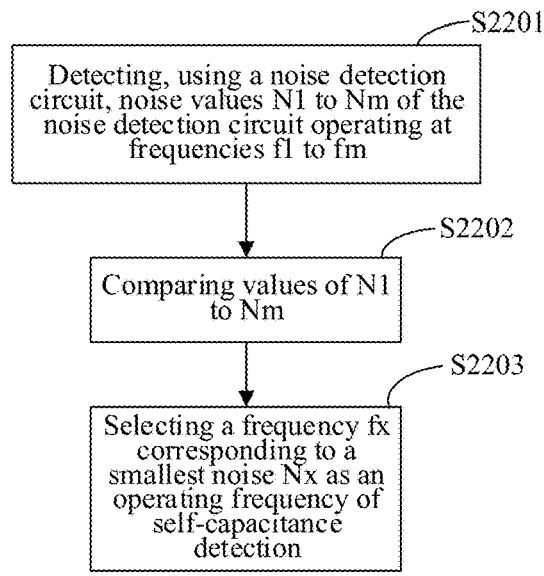
FIG. 22 is a flowchart of still another self-capacitance detection method provided in an embodiment of the present disclosure.

Based on the disclosures in the foregoing embodiments, this embodiment provides a self-capacitance detection method for selecting an operating frequency of the self-capacitance detection circuit, such that the self-capacitance detection circuit can operate at a frequency with a small noise, while the noise detection circuit disclosed in the foregoing embodiments may be used to acquire a noise value of the circuit at a certain operating frequency, and based on this, an operating frequency with a small noise may be selected. Specifically, referring to FIG. 22, the method includes the following steps:

S2201: detecting, using a noise detection circuit, noise values N1 to Nm of the noise detection circuit operating at frequencies f1 to fm;

S2202: comparing values of N1 to Nm; and

S2203: selecting a frequency fx corresponding to a smallest noise Nx as an operating frequency of a self-capacitance detection circuit.

In this embodiment, the noise value may be understood as the noise magnitude, and the operating frequency of the self-capacitance detection circuit may be understood as the operating frequency of the processing module of the self-capacitance detection circuit, e.g., the operating frequency for demodulation of the processing module, which may be specifically referred to as the demodulation frequency. When the noise detection circuit is used to measure the noise value of the noise detection circuit operating at the frequency f1, the operating frequency for demodulation of the processing module of the noise detection circuit is also f1.

Figure 23:
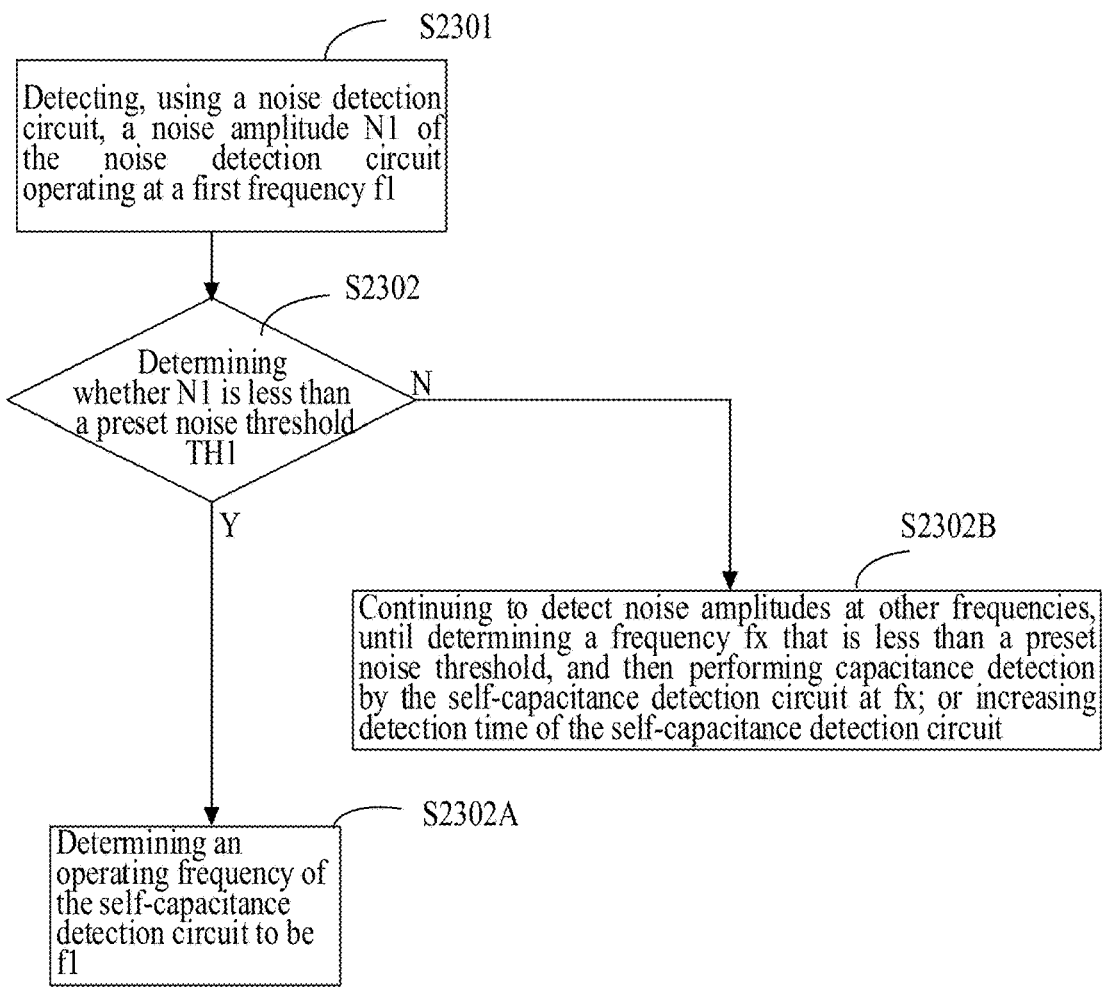
FIG. 23 is a flowchart of yet another self-capacitance detection method provided in an embodiment of the present disclosure.

Based on the disclosures in the foregoing embodiments, this embodiment provides a self-capacitance detection method. Referring to FIG. 23, the method includes the following steps:

S2301: detecting, using a noise detection circuit, a noise amplitude N1 of the noise detection circuit operating at a first frequency f1;

S2302: determining whether N1 is less than a preset noise threshold TH1; executing step S2002A if N1 is less than the preset noise threshold TH1; and otherwise executing step S2002B;

S2302A: performing capacitance detection by a self-capacitance detection circuit at the first frequency; and S2302B: continuing to detect noise amplitudes at other frequencies, until determining a frequency fx that is less than a preset noise threshold, and then performing capacitance detection by the self-capacitance detection circuit at fx; or increasing detection time of the self-capacitance detection circuit.

When the detection time of the self-capacitance detection circuit is increased, the self-capacitance detection circuit may further process a detection result using results of multiple detections, such that the detection result is more accurate.

Figure 24:
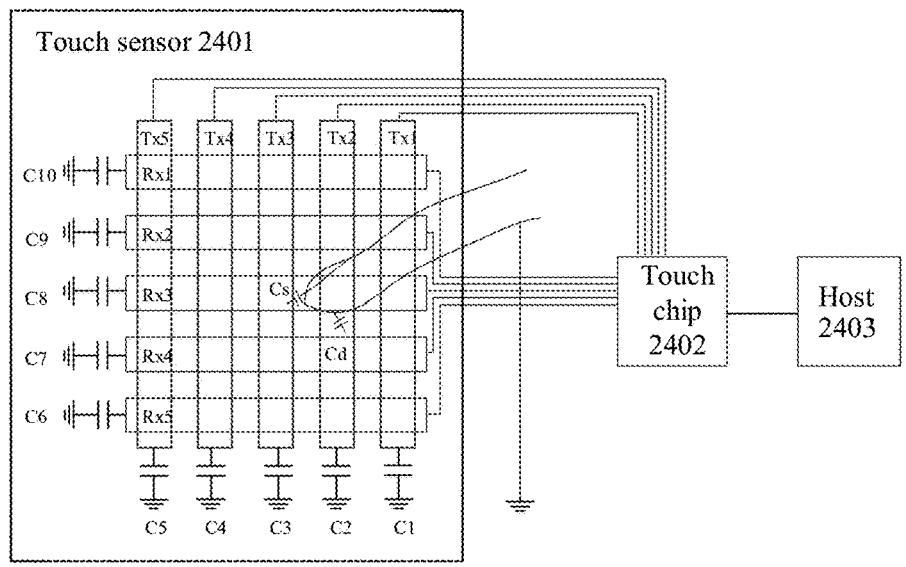
FIG. 24 is a schematic structural diagram of a capacitive touch control system provided in an embodiment of the present disclosure.

FIG. 24 is a schematic structural diagram of a capacitive touch control system in Embodiment I of the present disclosure. As shown in FIG. 24, the capacitive touch control system includes a touch sensor 2401, a touch chip 2402, and a host 2403. The touch sensor 2401 is a bilayer structure, including a driving channel Tx and a sensing channel Rx, base capacitances of which to system ground are denoted as C1 to C5 and C6 to C10. During self-capacitance detection, the touch chip 2402 will scan the capacitance of each channel (driving channel, sensing channel) to the system ground, and compute the capacitance variation of each channel to the system ground. When a finger approaches or touches a touch screen, capacitance of the channel where the finger approaches or touches to the system ground will become higher. As shown in FIG. 24, assume that the capacitance between the finger and the driving channel Tx is Cd, and the capacitance between the finger and the sensing channel Rx is Cs. For example, when the finger approaches a driving channel Tx2 and a sensing channel Rx3, since a human body, as a conductor, is connected to the system ground, the capacitance of the driving channel Tx2 to the system ground will become C2+Cd, and the capacitance of a sensing channel Rx3 to the system ground will become C8+Cs. The touch chip 2402 detects that both the capacitance of the driving channel Tx2 and the capacitance of the sensing channel Rx3 to the system ground will become higher, while the capacitance of other channels to the system ground remains unchanged, or approximately remains unchanged, or is small. Therefore, it may be computed that the touched position is an intersection of the driving channel Tx2 and the sensing channel Rx3. Coordinates of the position are sent to the host 2403 to implement touch control operations of various functions.

In this embodiment, the noise detection circuit is specifically provided on the above touch chip 2402 in FIG. 24. Therefore, it may be understood that the above touch chip 2402 includes the capacitance detection circuit described in the above embodiments.

Figure 25:
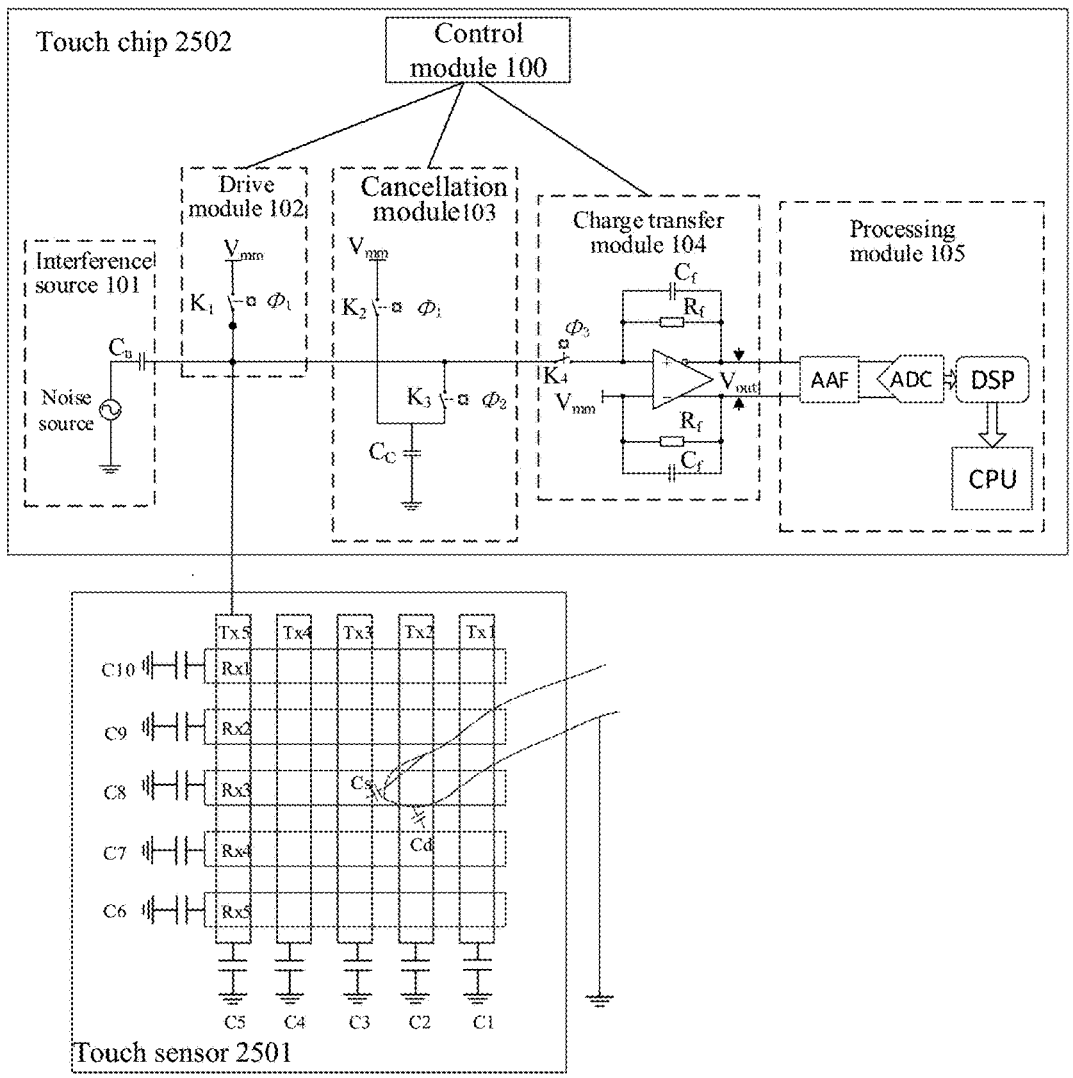
FIG. 25 is a schematic structural diagram of a capacitive touch control system provided in an embodiment of the present disclosure.

FIG. 25 is a schematic structural diagram of a capacitive touch control system in Embodiment I of the present disclosure. As shown in FIG. 25, the capacitive touch control system includes a touch sensor 2501 and a touch chip 2502. The touch sensor and the touch chip in this embodiment are the same as or similar to those in the foregoing embodiments. The description will not be repeated here. Taking the noise measurement of an electrode Tx5 as an example, a to-be-detected capacitor in the figure is specifically a capacitor formed between the electrode Tx5 and GND. This embodiment only illustrates, e.g., the measurement of a capacitor formed by one electrode. The description of other electrodes will not be repeated.

An embodiment of the present disclosure further provides an electronic device, including the touch chip according to any one embodiment of the present disclosure.

It should be noted that, in the above embodiments, the description is provided by taking each switch unit being a single switch as an example, but in practice, the switch unit may also be implemented in a combined circuit structure, where the constituent element may be any electronic component, e.g., a MOS transistor, having an on-off function.

In addition, when implementing touch control detection based on mutual capacitance detection, if base capacitance of the mutual capacitance is high enough to affect the variation rate of the mutual capacitance, the following concepts of the embodiments of the present disclosure may also be applied.

The electronic device in the embodiments of the present disclosure exists in various forms, including but not limited to:

(1). a mobile communication device: Such a device is characterized by having mobile communication functions, and is mainly intended to provide voice and data communication. Such a terminal includes: a smart phone (e.g., an iPhone), a multimedia phone, a functional phone, a low-end phone, and the like.

(2). an ultra-mobile personal computer device: Such a device belongs to a category of personal computers, has computing and processing functions, and generally also has the characteristics of mobile Internet access. Such a terminal includes: a device, such as a PDA, a MID, and a UMPC, e.g., an iPad.

(3). a portable entertainment device: Such a device can display and play multimedia contents. Such a device includes: an audio player, a video player (e.g., an iPod), a handheld game player, an e-book, a Bluetooth earphone, a smart toy, and a portable vehicle navigation device.

(4). a server: A device providing a computing service. The server components include a processor, a hard disk, an internal memory, a system bus, etc. A structure of the server is similar to that of a general computer. But because of the needs for providing a highly reliable service, the requirements in respect of processing capacity, stability, reliability, security, scalability, manageability, etc. are very high.

(5). other electronic structures having data interaction functions.

It should be noted that the above method embodiments of the present disclosure may be applied to, or be implemented by, a processor. The processor may be an integrated circuit chip with signal processing capabilities. In an implementation process, steps of the above method embodiments may be completed by an integrated logic circuit of hardware in the processor or instructions in the form of software. The above processor may be a general-purpose processor, a digital signal processor (DSP), an application specific integrated circuit (ASIC), a field programmable gate array (FPGA) or other programming logic devices, a discrete gate or transistor logic device, or a discrete hardware component. The methods, steps, and logical block diagrams disclosed in embodiments of the present disclosure may be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or being executed and completed by a combination of hardware and software modules in the decoding processor. The software module may be located in a mature storage medium in the art, such as a random access memory, a flash memory, a read-only memory, a programmable read-only memory or an electrically erasable programmable memory, or a register. The storage medium is located in the memory. The processor reads information in the memory, and completes the steps of the above method in combination with its hardware.

It may be understood that the memory in the embodiments of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), which is used as an external cache. In an exemplary manner, instead of in a limiting manner, many forms of RAM are usable, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memories of the systems and methods described herein are intended to include, but are not limited to, these and any other suitable types of memories.

It should be understood that in the embodiments of the present disclosure, "B corresponding to A" means that B is associated with A, and B may be determined based on A. However, it should also be understood that determining B based on A does not mean that B is determined merely based on A, and B may also be determined based on A and/or other information.

In addition, the term "and/or" herein is merely an association relationship describing associated objects, and means that there may be three relationships. For example, A and/or B may mean three situations: A exists alone, both A and B exist, or B exists alone. In addition, the character "/" herein generally means that there is an "or" relationship between associated objects therebefore and thereafter.

As will be appreciated by those of ordinary skills in the art, various example units and algorithm steps described in combination with the embodiments disclosed herein may be implemented in electronic hardware, or a combination of computer software and electronic hardware. Whether these functions are performed by hardware or software depends on specific applications and design constraints of the technical solutions. Those skilled in the art may implement described functions for each specific application using different methods, but such implementation should not be considered as falling beyond the scope of the present disclosure.

Those skilled in the art can clearly understand that, for convenience and simplicity of description, corresponding processes in the above method embodiments may be referred to for specific working process of the above described system, apparatus and unit. The description will not be repeated here.

It should be understood that the system, apparatus and method disclosed in the embodiments of the present disclosure may be implemented by other approaches. For example, the embodiments of the above described apparatus are merely illustrative. For example, the division of the unit is only a logical function division and there may be other manners of division during actual implementations, for example, multiple units or components may be combined or may be integrated into another system, or some features may be ignored, omitted, or not performed. In addition, the illustrated or discussed coupling or direct coupling or communication connection between each component may be indirect coupling or communication connection among apparatuses or units via some interfaces, and may be electrical connection, mechanical connection, or other forms of connection.

The units described as separate components may or may not be physically separated, the components illustrated as units may or may not be physical units, that is, they may be in the same place or may be distributed to a plurality of network units. Part or all of the units may be selected according to actual requirements to achieve the purpose of the solutions of the embodiment.

In addition, the functional units in various embodiments of the present disclosure may be integrated into one processing unit, or each unit may be physically present, or two or more than two units may be integrated into one unit.

The integrated unit may be stored in a computer readable storage medium when it is implemented in the form of a software functional unit and is sold or used as a separate product. Based on such understanding, the technical solutions of the present disclosure essentially, or a part of the technical solutions that contributes to the prior art, or the part of the technical solutions, may be embodied in the form of a software product which is stored in a storage medium and includes some instructions for causing a computer device (which may be a personal computer, a server, or a network device, and so on) to perform all or part of the steps described in the various embodiments of the present disclosure. The foregoing storage mediums include: various mediums that can store program code, such as a U disk, a mobile hard disk, a read-only memory (ROM), a random access memory (RAM), a magnetic disk, or an optical disk.

While the above description merely provides specific embodiments of the present disclosure, the scope of protection of the present disclosure is not limited to the specific embodiments. Any person skilled in the art may easily conceive of variations or replacements without departing from the technical scope disclosed in the present disclosure. All variations or replacements should fall within the scope of protection of the present disclosure. Therefore, the scope of protection of the present disclosure should be determined by the scope of protection of the appended claims.

What is claimed is:

1. A noise detection circuit, comprising: a control module, a drive module, a cancellation module, a charge transfer module, and a processing module; wherein the drive module is connected to the cancellation module, the cancellation module is connected to the charge transfer module, the charge transfer module is connected to the processing module, and the control module is connected to the drive module, the cancellation module, and the charge transfer module, wherein the control module is configured to control the drive module such that a to-be-detected capacitor is charged with a first voltage in a first period, and control the cancellation module such that a cancellation capacitor is charged with the first voltage in the first period, or such that both terminals of the cancellation capacitor are connected to the first voltage;

the control module is configured to control the cancellation module such that a first terminal of the to-be-detected capacitor is connected to a first terminal of the cancellation capacitor in a second period;

the control module is configured to control the charge transfer module such that charges of the to-be-detected capacitor and charges of the cancellation capacitor are converted in a third period to generate an output voltage;

the first period, the second period, and the third period are consecutive in time, the charge transfer module comprises an amplifier; an inverting input terminal of the amplifier is connected to the first voltage; and the processing module is configured to determine a noise value at least based on the output voltage.

2. The noise detection circuit according to claim 1, wherein the first voltage is a common mode voltage.

3. The noise detection circuit according to claim 1, wherein the drive module comprises a first switch unit, and the control module is further configured to control the first switch unit to be in a closed state, such that the drive module charges the to-be-detected capacitor with the first voltage in the first period;

wherein when the first switch unit is in the closed state, the first terminal of the to-be-detected capacitor is connected to the first voltage, and a second terminal of the to-be-detected capacitor is connected to a ground voltage.

4. The noise detection circuit according to claim 3, wherein the cancellation module comprises a second switch unit and the cancellation capacitor, and the control module is further configured to control the second switch unit to be in a closed state in the first period;

wherein when the second switch unit is in the closed state, the cancellation capacitor is charged, the first terminal of the cancellation capacitor is connected to the first voltage, and a second terminal of the cancellation capacitor is connected to the ground voltage; or wherein when the second switch unit is in the closed state, the first terminal of the cancellation capacitor is connected to the first voltage, and the second terminal of the cancellation capacitor is connected to the first voltage.

5. The noise detection circuit according to claim 4, wherein the cancellation module further comprises a third switch unit, and the control module is further configured to control the third switch unit to be in a closed state in the second period such that the first terminal of the to-be-detected capacitor is connected to the first terminal of the cancellation capacitor;

wherein when the third switch unit is in the closed state, the first terminal of the cancellation capacitor is disconnected from the first voltage, and the first terminal of the to-be-detected capacitor is disconnected from the first voltage.

6. The noise detection circuit according to claim 1, wherein when the charges of the to-be-detected capacitor and the charges of the cancellation capacitor are being converted, the first terminal of the to-be-detected capacitor, the first terminal of the cancellation capacitor, and a non-inverting input terminal of the amplifier are being connected.

7. The noise detection circuit according to claim 1, wherein the control module controls the charge transfer module to reset the charge transfer module in a fourth period; wherein the first period, the second period, the third period, and the fourth period are consecutive in time.

8. The noise detection circuit according to claim 7, wherein the charge transfer module further comprises a fourth switch unit, and the fourth switch unit is in a closed state in the third period such that the charges of the to-be-detected capacitor and the charges of the cancellation capacitor are converted to generate the output voltage; and the fourth switch unit is in an off state in the fourth period to reset the charge transfer module.

9. The noise detection circuit according to claim 7, wherein in the first period, a voltage of the to-be-detected capacitor is increased to the first voltage, a voltage of the cancellation capacitor is increased to the first voltage or a voltage of the cancellation capacitor is 0; a connection state of the second terminal of the cancellation capacitor in the second period is the same as a connection state of the second terminal of the cancellation capacitor in the first period; an output voltage of the charge transfer module is increased or reduced to 0 in the first period and the second period, and the output voltage of the charge transfer module is reduced or increased to 0 in the fourth period.

10. The noise detection circuit according to claim 7, wherein the processing module comprises a filter, an analog-to-digital converter, and a digital signal processor; wherein the filter filters the output voltage of the charge transfer module; the analog-to-digital converter performs analog-to-digital conversion on the filtered output voltage; the digital signal processor is configured to demodulate the output voltage after the analog-to-digital conversion at a reference frequency that is a reciprocal of a noise detection cycle; the noise detection cycle is equal to an integer multiple of a noise detection half cycle, and the noise detection half cycle is a sum of the first period, the second period, the third period, and the fourth period; or the noise detection half cycle is a sum of the first period, the second period, and the third period.

11. The noise detection circuit according to claim 1, wherein the drive module comprises a thirteenth switch unit, a fourteenth switch unit, and a nineteenth switch unit; the control module is further configured to control the thirteenth switch unit, the fourteenth switch unit, and the nineteenth switch unit to perform noise detection or self-capacitance detection; during the noise detection, the control module is configured to control the nineteenth switch unit such that the first terminal of the to-be-detected capacitor is connected to the first voltage in the first period; during the self-capacitance detection, the control module is configured to control the thirteenth switch unit and the fourteenth switch unit such that the first terminal of the to-be-detected capacitor is connected to a ground voltage or a power supply voltage; and a second terminal of the to-be-detected capacitor is connected to the ground voltage.

12. The noise detection circuit according to claim 11, wherein the cancellation module comprises a fifteenth switch unit, a sixteenth switch unit, a twentieth switch unit, a seventeenth switch unit, an eighteenth switch unit, and a twenty-first switch unit; the control module is further configured to control the fifteenth switch unit, the sixteenth switch unit, the twentieth switch unit, the seventeenth switch unit, the eighteenth switch unit, and the twenty-first switch unit to perform the noise detection or the self-capacitance detection; during the noise detection, the control module is configured to control the twentieth switch unit and the twenty-first switch unit such that the first terminal and a second terminal of the cancellation capacitor is connected to the first voltage in the first period, or such that the first terminal of the cancellation capacitor is connected to the first voltage and the second terminal of the cancellation capacitor is connected to the ground voltage in the first period; during the self-capacitance detection, the control module is configured to control the fifteenth switch unit, the sixteenth switch unit, the seventeenth switch unit, and the eighteenth switch unit such that the first terminal and the second terminal of the cancellation capacitor are connected to the ground voltage or the power supply voltage.

13. The noise detection circuit according to claim 12, wherein the cancellation module further comprises a fifth switch unit, and the control module is further configured to control the fifth switch unit such that the first terminal of the to-be-detected capacitor is connected to the first terminal of the cancellation capacitor in the second period and in the third period, and the first terminal of the to-be-detected capacitor is disconnected from the first terminal of the cancellation capacitor in the first period.

14. The noise detection circuit according to claim 1, further comprising a power switching module, wherein the power switching module is connected to the control module, the drive module, and the cancellation module, the power switching module is configured to switch the first voltage such that the control module controls the drive module, the cancellation module, the charge transfer module, and the processing module to perform the self-capacitance detection or the noise detection, and during the self-capacitance detection, the control module is further configured to control the cancellation capacitor to perform charge cancelling on the to-be-detected capacitor; and during the self-capacitance detection, the power switching module is configured to switch two first voltages connected to the first terminal of the to-be-detected capacitor to a power supply voltage and a ground voltage respectively; the power switching module is further configured to switch the two first voltages connected to the first terminal of the cancellation capacitor to the power supply voltage and the ground voltage respectively; and the power switching module is further configured to switch the two first voltages connected to a second terminal of the cancellation capacitor to the power supply voltage and the ground voltage respectively; and/or during the noise detection, the power switching module is configured to switch the power supply voltage and the ground voltage connected to the first terminal of the to-be-detected capacitor to the first voltage; the power switching module is further configured to switch the power supply voltage and the ground voltage connected to the first terminal of the cancellation capacitor to the first voltage; and the power switching module is further configured to switch the power supply voltage and the ground voltage connected to the second terminal of the cancellation capacitor to the first voltage.

15. The noise detection circuit according to claim 1, wherein the drive module, the cancellation module and the charge transfer module each comprises at least one switch unit; and a timing sequence of the switch units of the drive module, the cancellation module, and the charge transfer module during the noise detection is the same as a timing sequence of the switch units of the drive module, the cancellation module, and the charge transfer module during the self-capacitance detection.

16. The noise detection circuit according to claim 1, wherein the amplifier is a monoamplifier or the amplifier is a fully differential amplifier.

17. A self-capacitance detection method, comprising: detecting a noise magnitude of the noise detection circuit operating at a first frequency using the noise detection circuit according to any one of claim 1; wherein when the noise magnitude is lower than a preset noise threshold, a self-capacitance detection circuit performs capacitance detection at the first frequency.

18. A touch chip, comprising a noise detection circuit, wherein the noise detection circuit comprising: a control module, a drive module, a cancellation module, a charge transfer module, and a processing module; wherein the drive module is connected to the cancellation module, the cancellation module is connected to the charge transfer module, the charge transfer module is connected to the processing module, and the control module is connected to the drive module, the cancellation module, and the charge transfer module, wherein the control module is configured to control the drive module such that a to-be-detected capacitor is charged with a first voltage in a first period, and the control module controls the cancellation module such that a cancellation capacitor is charged with the first voltage in the first period, or such that both terminals of the cancellation capacitor are connected to the first voltage;

the control module controls the cancellation module such that a first terminal of the to-be-detected capacitor is connected to a first terminal of the cancellation capacitor in a second period;

the control module controls the charge transfer module such that charges of the to-be-detected capacitor and charges of the cancellation capacitor are converted in a third period to generate an output voltage;

the first period, the second period, and the third period are consecutive in time, the charge transfer module comprises an amplifier; an inverting input terminal of the amplifier is connected to the first voltage; and the processing module is configured to determine a noise value at least based on the output voltage.

19. A capacitive touch control system, comprising the touch chip according to claim 18 and a touch sensor.

20. An electronic device, comprising a touch chip comprising a noise detection circuit, wherein the noise detection circuit comprising: a control module, a drive module, a cancellation module, a charge transfer module, and a processing module; wherein the drive module is connected to the cancellation module, the cancellation module is connected to the charge transfer module, the charge transfer module is connected to the processing module, and the control module is connected to the drive module, the cancellation module, and the charge transfer module, wherein the control module is configured to control the drive module such that a to-be-detected capacitor is charged with a first voltage in a first period, and control the cancellation module such that a cancellation capacitor is charged with the first voltage in the first period, or such that both terminals of the cancellation capacitor are connected to the first voltage;

the control module is configured to control the cancellation module such that a first terminal of the to-be-detected capacitor is connected to a first terminal of the cancellation capacitor in a second period;

the control module is configured to control the charge transfer module such that charges of the to-be-detected capacitor and charges of the cancellation capacitor are converted in a third period to generate an output voltage;

the first period, the second period, and the third period are consecutive in time, the charge transfer module comprises an amplifier; an inverting input terminal of the amplifier is connected to the first voltage; and the processing module is configured to determine a noise value at least based on the output voltage.

* * * * *